(12) United States Patent  
Tachibana et al.

(10) Patent No.: US 10,086,907 B2  
(45) Date of Patent: Oct. 2, 2018

(54) BICYCLE ELECTRICAL COMPONENT

(71) Applicant: Shimano Inc., Sakai, Osaka (JP)

(72) Inventors: Hiroshi Tachibana, Osaka (JP); Kazuhiro Fujii, Osaka (JP); Yuta Mizutani, Osaka (JP); Keijiro Nishi, Osaka (JP); Yuki Kataoka, Osaka (JP); Atsushi Komatsu, Osaka (JP); Yuta Kurokawa, Osaka (JP); Shingo Sakurai, Osaka (JP)

(73) Assignee: Shimano Inc., Osaka (JP)

( * ) Notice: Subject to any disclaimer, the term of this patent is extended or adjusted under 35 U.S.C. 154(b) by 318 days.

(21) Appl. No.: 15/019,589

(22) Filed: Feb. 9, 2016

(65) Prior Publication Data

US 2017/0101162 A1    Apr. 13, 2017

Related U.S. Application Data

(63) Continuation-in-part of application No. 14/879,405, filed on Oct. 9, 2015.

(51) Int. Cl.

| | |
|---|---|
| *B62M 25/08* | (2006.01) |
| *B62K 23/00* | (2006.01) |
| *B62M 9/122* | (2010.01) |
| *H04B 1/3827* | (2015.01) |
| *B62M 9/132* | (2010.01) |
| *B62J 99/00* | (2009.01) |

(52) U.S. Cl.  
CPC ............. *B62M 25/08* (2013.01); *B62K 23/00* (2013.01); *B62M 9/122* (2013.01); *B62M 9/132* (2013.01); *H04B 1/3827* (2013.01); *B62J 2099/004* (2013.01)

(58) Field of Classification Search  
CPC .............................. B62M 9/122; B62M 25/08  
See application file for complete search history.

(56) References Cited

U.S. PATENT DOCUMENTS

| | | | |
|---|---|---|---|
| 2009/0240858 A1* | 9/2009 | Takebayashi | B62M 25/08 710/110 |
| 2012/0322591 A1* | 12/2012 | Kitamura | B62J 6/06 474/80 |
| 2014/0087901 A1* | 3/2014 | Shipman | B62M 9/132 474/82 |
| 2014/0114538 A1* | 4/2014 | Shipman | B62M 9/132 701/51 |
| 2017/0101162 A1* | 4/2017 | Tachibana | B62M 25/08 |
| 2017/0113759 A1* | 4/2017 | Watarai | B62M 9/122 |
| 2017/0120983 A1* | 5/2017 | Komatsu | B62M 9/122 |
| 2018/0001960 A1* | 1/2018 | Pasqua | B62M 25/08 |

\* cited by examiner

*Primary Examiner* — Terence Boes  
(74) *Attorney, Agent, or Firm* — Global IP Counselors, LLP

(57) ABSTRACT

A bicycle electrical component is basically provided with a wireless communication unit, a movable member, an electrical actuation unit and a support structure. The wireless communication unit includes a first housing and a wireless communication member that is contained within the first housing. The electrical actuation unit includes a second housing and an electrical actuator that is contained within the second housing. The electrical actuator is configured to actuate the movable member. The second housing is different from the first housing. The support structure detachably supports the wireless communication unit to the bicycle electrical component.

38 Claims, 33 Drawing Sheets

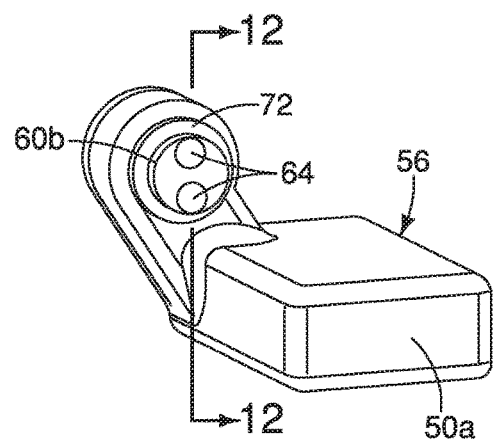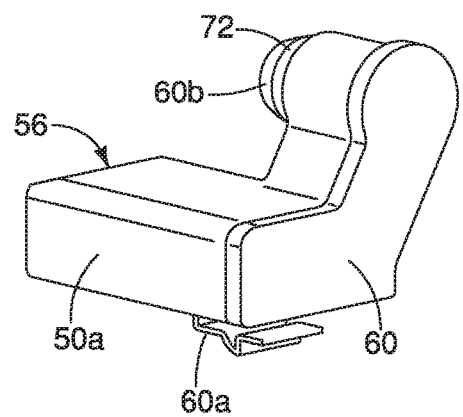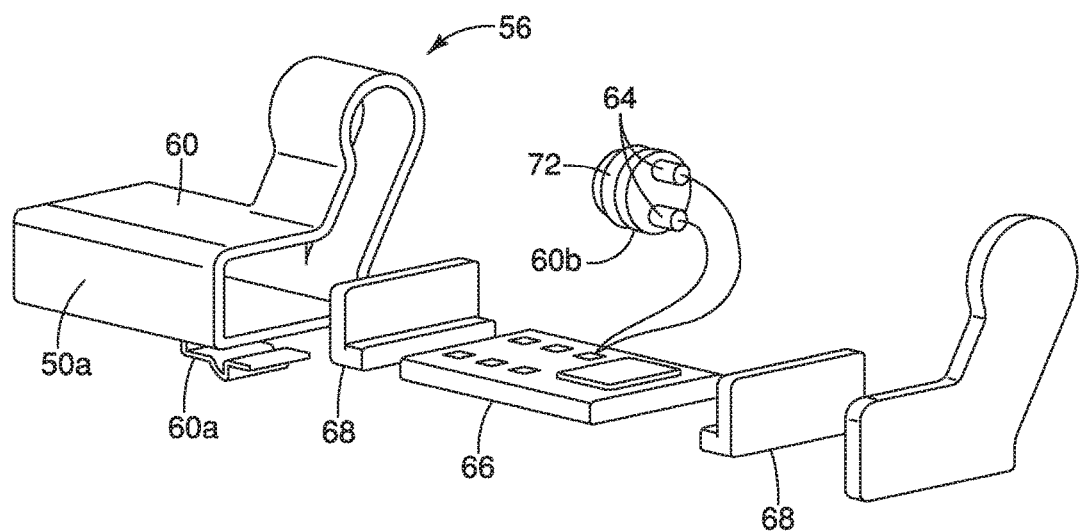

BICYCLE ELECTRICAL COMPONENT

CROSS-REFERENCE TO RELATED APPLICATIONS

This application is a continuation-in-part application of patent application No. 14/879,405 that was filed on Oct. 9, 2015. The entire disclosure of patent application No. 14/879,405 is hereby incorporated herein by reference.

BACKGROUND

Field of the Invention

This invention generally relates to a bicycle electrical component. More specifically, the present invention relates to a bicycle electrical component having a wireless communication unit that is detachably supported to the bicycle electrical component.

Background Information

In recent years, some bicycles are provided with electrical components or devices to make it easier for the rider to operate the bicycle. In more recent years, bicycle control systems exist that wirelessly control these bicycle electrical components or devices. A bicycle wireless system is advantageous in that electrical cables connecting bicycle electrical components to each other can be omitted. Examples of some these bicycle electrical components include suspensions, transmission devices (e.g., derailleurs, internally geared hubs, etc.) and seatposts. Typically, bicycles equipped with electric bicycle components are also provided with a battery for supply electrical power to the bicycle electrical components.

SUMMARY

Generally, the present disclosure is directed to various features of a bicycle electrical component having a wireless communication unit that is detachably supported to the bicycle electrical component.

In view of the state of the known technology and in accordance with a first aspect of the present disclosure, a bicycle electrical component is provided that basically comprises a wireless communication unit, a movable member, an electrical actuation unit and a support structure. The wireless communication unit includes a first housing and a wireless communication member that is contained within the first housing. The electrical actuation unit includes a second housing and an electrical actuator that is contained within the second housing. The electrical actuator is configured to actuate the movable member. The second housing is different from the first housing. The support structure detachably supports the wireless communication unit to the bicycle electrical component.

In accordance with a second aspect of the present invention, the bicycle electrical component according to the first aspect is configured so that the support structure is disposed on at least one of the first housing and the second housing.

In accordance with a third aspect of the present invention, the bicycle electrical component according to the second aspect is configured so that the support structure includes a first snap-fit structure and a second snap-fit structure that detachably engages the first snap fit structure. The first snap-fit structure is disposed on the first housing.

In accordance with a fourth aspect of the present invention, the bicycle electrical component according to the third aspect is configured so that one of the first and second snap-fit structures includes a latch and the other of the first and second snap-fit structures includes a catch.

In accordance with a fifth aspect of the present invention, the bicycle electrical component according to the second aspect is configured so that the support structure includes a recess within which the first housing is to be supported, the recess being formed on the second housing.

In accordance with a sixth aspect of the present invention, the bicycle electrical component according to the fifth aspect is configured so that the movable member includes a chain guide that is operatively coupled to the electrical actuation unit to move the chain guide between a first position and a second position; and the second housing having a frame facing surface that has the recess. The frame facing surface is configured to face a bicycle frame in a state where the bicycle electrical component is mounted to the bicycle frame.

In accordance with a seventh aspect of the present invention, the bicycle electrical component according to the second aspect is configured so that the wireless communication unit includes at least one of an electrical port and an electrical cable that is disposed at the first housing.

In accordance with an eighth aspect of the present invention, the bicycle electrical component according to the seventh aspect is configured so that the electrical actuation unit includes at least one electrical port disposed at the second housing. The at least one electrical port of the electrical actuation unit is configured to be electrically connected to the at least one of the electrical port and the electrical cable of the wireless communication unit.

In accordance with a ninth aspect of the present invention, the bicycle electrical component according to the first aspect is configured so that the wireless communication unit includes an electrical connector and the electrical actuation unit includes at least one electrical port that is configured to be connected to the electrical connector of the wireless communication unit.

In accordance with a tenth aspect of the present invention, the bicycle electrical component according to the ninth aspect is configured so that the at least one electrical port of the electrical actuation unit is configured to be selectively connected to an electrical cable upon disconnecting the electrical connector of the wireless communication unit from the at least one electrical port of the electrical actuation unit.

In accordance with an eleventh aspect of the present invention, the bicycle electrical component according to the ninth aspect is configured so that the wireless communication unit includes at least one electrical port that is configured to be connected to an electrical cable.

In accordance with a twelfth aspect of the present invention, the bicycle electrical component according to the eleventh aspect is configured so that the electrical connector of the wireless communication unit is configured to be connected to the electrical port of the electrical actuation unit in a first connecting direction, and the electrical port of the wireless communication unit is configured to be connected to the electrical cable in a second connecting direction that is different from the first connecting direction.

In accordance with a thirteenth aspect of the present invention, the bicycle electrical component according to the twelfth aspect is configured so that the first connecting direction is perpendicular to the second connecting direction.

In accordance with a fourteenth aspect of the present invention, the bicycle electrical component according to the eleventh aspect is configured so that the at least one electrical port of the electrical actuation unit and the at least one electrical port of the wireless communication unit have identical electrical connector mating structures.

In accordance with a fifteenth aspect of the present invention, the bicycle electrical component according to the ninth aspect is configured so that the wireless communication unit includes at least one of an electrical port and an electrical cable that is disposed at the first housing.

In accordance with a sixteenth aspect of the present invention, the bicycle electrical component according to the fifteenth aspect is configured so that the wireless communication unit includes a cap removably coupled to the first housing for selectively covering the at least one electrical port that is disposed at the first housing.

In accordance with a seventeenth aspect of the present invention, the bicycle electrical component according to the ninth aspect is configured so that the movable member includes a chain guide that is operatively coupled to the electrical actuation unit to move the chain guide between a first position and a second position; and further comprising a base member configured to support the electrical actuation unit and the chain guide. The at least one electrical port of the electrical actuation unit is formed between the base member and the second housing of the electrical actuation unit.

In accordance with an eighteenth aspect of the present invention, the bicycle electrical component according to the second aspect is configured so that the wireless communication unit includes a first electrical contact, and the electrical actuation unit includes a second electrical contact configured to electrically contact the first electrical contact in a state where the first housing is attached to the second housing.

In accordance with a nineteenth aspect of the present invention, the bicycle electrical component according to the eighteenth aspect is configured so that one of the wireless communication unit and the electrical actuation unit includes a seal configured to surround the first and second electrical contacts in the state where the first housing is attached to the second housing.

In accordance with a twentieth aspect of the present invention, the bicycle electrical component according to the eighteenth aspect further comprises a cover configured to cover the second electrical contact that is disposed on the second housing when the first electrical contact of the wireless communication unit is detached from the second electrical contact.

In accordance with a twenty-first aspect of the present invention, the bicycle electrical component according to the first aspect is configured so that the movable member includes a chain guide that is operatively coupled to the electrical actuation unit to move the chain guide between a first position and a second position; and further comprises a base member configured to support the electrical actuation unit and the chain guide. The support structure is formed between the base member and the second housing of the actuation unit.

In accordance with a twenty-second aspect of the present invention, the bicycle electrical component according to the twenty-first aspect is configured so that the support structure includes a first space formed between the base member and the second housing of the electrical actuation unit. The first housing is configured to be inserted into the first space.

In accordance with a twenty-third aspect of the present invention, the bicycle electrical component according to the twenty-second aspect is configured so that the wireless communication unit includes a first electrical contact, and the electrical actuation unit includes a second electrical contact that is configured to electrically contact the first electrical contact in a state where the first housing is disposed in the first space.

In accordance with a twenty-fourth aspect of the present invention, the bicycle electrical component according to the twenty-third aspect is configured so that the second electrical contact is disposed on a connecting surface facing in an insertion direction of the first housing into the first space.

In accordance with a twenty-fifth aspect of the present invention, the bicycle electrical component according to the first aspect is configured so that the support structure includes a second space formed within the second housing of the electrical actuation unit. The first housing is configured to be inserted into the second space.

In accordance with a twenty-sixth aspect of the present invention, the bicycle electrical component according to the twenty-fifth aspect is configured so that the wireless communication unit includes a first electrical contact disposed on the first housing, and the electrical actuation unit includes a second electrical contact that is disposed inside the second space and that is configured to electrically contact the first electrical contact in a state where the first housing is disposed in the second space.

In accordance with a twenty-seventh aspect of the present invention, the bicycle electrical component according to the twenty-sixth aspect is configured so that the second housing includes a cover configured to close an opening of the second space.

In accordance with a twenty-eighth aspect of the present invention, the bicycle electrical component according to the twenty-seventh aspect is configured so that the electrical actuation unit includes a seal configured to seal an interface between the second housing around the opening and the cover in a state where the cover closes the opening.

In accordance with a twenty-ninth aspect of the present invention, the bicycle electrical component according to the first aspect further comprises a power supply unit and a power supply bracket. The power supply unit is configured to supply an electrical power to the electrical actuation unit. The power supply bracket is configured to mount the power supply unit to the bicycle electrical component. The power supply bracket is configured to support the wireless communication unit to the bicycle electrical component as the support structure.

In accordance with a thirtieth aspect of the present invention, the bicycle electrical component according to the twenty-ninth aspect is configured so that the first housing is configured to be detachably supported to the power supply bracket.

In accordance with a thirty-first aspect of the present invention, the bicycle electrical component according to the twenty-ninth aspect is configured so that the power supply bracket is configured to contain the wireless communication member.

In accordance with a thirty-second aspect of the present invention, the bicycle electrical component according to the twenty-ninth aspect is configured so that the first housing is configured to be detachably supported to the power supply unit.

In accordance with a thirty-third aspect of the present invention, the bicycle electrical component according to the twenty-ninth aspect is configured so that the power supply unit is configured to contain the wireless communication member.

In accordance with a thirty-fourth aspect of the present invention, the bicycle electrical component according to the twenty-ninth aspect is configured so that the power supply unit includes at least one of an electrical port and an electrical cable.

In accordance with a thirty-fifth aspect of the present invention, the bicycle electrical component according to the thirty-fourth aspect is configured so that the electrical actuation unit includes at least one electrical port disposed at the second housing.

In accordance with a thirty-sixth aspect of the present invention, the bicycle electrical component according to the twenty-ninth aspect is configured so that the power supply bracket includes a third contact, and the power supply unit includes a fourth contact that is configured to electrically contact the third contact in a state where the power supply unit is mounted to the power supply bracket.

In accordance with a thirty-seventh aspect of the present invention, the bicycle electrical component according to the twenty-ninth aspect further comprises a base member configured to mount the electrical actuation unit to a bicycle frame, and a fastener configured to fix the base member to the bicycle frame. The power supply bracket includes a mounting portion configured to be mounted to the bicycle frame by the fastener.

In accordance with a thirty-eighth aspect of the present invention, the bicycle electrical component according to the first aspect is configured so that the wireless communication unit is configured to be detachably supported to an additional bicycle electrical component different from the bicycle electrical component.

Also other objects, features, aspects and advantages of the disclosed bicycle electrical component will become apparent to those skilled in the art from the following detailed description, which, taken in conjunction with the annexed drawings, discloses one illustrative embodiment of the bicycle electrical component.

BRIEF DESCRIPTION OF THE DRAWINGS

Referring now to the attached drawings which form a part of this original disclosure:

FIG. 9 is a first perspective view of the wireless communication unit for the front derailleur illustrated in FIGS. 3 to 8;

FIG. 10 is a second perspective view of the wireless communication unit for the front derailleur illustrated in FIGS. 3 to 8;

FIG. 11 is an exploded perspective view of the wireless communication unit for the front derailleur illustrated in FIGS. 3 to 8;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
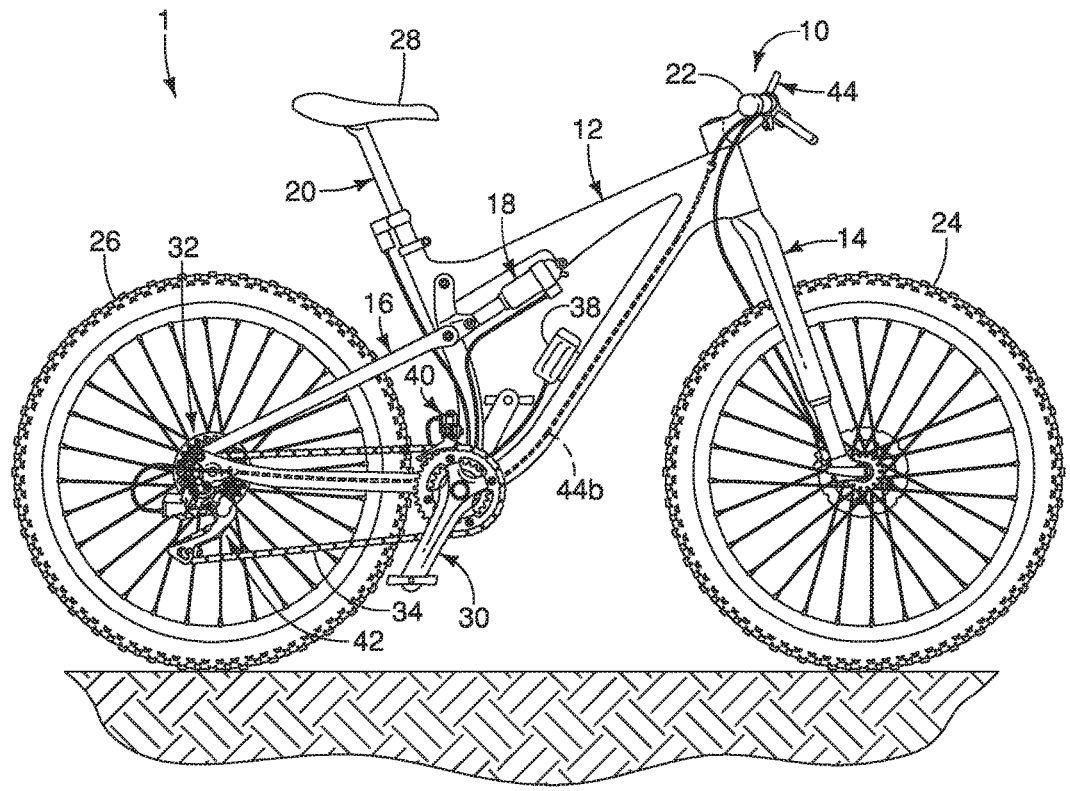
FIG. 1 is a side elevational view of a bicycle that is equipped with bicycle electrical components (i.e. a front derailleur, a rear derailleur, a front suspension, a rear suspension and an adjustable seatpost) that each includes a wireless communication unit in accordance with a first embodiment.

Referring initially to FIG. 1, a bicycle 1 is illustrated that is equipped with a wireless communication system 10 in accordance with a first embodiment. In FIG. 1, the bicycle 1 is a dual suspension (off road) bicycle. However, the wireless communication system 10 discussed herein is not limited to the illustrated bicycle, but rather can be adapted to other types of bicycles such as a road bicycle with a drop handlebar.

The bicycle 1 includes a main bicycle frame 12, a front suspension fork 14 (i.e., a bicycle front suspension), a rear swing arm 16, a rear shock 18 (i.e., a bicycle rear suspension) and an adjustable seatpost 20. A handlebar 22 is fixed to the top of the front suspension fork 14 in order to steer the bicycle 1. The lower end of the front suspension fork 14 rotatably supports a front wheel 24. The rear swing arm 16 is pivotally mounted to the main bicycle frame 12, and rotatably supports a rear wheel 26. A bicycle seat or saddle 28 is mounted to the adjustable seatpost 20, which is adjustably mounted to the main bicycle frame 12. The bicycle 1 further includes a drive train having a front pedal crankset 30, a rear sprocket cassette 32 and a chain 34. The bicycle 1 further includes a power supply unit 38 (i.e., a rechargeable battery). The bicycle 1 further includes a front derailleur 40 and a rear derailleur 42 for changing speeds of the drive train. The front derailleur 40 is mounted on the main bicycle frame 12, while the rear derailleur 42 is mounted on the rear swim arm 16.

In the illustrated embodiment, the front suspension fork 14, the rear shock 18, the adjustable seatpost 20, the front derailleur 40 and the rear derailleur 42 are examples of bicycle electrical components that are adjustable between at least two operation modes. Thus, in certain instances herein, the front suspension fork 14, the rear shock 18, the adjustable seatpost 20, the front derailleur 40 and the rear derailleur 42 will be collectively referred to as bicycle electrical components. As explained below, the bicycle electrical components 14, 18, 20, 40 and 42 are configured for both wireless communications and for wired communications. In FIG. 1, the bicycle electrical components 14, 18, 20, 40 and 42 are set up for wireless communications. Since bicycle electrical components such as the bicycle electrical components 14, 18, 20, 40 and 42 illustrated herein are well known in the bicycle field, the bicycle electrical components 14, 18, 20, 40 and 42 will only be discussed to the extent needed to understand the modifications made to carry out the present invention. Also, the bicycle electrical components 14, 18, 20, 40 and 42 are not limited to the electric bicycle components and the particular arrangements disclosed herein. Rather, the wireless communication system 10 can have any combination of the bicycle electrical components 14, 18, 20, 40 and 42 as well as other bicycle electrical components (not shown) as needed and/or desired.

Figure 2:
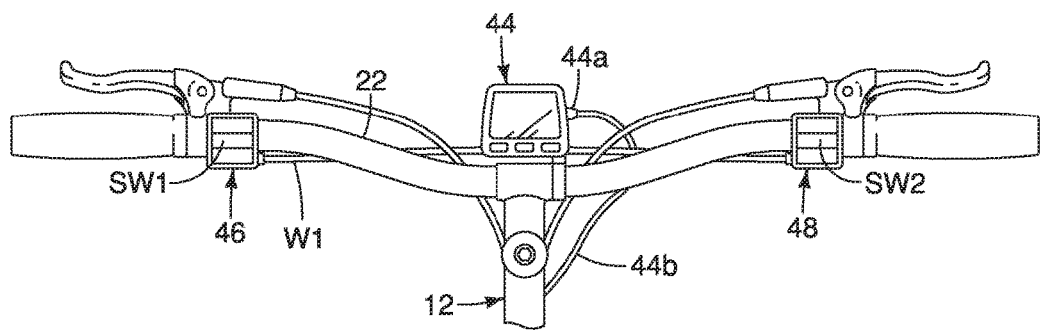
FIG. 2 is a top view of a bicycle handlebar area of the bicycle illustrated in FIG. 1.

As seen in FIG. 2, the handlebar 22 is provided with a cycle computer 44, a first electrical component operating device 46 and a second electrical component operating device 48. The cycle computer 44, the first electrical component operating device 46 and the second electrical component operating device 48 form a control part of the wireless communication system 10 that controls the operations of the front suspension fork 14, the rear shock 18, the adjustable seatpost 20, the front derailleur 40 and the rear derailleur 42. The bicycle 10 further includes numerous other components that are typically installed on a bicycle, but that are not related to the wireless communication system 10 discussed herein.

As seen in FIG. 2, the first electrical component operating device 46 includes a first manually operated input member SW1, while the second electrical component operating device 48 includes a second manually operated input member SW2. The first and second manually operated input members SW1 and SW2 can be used to control one or two of the bicycle electrical components 14, 18, 20, 40 and 42. At least one of the input members SW1 and SW2 can include a wireless transmitter to transmit a wireless signal, such as a shifting signal, to the wireless communication unit as the present invention.

Here, the cycle computer 44 includes a wireless communication unit (not shown) for wirelessly transmitting and/or receiving signals and data to the bicycle electrical components 14, 18, 20, 40 and 42 based on operation signals from the first and second electrical component operating devices 46 and 48. Thus, the wireless communication unit of the cycle computer 44 is a two-way wireless communication unit that conducts two-way wireless communications using a wireless receiver and a wireless transmitter. In the illustrated embodiment, the cycle computer 44 includes a power line communications port 44a in which an electrical cord 44b is plugged into for transmitting control signals to the wiring junction (not shown) via the electrical cord 44b using power line communications. Thus, the cycle computer 44 can be used for wireless communications and/or power line communications, as needed and/or desired. Of course, in a purely wireless configuration, the electrical cord 44b is not required for communicating between the cycle computer 44 and the bicycle electrical components 14, 18, 20, 40 and 42.

The wireless control signals of the cycle computer 44 can be radio frequency (RF) signals or any other type of signal suitable for wireless communications as understood in the bicycle field. It should also be understood that the second wireless communication unit of the cycle computer 44 can transmit the signals at a particular frequency and/or with an identifier such as a particular code, to distinguish the wireless control signal from other wireless control signals. In this way, the bicycle electrical components 14, 18, 20, 40 and 42 can recognize which control signals are to be acted upon and which control signals to be acted. For example, the front derailleur 40 and the rear derailleur 42 can recognize which control signals are upshifting signals, and which control signals are downshifting signals. Thus, the front derailleur 40 can ignore the control signals for the rear derailleur 42.

Also while the first and second electrical component operating devices 46 and 48 are illustrated as being connected by control wires W1 and W2, it will be apparent from this disclosure that each of the first and second electrical component operating devices 46 and 48 can include a wireless communication unit (not shown) that either directly communicates with the bicycle electrical components 14, 18, 20, 40 and 42, or communicates with the bicycle electrical components 14, 18, 20, 40 and 42 via the cycle computer 44. In the present invention, the wireless communication unit can be used for a wireless communication with other devices, such as a smart-phone or a personal computer, for updating firmware stored in a memory disposed in at least one of the bicycle electrical component, for example.

The cycle computer 44 is programmed to selectively output wireless control signals to selectively control the bicycle electrical components 14, 18, 20, 40 and 42. More specifically, the cycle computer 44 includes a suspension adjustment program, a seatpost adjustment program and a shifting program stored in memory. The cycle computer 44 is configured so that the user can select a suspension adjustment mode, a seatpost adjustment mode and a shifting mode. In the suspension adjustment mode, the operation signals outputted from the first and second electrical component operating devices 46 and 48 are used by the cycle computer 44 to selectively control one or both of the front suspension fork 14 and the rear shock 18 based on the suspension adjustment program stored in the memory of the cycle computer 44. In the seatpost adjustment mode, the operation signals outputted from the first and second electrical component operating devices 46 and 48 are used by the cycle computer 44 to selectively control the adjustable seatpost 20 based on the seatpost adjustment program stored in the memory of the cycle computer 44. In the shifting mode, the operation signals outputted from the first and second electrical component operating devices 46 and 48 are used b the cycle computer 44 to selectively control one or both of the front derailleur 40 and the rear derailleur 42 based on the shifting program stored in the memory of the cycle computer 44.

Figure 3:
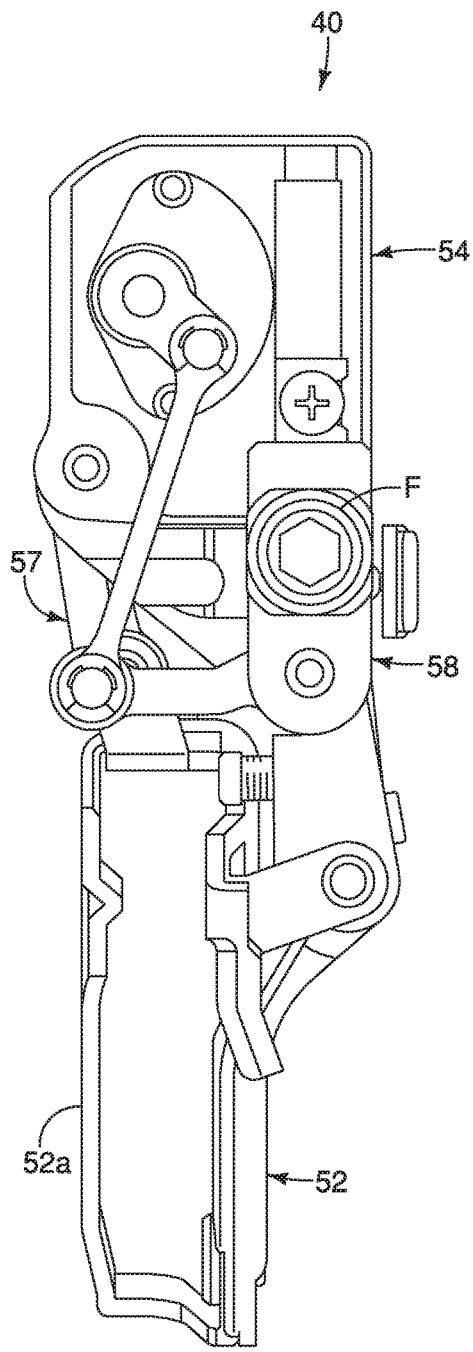
FIG. 3 is an enlarged front end elevational view of the front derailleur (i.e., one of bicycle electrical components) illustrated in FIG. 1 in the retracted position.
Figure 4:
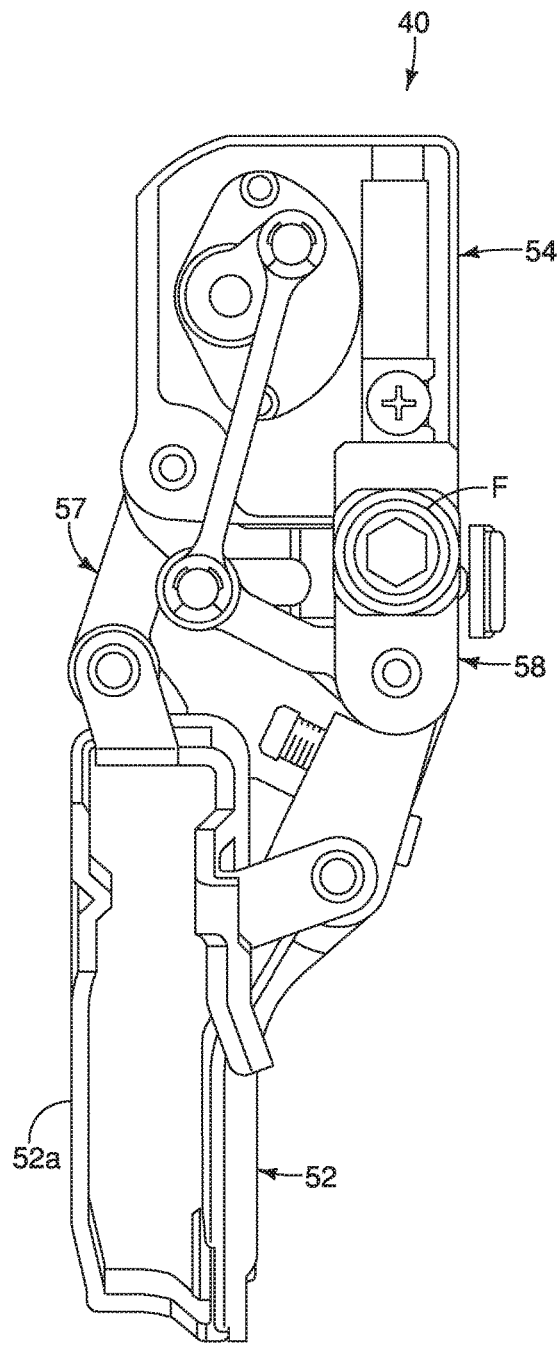
FIG. 4 is an enlarged front end elevational view of the front derailleur illustrated in FIG. 3 with the chain guide in the retracted position.
Figure 5:
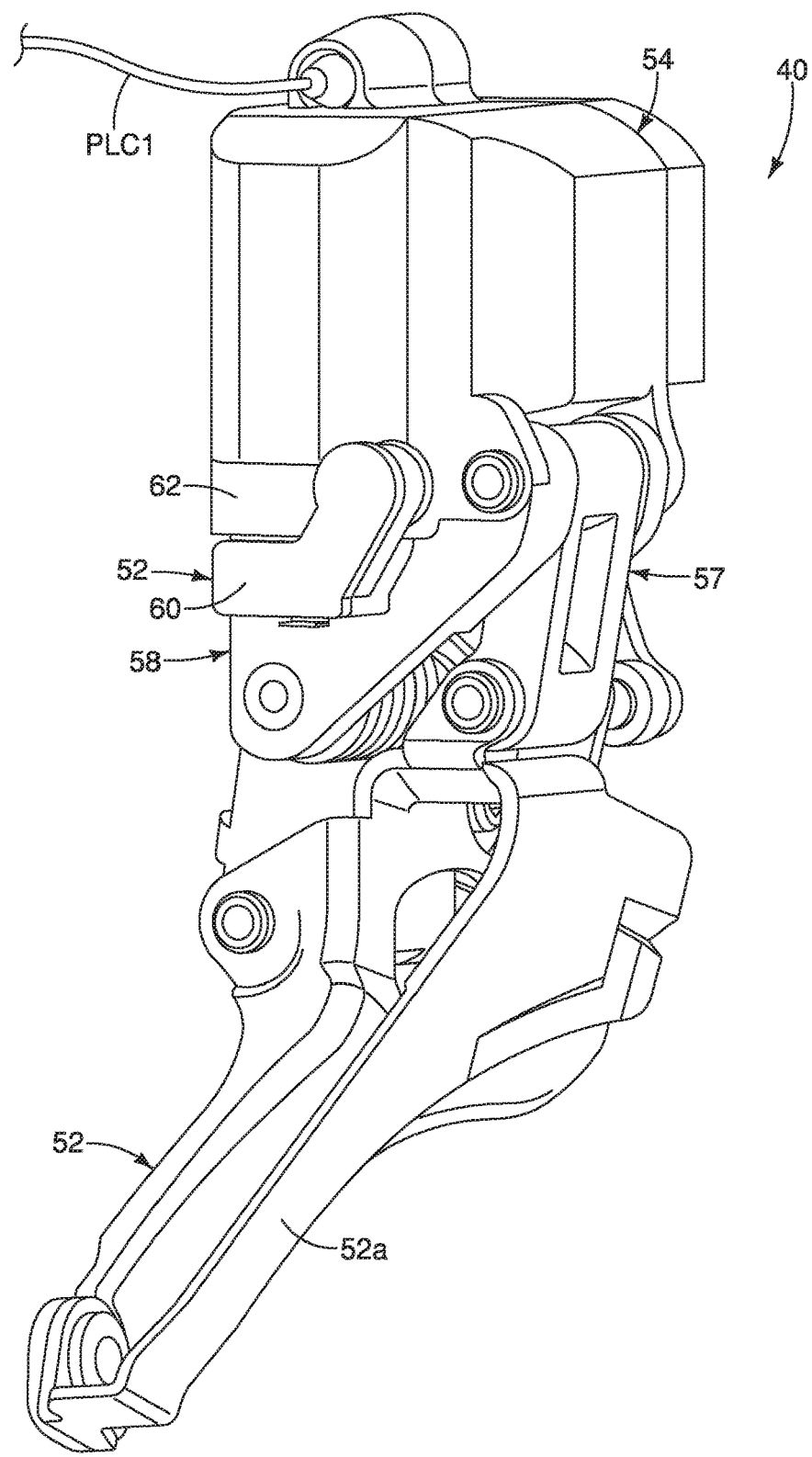
FIG. 5 is an outside rear perspective view of the front derailleur illustrated in FIGS. 3 and 4 with the chain guide in the retracted position.
Figure 6:
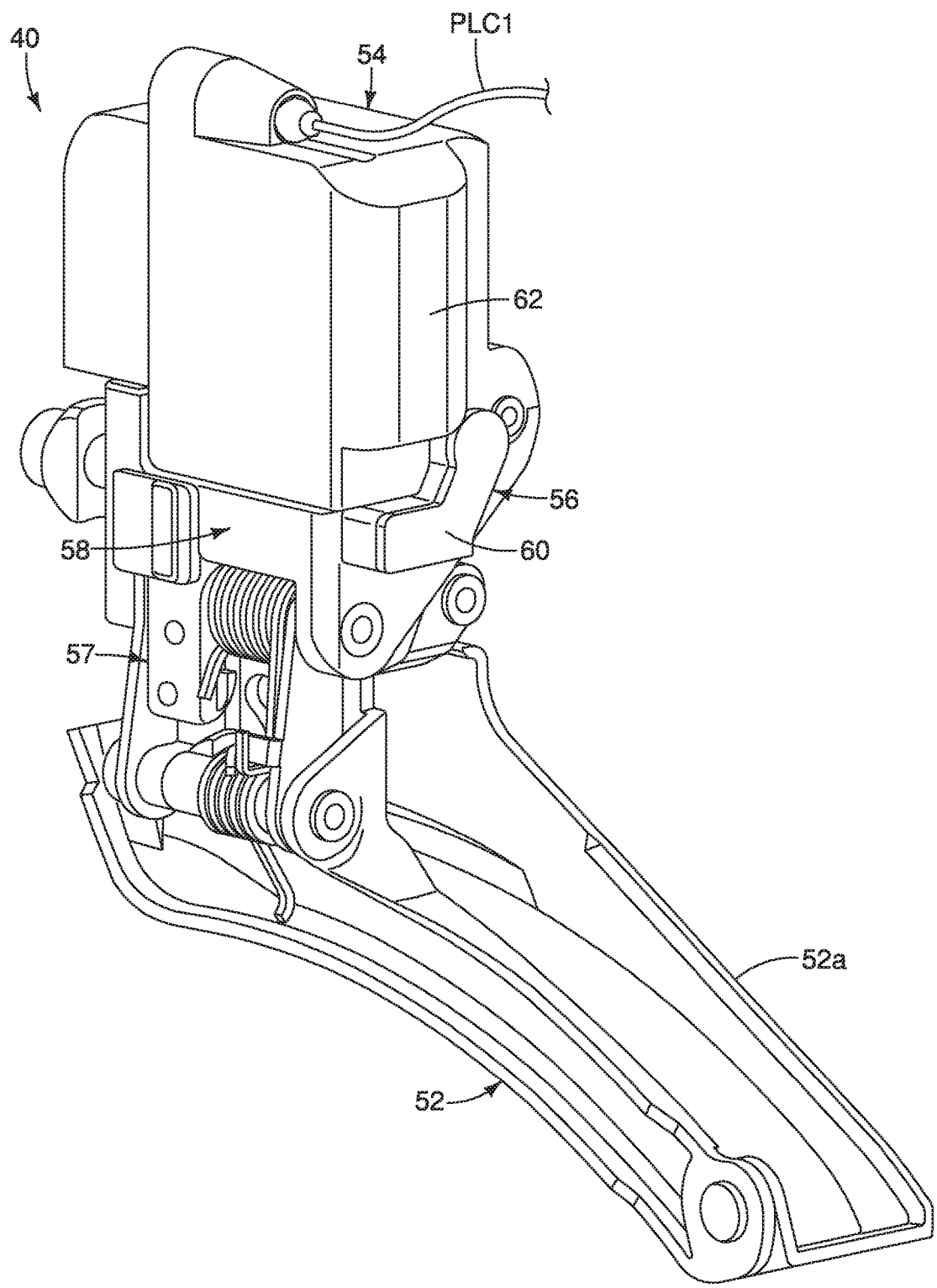
FIG. 6 is an inside rear perspective view of the front derailleur illustrated in FIGS. 3 to 5 showing the wireless communication unit in an installed position.

Turning now to FIGS. 3 to 13, the front derailleur 40 will now be discussed in more detail. Basically, the front derailleur 40 (the bicycle electrical component) comprises a support structure 50, a movable member 52, an electrical actuation unit 54 and a wireless communication unit 56. Here, the movable member 52 includes a chain guide 52*a*. As seen in FIGS. 3 and 4, the chain guide 52*a* is operatively coupled to the electrical actuation unit 54 to move the chain guide 52*a* between a first (retracted) position and a second (extended) position by a linkage 57. Also, the front derailleur 40 (the bicycle electrical component) further comprises abuse member 58 that is configured to mount the electrical actuation unit 54 to the bicycle frame 12. Alternatively, the electrical actuation unit 54 can directly mounted to the bicycle frame 12. The base member 58 is configured to support the electrical actuation unit 54. Also, the base member 58 is configured to support the chain guide 52*a* via the linkage 57.

As seen in FIGS. 5 to 8, an electrical cable (power supply line) PLC1 has a first end detachably connected to the electrical actuation unit 54 for supplying electrical power from the power supply unit 38. The electrical cable PLC1 has a second end detachably connected to a wiring junction (not shown) for receiving electrical power and/or control signals via power line communications. When the wireless communication unit 56 is installed on the front derailleur 40 and wirelessly receiving control signals from the cycle computer 44, the electrical cable PLC1 only supplies electrical power to the electrical actuation unit 54. However, when the wireless communication unit 56 is not installed or not being used, the electrical cable PLC1 can be used to transmit control signals from the cycle computer 44 to the electrical actuation unit 54 via the electrical cord 44*b* and the wiring junction (not shown) using power line communications.

Figure 7:
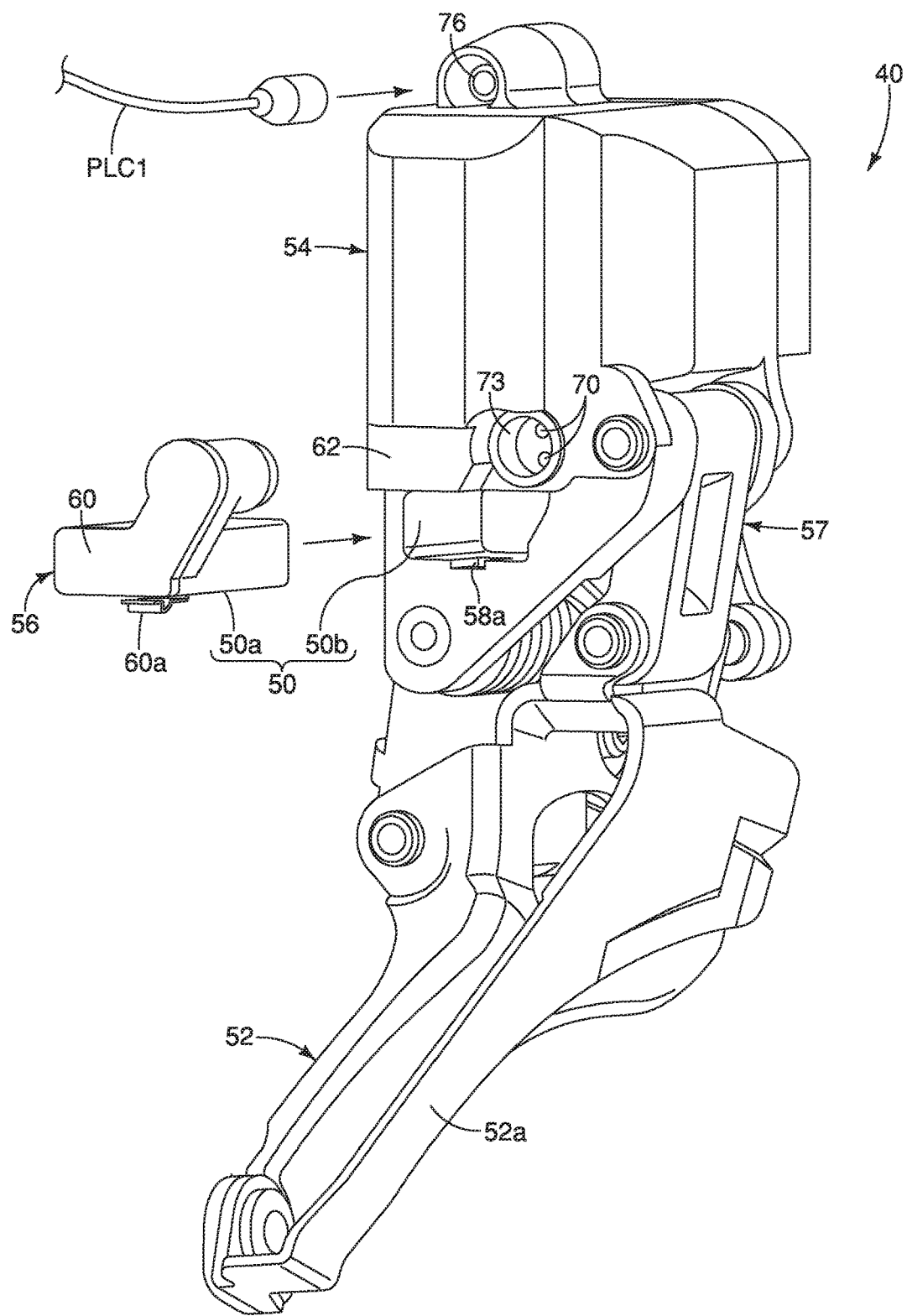
FIG. 7 is an outside rear perspective view of the front derailleur illustrated in FIGS. 3 to 6 showing the wireless communication unit in an uninstalled position.
Figure 8:
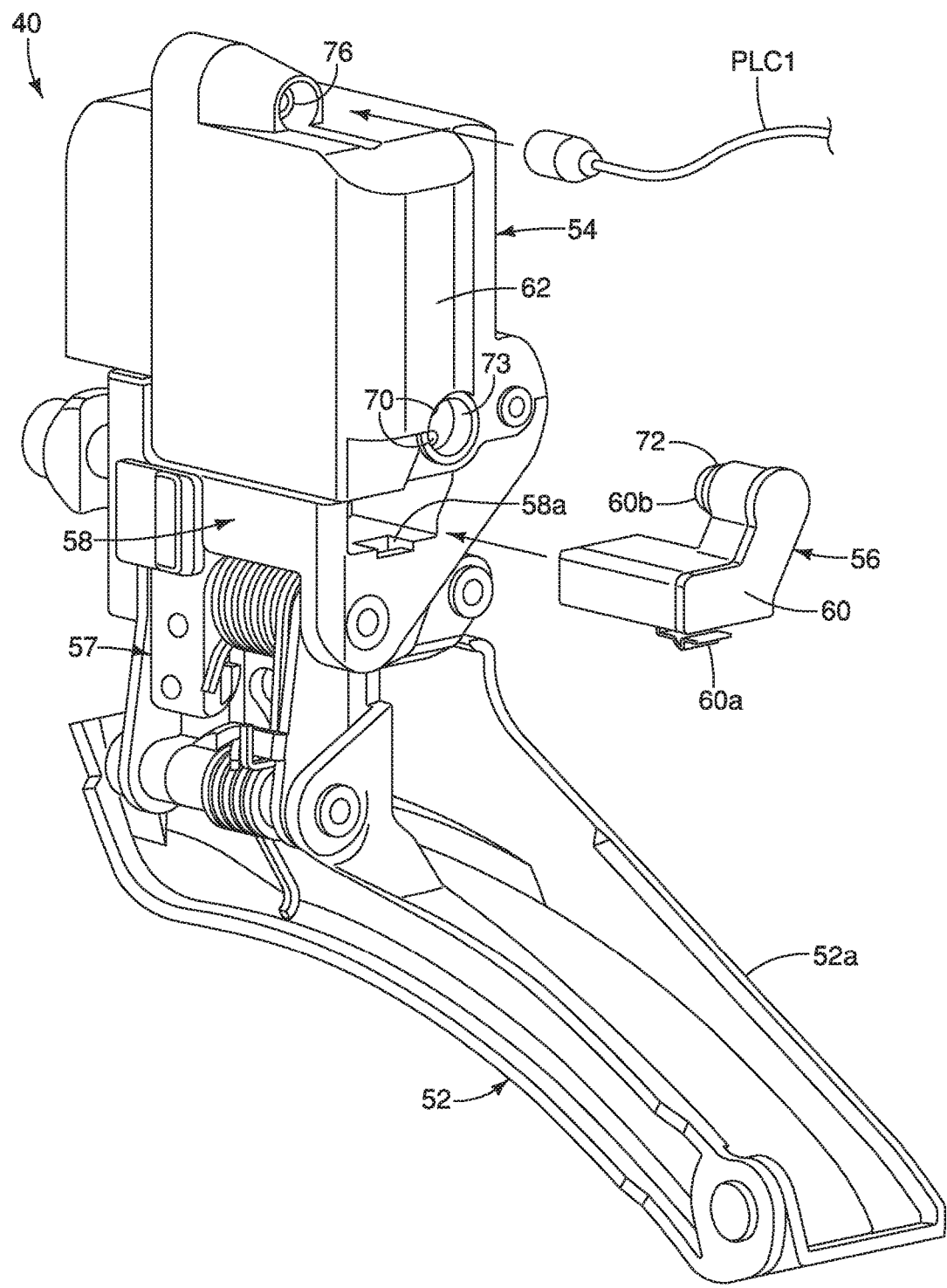
FIG. 8 is an inside rear perspective view of the front derailleur illustrated in FIGS. 3 to 7 showing the wireless communication unit in the uninstalled position.

In the front derailleur 40, the support structure 50 is partially defined by the electrical actuation unit 54 and partially defined by the wireless communication unit 56, In particular, the wireless communication unit 56 includes a first housing 60. The electrical actuation unit 54 includes a second housing 62. The second housing 62 is different from the first housing 60 (i.e., the first and second housings 60 and 62 are separate and distinct members). The support structure 50 is disposed on at least one of the first housing 60 and the second housing 62. Here, the support structure 50 includes a mating portion 50*a* (projecting portion) for engaging the second housing 62 and/or the base member 58. The support structure 50 includes a first space 50*b* that is formed between the base member 58 and the second housing 62 of the electrical actuation unit 54 within which the mating portion 50*a* of the first housing 60 is to be supported. As seen in FIGS. 7 and 8, the first housing 60 is configured to be inserted into the first space 50*b*.

Figure 12:
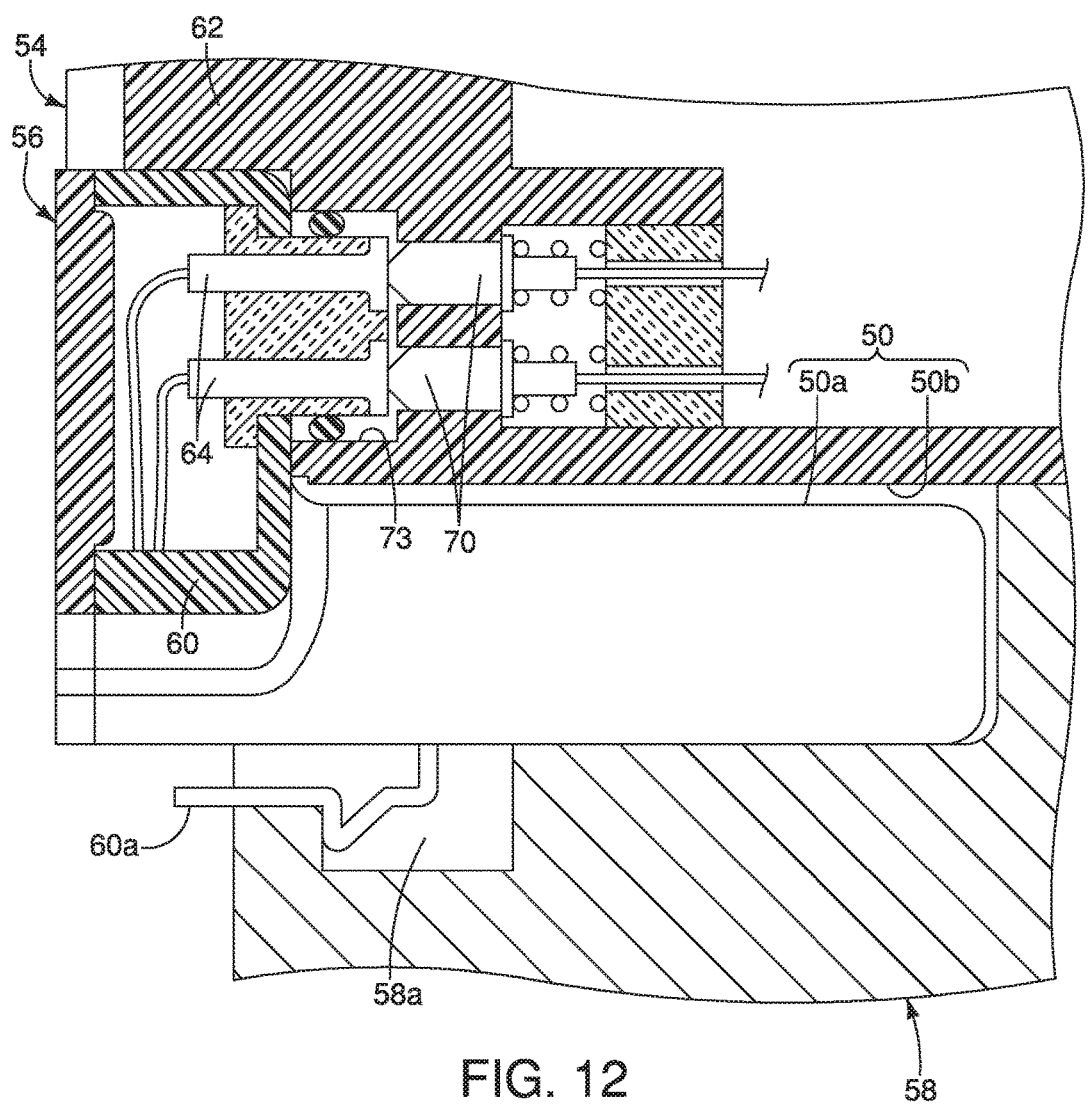
FIG. 12 is a partial cross sectional view of the wireless communication unit for the front derailleur illustrated in FIGS. 3 to 8 as seen along section line 12-12 of FIG. 9.

As best seen in FIG. 12, the support structure 50 includes a first snap-fit structure 60*a* and a second snap-fit structure 58*a* that detachably engages the first snap fit structure 60*a*. In the front derailleur 40, the first snap-fit structure 60*a* is disposed on the first housing 60, while the second snap-fit structure 58*a* is disposed on the base member 58. Alternatively, the first snap-fit structure 60*a* can be arranged to engage a second snap-fit structure that is disposed on the second housing 62 of the electrical actuation unit 54. One of the first and second snap-fit structures 60*a* and 58*a* includes a latch and the other of the first and second snap-fit structures 60*a* and 58*a* includes a catch. In the front derailleur 40, the first snap-fit structure 60*a* is a latch and the second snap-fit structure 58*a* is a catch. In this way, the support structure 50 detachably supports the wireless communication unit 56 to the front derailleur 40 (the bicycle electrical component). Instead of or in addition to the snap-fit connection, a screw and threaded hole type connection can be used to detachably supports the wireless communication unit 56 to the front derailleur 40.

Referring to FIGS. 9 to 11, the wireless communication unit 56 includes a pair of first electrical contacts 64. The wireless communication unit 56 further includes a wireless communication member 66 that is contained within the first housing 60, The first electrical contacts 64 are electrically connected to the wireless communication member 66. The wireless communication member 66 is a printed circuit board with a two-way wireless communication circuit printed thereon. Preferably, the printed circuit board of the wireless communication member 66 includes an antenna for transmitting and receiving wireless signals. The wireless communication unit 56 further includes a pair of cushioning members 68 for stabilizing the wireless communication member 66 within the first housing 60.

As seen in FIG. 12, the electrical actuation unit 54 includes a pair of second electrical contacts 70. The second electrical contacts 70 are configured to electrically contact the first electrical contacts 64 in a state where the first housing 60 is disposed in the first space 50*b*. In the front derailleur 40, the second electrical contacts 70 are spring loaded contacts. The second electrical contacts 70 are disposed on a connecting surface 62*a* that faces in an insertion direction (indicated as an arrow in FIG. 12) of the first housing 60 into the first space 50*b*.

One of the wireless communication unit 56 and the electrical actuation unit 54 includes a seal 72 configured to surround the first and second electrical contacts 64 and 70 in the state where the first housing 60 is attached to the second housing 62, The seal 72 is an elastomer member in the form of an O-ring is disposed on an attachment surface 60*b* of the first housing 60 around the first electrical contacts 64. Alternatively, the seal 72 can be mounted on the second housing 62. The second housing 62 of the electrical actuation unit 54 together with the second electrical contacts 70 define an electrical port 73 that receives the part of the first housing 60 that defines the attachment surface 60b.

Figure 13:
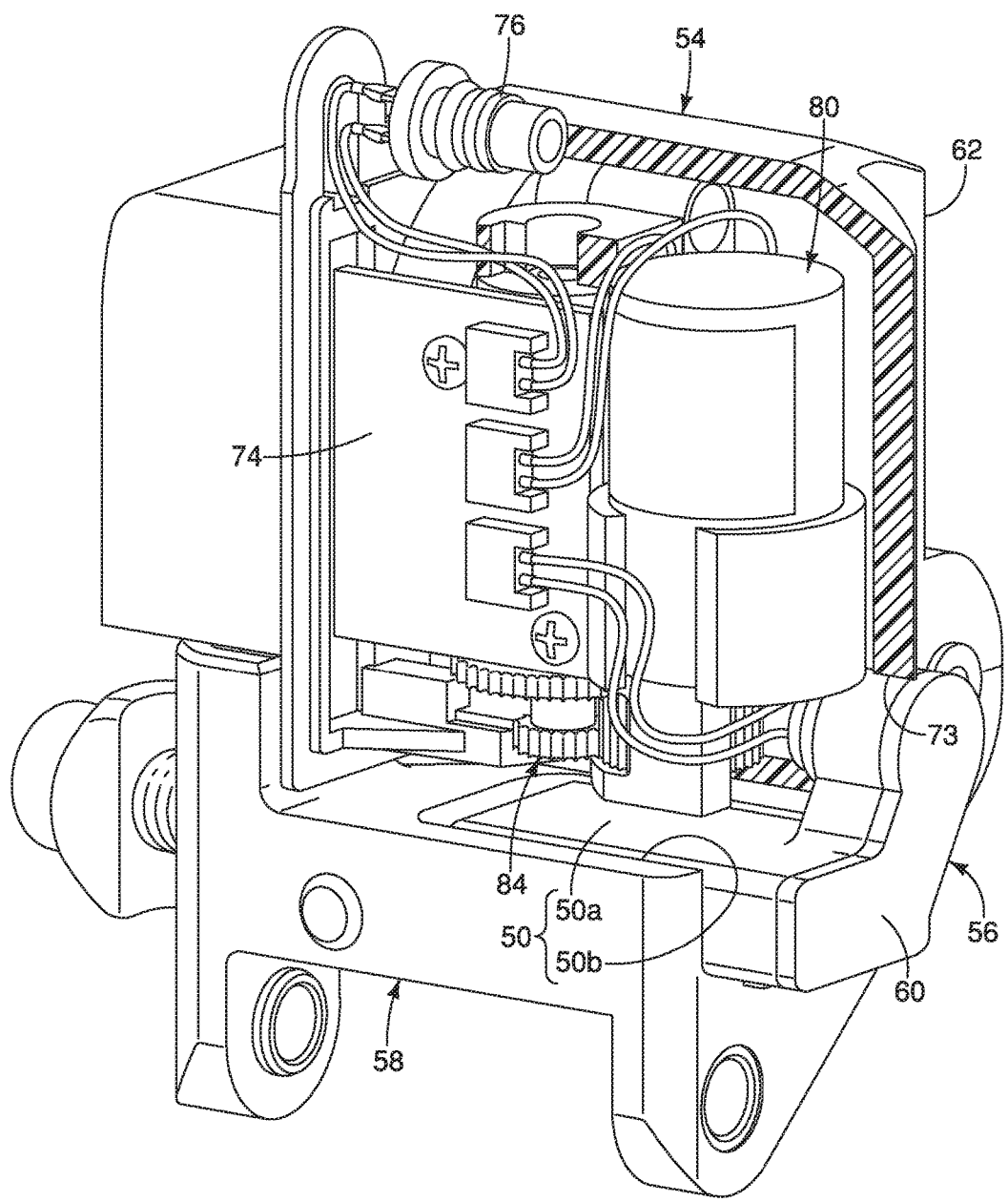
FIG. 13 is an inside rear perspective view of the front derailleur illustrated in FIGS. 3 to 8 with a portion of a housing of an electrical actuation unit of the front derailleur broken away to show internal parts of the electrical actuation unit.

As seen in FIG. 13, the electrical actuation unit 54 has a printed circuit board. 74 and a first electrical port 76 electrically connected to the printed circuit board 74. The first electrical port 76 is configured for detachably and reattachably connecting to the electrical connector of the electrical cable PLC1 thereto. The second electrical contacts 70 are also electrically connected to the printed circuit board 74. The electrical actuation unit 54 further includes a controller 78 that is disposed on a printed circuit board 74. The controller 78 includes a central processing unit (CPU). Preferably, the electrical actuation unit 54 further includes one or more storage devices such as a ROM (Read Only Memory) device, a RAM (Random Access Memory) device and/or a FLASH memory device.

As seen in FIG. 13, the electrical actuation unit 54 includes an electrical actuator 80 that is contained within the second housing 62. The electrical actuator 80 is electrically connected to the printed circuit board 74. In the front derailleur 40, the electrical actuator 80 is a reversible electric motor. The electrical actuator 80 is configured to actuate the movable member 52. The electrical actuation unit 54 further includes a gear reduction unit 82 that is connected to the electrical actuator 80 and that transmits the rotational movement of the output shaft of the electrical actuator 80 to a swinging movement of the chain guide 52a via a linkage 54. A position sensor (not shown) is provided to the gear reduction unit 82 for detecting an amount of rotational movement being outputted by the gear reduction unit 82. The printed circuit board 74 is provided with an actuator driver (not shown) for controlling the electrical actuator 80 and a position detection circuit (not shown) for determining the amount of rotational movement is being outputted by the gear reduction unit 82. Position sensors, actuator (motor) drivers and position detection circuits are well known in the bicycle field, and thus, they will not be discussed herein.

Figure 14:
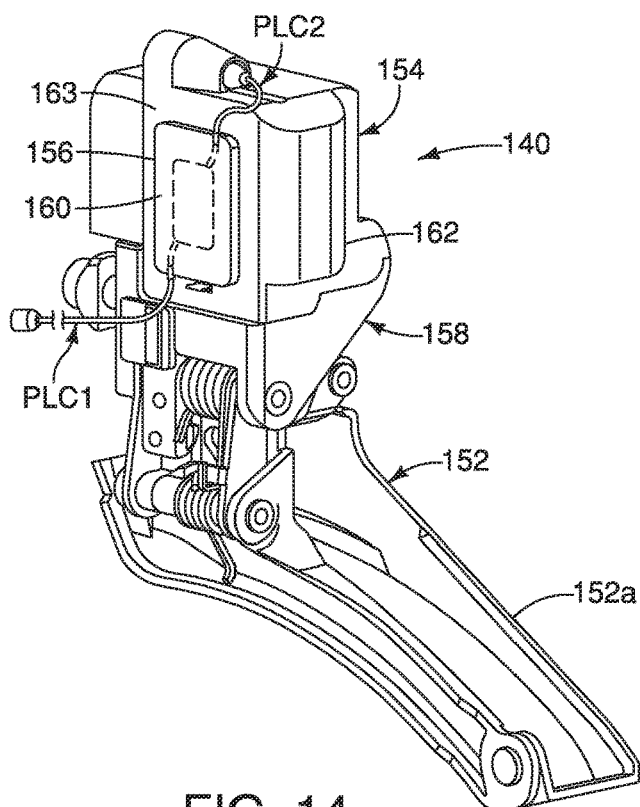
FIG. 14 is an inside rear perspective view of a front derailleur having a wireless communication unit in accordance with a second embodiment showing the wireless communication unit in an installed position.
Figure 15:
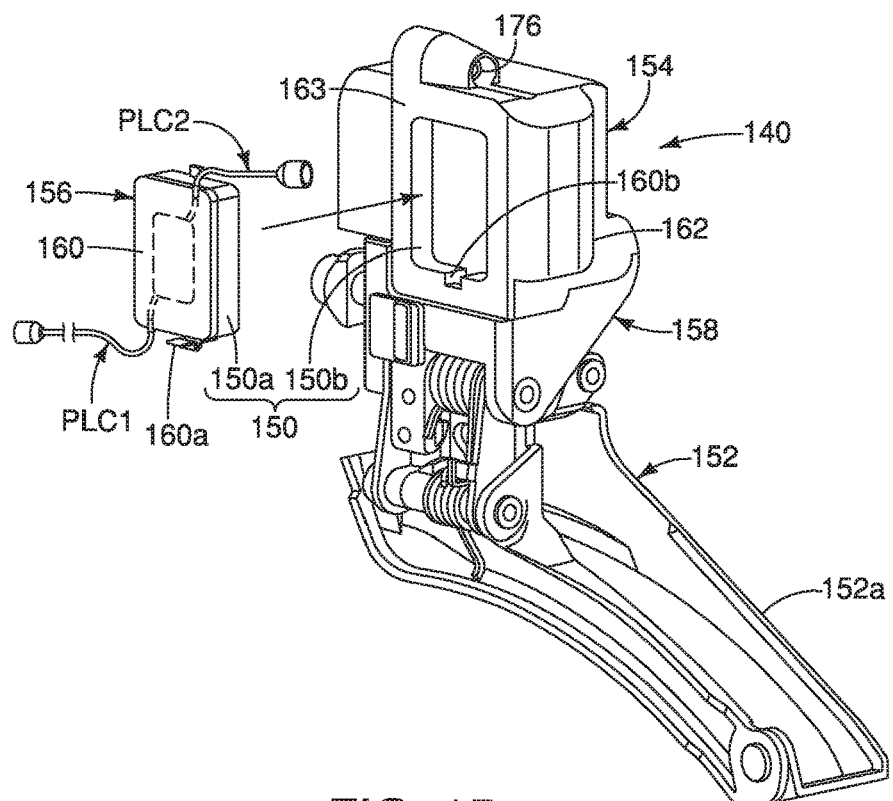
FIG. 15 is an inside rear perspective view of the front derailleur illustrated in FIG. 14 showing the wireless communication unit in an uninstalled position.

Turning now to FIGS. 14 and 15, a front derailleur 140 will now he discussed in accordance with a second embodiment. The front derailleur 140 can be mounted to the bicycle frame 12 in place of the front derailleur 40 so as to be operated by one or both of the first and second electrical component operating devices 46 and 48. Basically, the front derailleur 140 (the bicycle electrical component) comprises a support structure 150, a movable member 152, an electrical actuation unit 154 and a wireless communication unit 156. Here, the front derailleur 140 (the bicycle electrical component) further comprises a base member 158 that is configured to mount the electrical actuation unit 154 to the bicycle frame 12. Alternatively, the electrical actuation unit 154 can directly mounted to the bicycle frame 12. Also, the movable member 152 includes a chain guide 152a that is operatively coupled to the electrical actuation unit 154 to move the chain guide 152a between a first position and a second position similar to the first embodiment as discussed above.

Here in the second embodiment, the front derailleur 140 is identical to the front derailleur 40, discussed above, except that the support structure 150 and the electrical actuation unit 154 have been modified so that the wireless communication unit 156 is mounted directly to the electrical actuation unit 154 and the wireless communication unit 156 includes a pair of electrical cables PLC1 and PLC2 (power line communication lines) electrically connected to the printed circuit board of the wireless communication member (not shown) inside of the wireless communication unit 156 instead of the electrically contacts of the wireless communication unit 56.

In the front derailleur 140, the support structure 150 is partially defined by the electrical actuation unit 154 and partially defined by the wireless communication unit 156. In particular, the wireless communication unit 156 includes a first housing 160. The electrical actuation unit 154 includes a second housing 162. The support structure 150 includes a mating portion 150a (projecting portion) for engaging the second housing 162. The support structure 150 includes a recess 150b within which the mating portion 150a of the first housing 160 is to be supported. The recess 150b is formed on the second housing 162. In the front derailleur 140, the second housing 162 has a frame facing surface 163 that has the recess 150b. The frame facing surface 163 is configured to face the bicycle frame 12 in a state where the front derailleur 140 (i.e., the bicycle electrical component) is mounted to the bicycle frame 12.

The support structure 150 detachably supports the wireless communication unit 156 to the front derailleur 140 (the bicycle electrical component). Similar to the first embodiment, the support structure 150 includes a first snap-fit structure 160a and a second snap-fit structure 162a that detachably engages the first snap fit structure 160a. In the front derailleur 140, the first snap-fit structure 160a is disposed on the first housing 160, while the second snap-fit structure 162a is disposed on the second housing 162. In the front derailleur 140, the first snap-fit structure 160a is a latch and the second snap-fit structure 162a is a catch. In this way, the support structure 150 detachably supports the wireless communication unit 156 to the front derailleur 140 (the bicycle electrical component).

In the front derailleur 140, the wireless communication unit 156 includes a wireless communication member 166 that is contained within the first housing 160. The wireless communication member 166 is a printed circuit board with a two-way wireless communication circuit printed thereon. Preferably, the printed circuit board of the wireless communication member 166 includes antenna for transmitting and receiving wireless signals. The electrical cables PLC1 and PLC2 of the wireless communication unit 156 are non-detachably connected to the printed circuit board of the wireless communication member 166. The electrical cable PLC1 is configured to be plugged into the wiring junction (not shown) and the electrical cable PLC1 is configured to be plugged into an electrical port 176 of the electrical actuation unit 154. this way, the power supply unit 38 supplies electrical power to the electrical actuation unit 154 and the wireless communication unit 156.

While the wireless communication unit 156 includes the electrical cables PLC1 and PLC2, it will be apparent from this disclosure that other wiring arrangements are possible. Basically, the wireless communication unit 156 includes at least one of an electrical port (plug-in terminal) and an electrical cable that is disposed at the first housing 160. Thus, the electrical actuation unit 154 includes at least one electrical port disposed at the second housing 162. The at least one electrical port of the electrical actuation unit 154 is configured to be electrically connected to the at least one of the electrical port and the electrical cable of the wireless communication unit 156.

Figure 16:
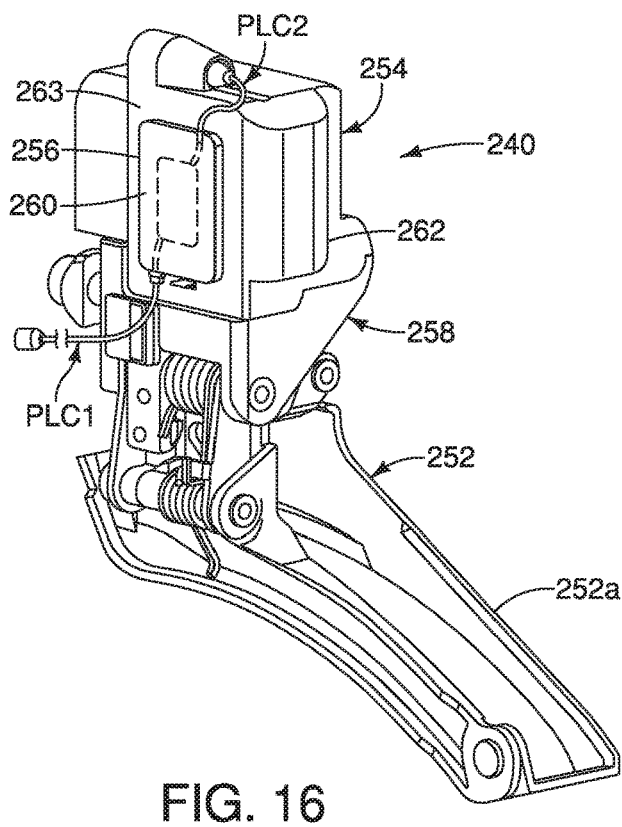
FIG. 16 is an inside rear perspective view of a front derailleur having a wireless communication unit in accordance with a first variation of the second embodiment showing the wireless communication unit in an installed position.
Figure 17:
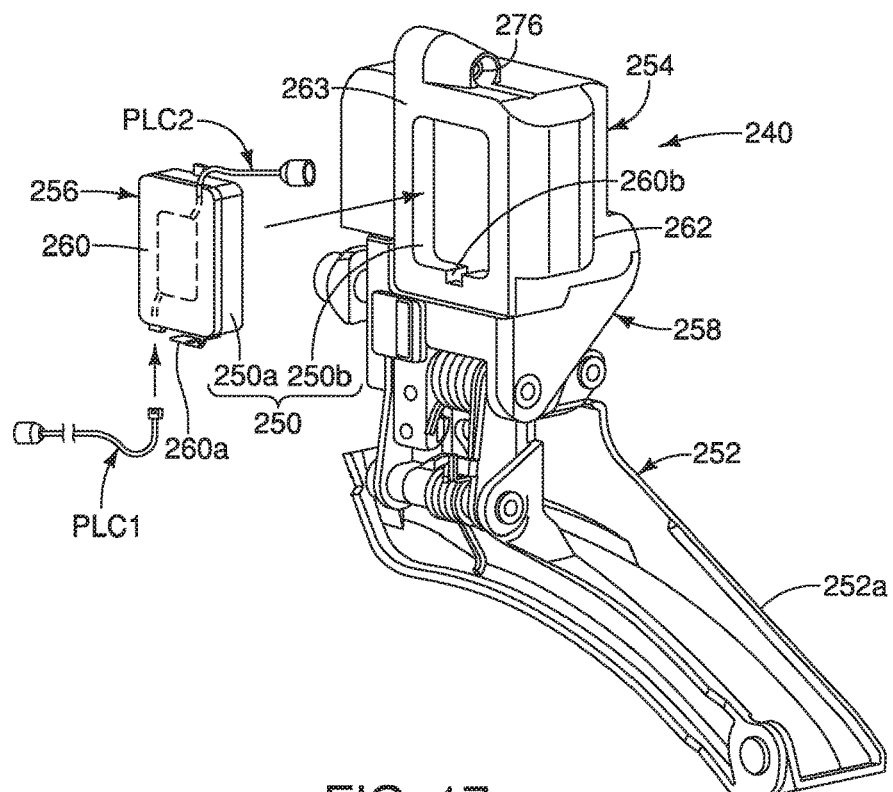
FIG. 17 is an inside rear perspective view of the front derailleur illustrated in FIG. 16 showing the wireless communication unit in an uninstalled position.

Turning now to FIGS. 16 and 17, a front derailleur 240 will now be discussed in accordance with a first variation of the second embodiment. The front derailleur 240 can be mounted to the bicycle frame 12 in place of the front derailleur 40 so as to be operated by one or both of the first and second electrical component operating devices 46 and 48. Basically, the front derailleur 240 (the bicycle electrical component) comprises a support structure 250, a movable member 252, an electrical actuation unit 254 and a wireless communication unit 256. Here, the front derailleur 240 (the bicycle electrical component) further comprises a base member 258 that is configured to mount the electrical actuation unit 254 to the bicycle frame 12. Alternatively, the electrical actuation unit 254 can directly mounted to the bicycle frame 12. Also, the movable member 252 includes a chain guide 252*a* that is operatively coupled to the electrical actuation unit 254. to move the chain guide 252*a* between a first position and a second position similar to the first embodiment as discussed above.

Here in the first variation of the second embodiment, the front derailleur 240 is identical to the front derailleur 140, discussed above, except that the electrical cable PLC2 is detachable from a terminal of the wireless communication unit 256 instead non-detachably wired to the printed circuit board in the wireless communication unit 156.

In the front derailleur 240, the support structure 250 is partially defined by the electrical actuation unit 254 and partially defined by the wireless communication unit 256. In particular, the wireless communication unit 256 includes a first housing 260. The electrical actuation unit 254 includes a second housing 262. The support structure 250 includes a mating portion 250*a* (projecting portion) for engaging the second housing 62. The support structure 250 includes a recess 250*b* within which the mating portion 250*a* of the first housing 260 is to be supported. The recess 250*b* is formed on the second housing 262. In the front derailleur 240, the second housing 262 has a frame facing surface 263 that has the recess 250*b*. The frame facing surface 263 is configured to face the bicycle frame 12 in a state where the front derailleur 240 (i.e., the bicycle electrical component s mounted to the bicycle frame 12.

The support structure 250 detachably supports the wireless communication unit 256 to the front derailleur 240 (the bicycle electrical component). Similar to the first embodiment, the support structure 250 includes a first snap-fit structure 260*a* and a second snap-fit structure 262*a* that detachably engages the first snap fit structure 260*a*. In the front derailleur 140, the first snap-fit structure 260*a* is disposed on the first housing 160, while the second snap-fit structure 262*a* is disposed on the second housing 262, In the front derailleur 240, the first snap-fit structure 260*a* is a latch and the second snap-fit structure 262*a* is a catch. In this way, the support structure 250 detachably supports the wireless communication unit 256 to the front derailleur 240 (the bicycle electrical component).

In the front derailleur 240, the wireless communication unit 256 includes a wireless communication member 266 that is contained within the first housing 260. The wireless communication member 266 is a printed circuit board with a two-way wireless communication circuit printed thereon. Preferably, the printed circuit board of the wireless communication member 266 includes antenna for transmitting and receiving wireless signals. The electrical cable PLC1 has a first end that is configured to be plugged into an electrical port 256*a* (plug-in terminal) of the wireless communication unit 256, and a second end that is configured to be plugged into the wiring junction (not shown). The electrical cable PLC2 of the wireless communication unit 256 has a first end that is non-detachably connected to the printed circuit board of the wireless communication member 266, and a second end that is configured to be plugged into an electrical port 276 of the electrical actuation unit 254. In this way, the power supply unit 38 supplies electrical power to the electrical actuation unit 254 and the wireless communication unit 256.

Figure 18:
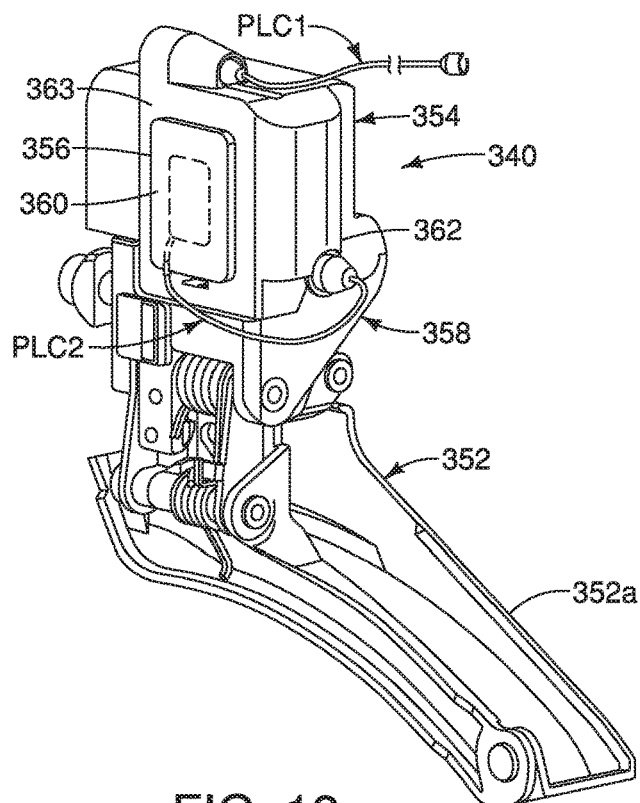
FIG. 18 is an inside rear perspective view of a front derailleur having a wireless communication unit in accordance with a second variation of the second embodiment showing the wireless communication unit in an installed position.
Figure 19:
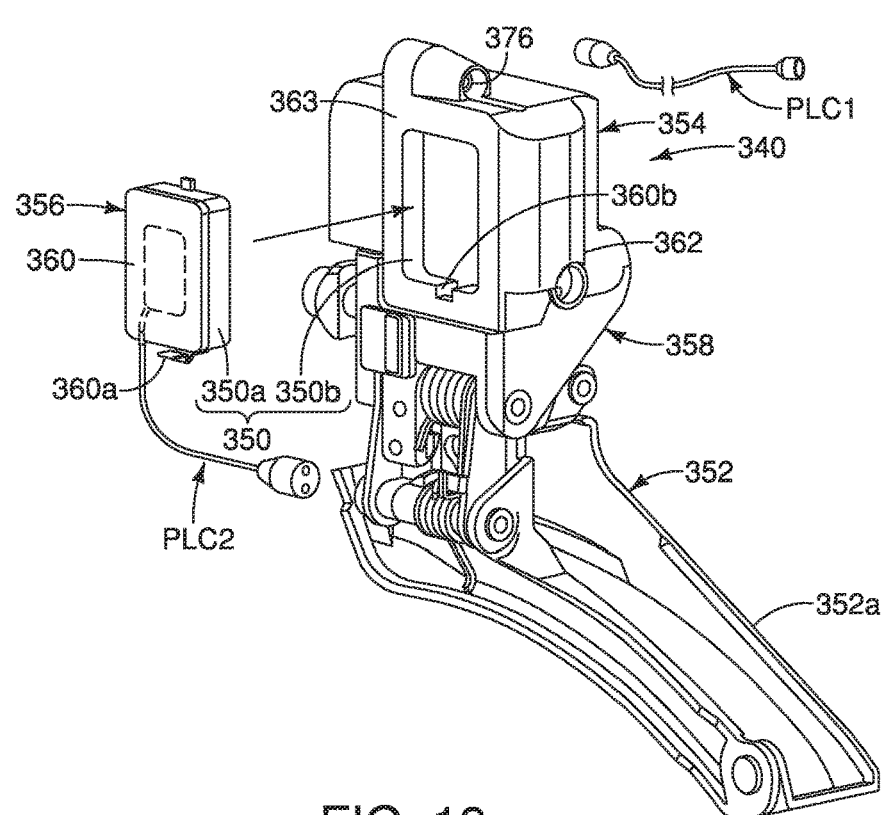
FIG. 19 is an inside rear perspective view of the front derailleur illustrated in FIG. 18 showing the wireless communication unit in an uninstalled position.

Turning now to FIGS. 18 and 19, a front derailleur 340 will now be discussed in accordance with a second variation of the second embodiment. The front derailleur 340 can be mounted to the bicycle frame 12 in place of the front derailleur 40 so as to be operated by one or both of the first and second electrical component operating devices 46 and 48. Basically, the front derailleur 340 (the bicycle electrical component) comprises a support structure 350, a movable member 352 (i.e., a chain guide), an electrical actuation unit 354 and a wireless communication unit 356. Here, the front derailleur 340 (the bicycle electrical component) further comprises a base member 358 that is configured to mount the electrical actuation unit 354 to the bicycle frame 12. Alternatively, the electrical actuation unit 354 can directly mounted to the bicycle frame 12. Also, the movable member 352 includes a chain guide 352*a* that is operatively coupled to the electrical actuation unit 354 to move the chain guide 352*a* between a first position and a second position similar to the first embodiment as discussed above.

Here in this embodiment, the front derailleur 340 is identical to the front derailleur 140, discussed above, except for the wiring arrangement has been modified such that the electrical cable PLC1 is plug into a first electrical port 376 of the electrical actuation unit 354, and the electrical cable PLC2 is plug into a second electrical port 373 of the electrical actuation unit 354. The electrical port 373 and 376 are identical to the electrical ports 73 and 76 of the first embodiment as discussed above. Here, the electrical cable PLC1 has a first end that is configured to be plugged into the electrical port 376 of the electrical actuation unit 254, and a second end that is configured to be plugged into the wiring junction (not shown). The electrical cable PLC2 has a first end that is non-detachably connected to the printed circuit board of a wireless communication member 366, and a second end that is configured to be plugged into the electrical port 373 of the electrical actuation unit 254. In this way, the power supply unit 38 supplies electrical power to the electrical actuation unit 254 and the wireless communication unit 256 via the electrical cables PLC1 and PLC2.

Figure 20:
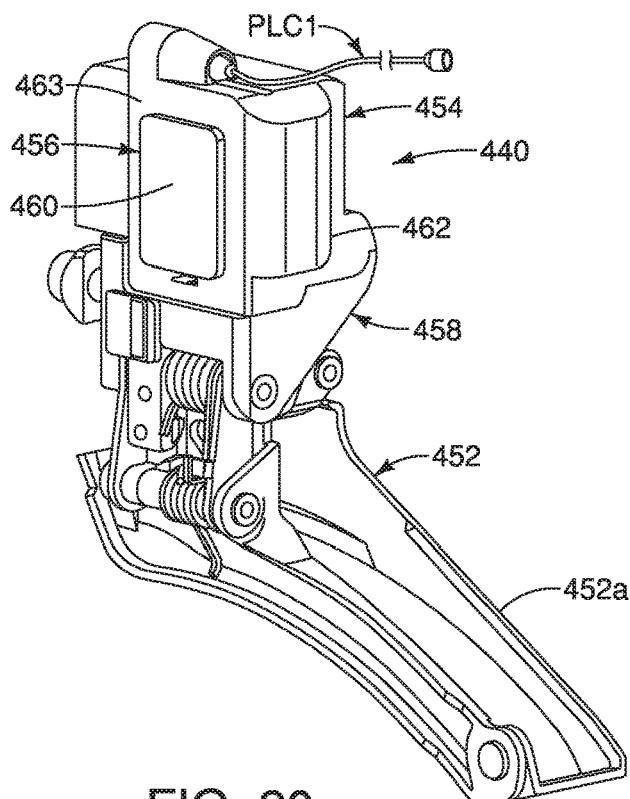
FIG. 20 is an inside rear perspective view of a front derailleur having a wireless communication unit in accordance with a third variation of the second embodiment showing the wireless communication unit in an installed position.
Figure 21:
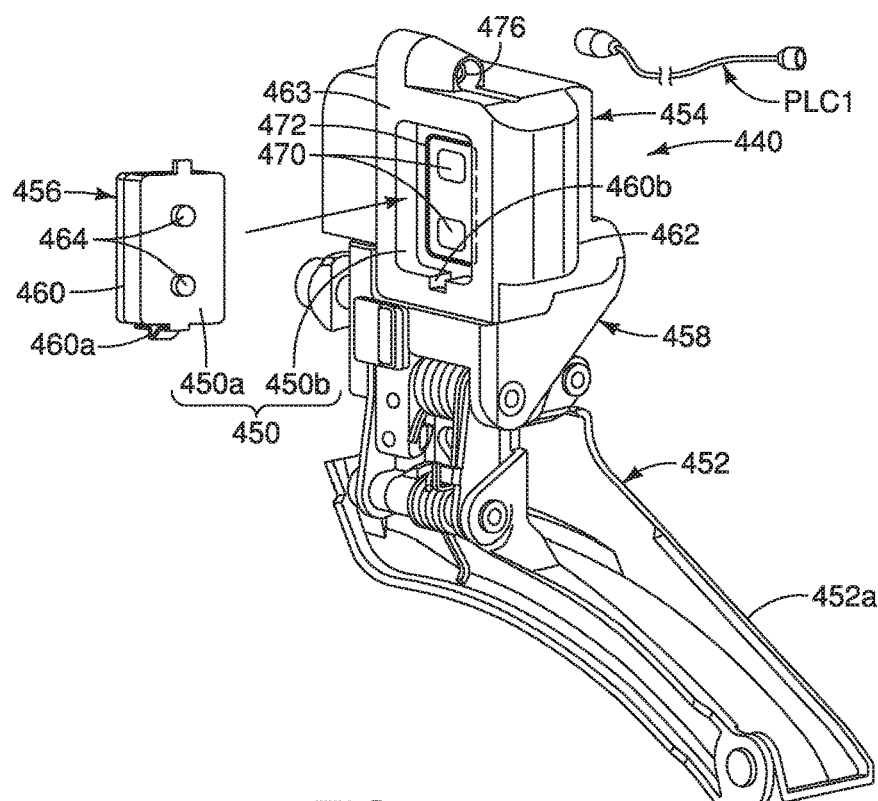
FIG. 21 is an inside rear perspective view of the front derailleur illustrated in FIG. 20 showing the wireless communication unit in an uninstalled position.

Turning now to FIGS. 20 and 21, a front derailleur 440 will now be discussed in accordance with a third variation of the second embodiment. However, in view of the similarities between this third variation of the second embodiment and the second embodiment that following description will focus on the differences from the second embodiment. The front derailleur 440 can be mounted to the bicycle frame 12 in place of the front derailleur 40 so as to be operated by one or both of the first and second electrical component operating devices 46 and 48. Basically, the front derailleur 440 (the bicycle electrical component) comprises a support structure 450, a movable member 452, an electrical actuation unit 454 and a wireless communication unit 456. Here, the front derailleur 440 (the bicycle electrical component) further comprises a base member 458 that is configured to mount the electrical actuation unit 454 to the bicycle frame 12. Alternatively, the electrical actuation unit 454 can directly mounted to the bicycle frame 12. Also, the movable member 452 includes a chain guide 452*a* that is operatively coupled to the electrical actuation unit 454 to move the chain guide 452*a* between a first position and a second position similar to the first embodiment as discussed above.

In the front derailleur 440, the support structure 450 is partially defined by the electrical actuation unit 454 and partially defined by the wireless communication unit 456. In particular, the wireless communication unit 456 includes a first housing 460. The electrical actuation unit 454 includes a second housing 462. The support structure 450 includes a mating portion 450a (projecting portion) for engaging the second housing 462. The support structure 450 includes a recess 450b within which the mating portion 450a of the first housing 460 is to be supported. The recess 450b is formed on the second housing 462. The support structure 450 detachably supports the wireless communication unit 456 to the front derailleur 440 (the bicycle electrical component).

Here in the third variation of the second embodiment, the front derailleur 440 is identical to the front derailleur 340, discussed above, except that the wireless communication unit 456 is provided with a pair of spring loaded first electrical contacts 464 and the electrical actuation unit 454 is provided a pair of exposed second electrical contacts 470. The exposed second electrical contacts 470 are contacted by the spring loaded first electrical contacts 464 when the wireless communication unit 456 is installed on the electrical actuation unit 454.

A seal 472 is provided on the second housing 462 in the recess 450b to protect the electrical connection between the first and second electrical contacts 464 and 470 from contaminants. The seal 472 is configured to surround the first and second contacts 464 and 470 in the state where the first housing 460 is attached to the second housing 462.

Figure 22:
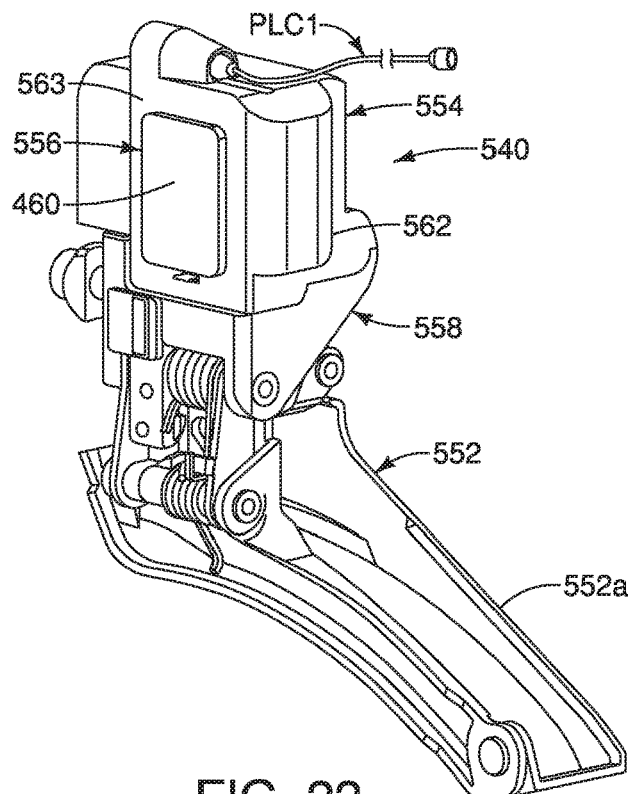
FIG. 22 is an inside rear perspective view of a front derailleur having a wireless communication unit in accordance with a fourth variation of the second embodiment showing the wireless communication unit in an installed position.
Figure 23:
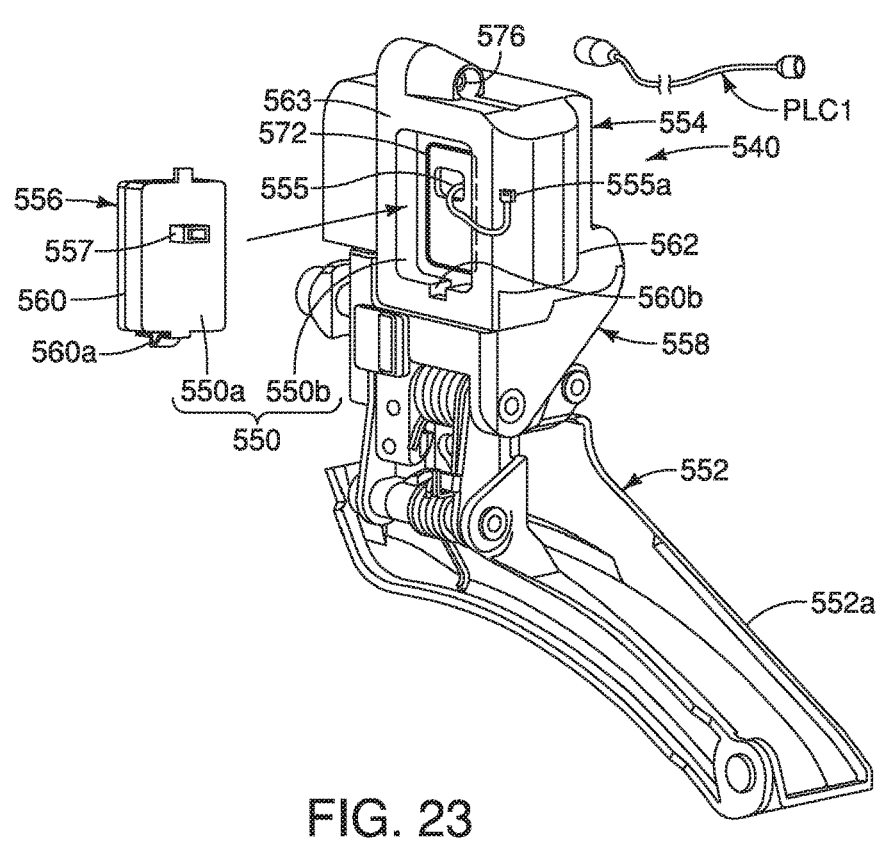
FIG. 23 is an inside rear perspective view of the front derailleur illustrated in FIG. 22 showing the wireless communication unit in an uninstalled position.

Turning now to FIGS. 22 and 23, a front derailleur 540 will now be discussed in accordance with a fourth variation of the second embodiment. The front derailleur 540 can be mounted to the bicycle frame 12 in place of the front derailleur 40 so as to be operated by one or both of the first and second electrical component operating devices 46 and 48. Basically, the front derailleur 540 (the bicycle electrical component) comprises a support structure 550, a movable member 552 (i.e., a chain guide), an electrical actuation unit 554 and a wireless communication unit 556. Here, the front derailleur 540 (the bicycle electrical component further comprises a base member 558 that is configured to mount the electrical actuation unit 554 to the bicycle frame 12. Alternatively, the electrical actuation unit 554 can directly mounted to the bicycle frame 12. Also, the movable member 552 includes a chain guide 552a that is operatively coupled to the electrical actuation unit 554 to move the chain guide 552a between a first position and a second position similar to the first embodiment as discussed above.

In the front derailleur 540, the support structure 550 is partially defined by the electrical actuation unit 554 and partially defined by the wireless communication unit 556. In particular, the wireless communication unit 556 includes a first housing 560. The electrical actuation unit 554 includes a second housing 562. The support structure 550 includes a mating portion 550a (projecting portion) for engaging the second housing 562. The support structure 550 includes a recess 550b within which the mating portion 550a of the first housing 560 is to be supported. The recess 550b is formed on the second housing 562. The support structure 550 detachably supports the wireless communication unit 556 to the front derailleur 540 (the bicycle electrical component).

Here in this embodiment, the front derailleur 540 is identical to the front derailleur 440, discussed above, except that the electrical actuation unit 554 is provided with an electrical cable 555 and the wireless communication unit 556 is provided with an electrical connector 557 that the mates with an electrical connector 555a of the electrical cable 555 in a detachable and reattachable manner.

A seal 572 is provided on the second housing 562 in the recess 550b to protect the electrical connection between the electrical connector 555a and the electrical connector 557 from contaminants. The seal 572 is configured to surround the first and second electrical contacts of the electrical connector 555a and the electrical connector 557 in the state where the first housing 560 is attached to the second housing 562.

Figure 24:
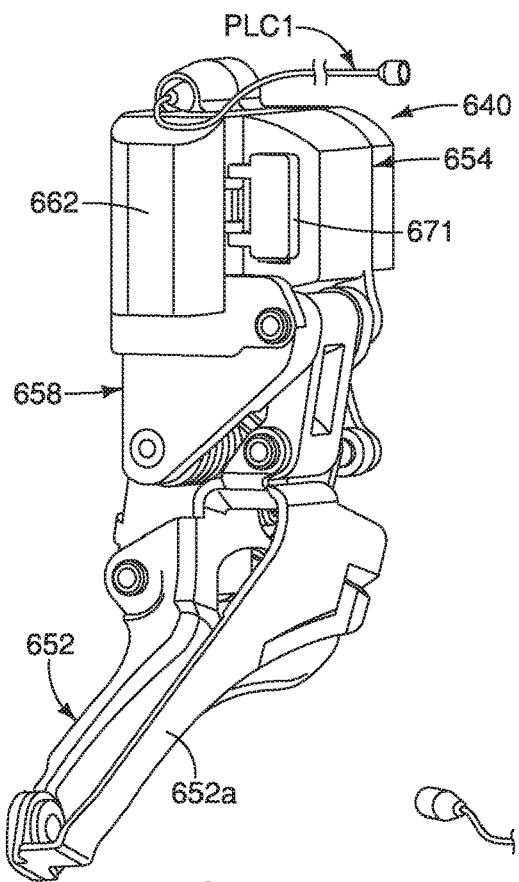
FIG. 24 is an inside rear perspective view of a front derailleur having a wireless communication unit in accordance with a third embodiment showing the wireless communication unit in an installed position.
Figure 25:
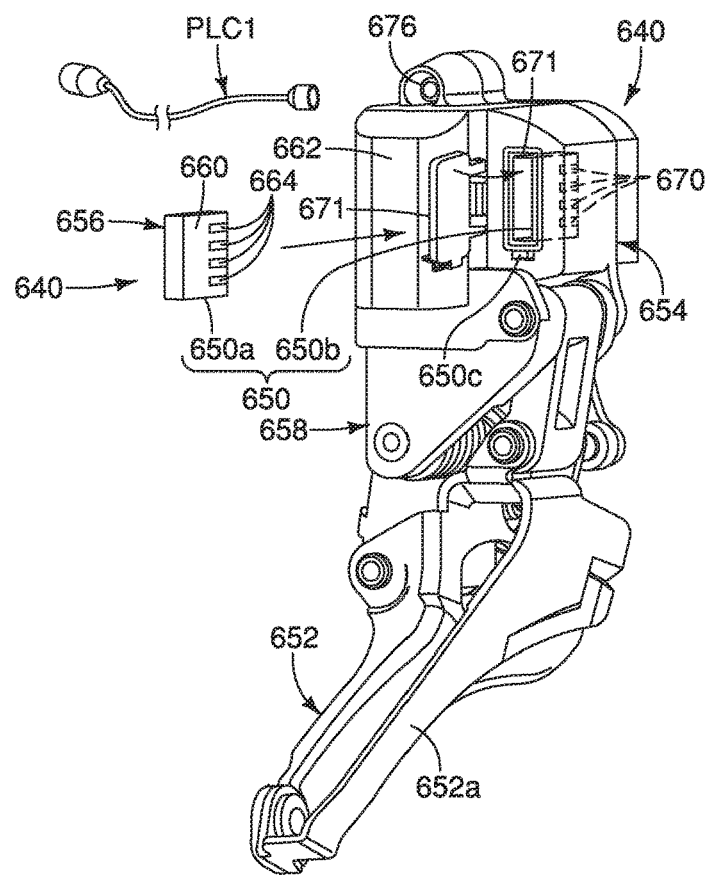
FIG. 25 is an inside rear perspective view of the front derailleur illustrated in FIG. 24 showing the wireless communication unit in an uninstalled position.

Turning now to FIGS. 24 and 25, a front derailleur 640 will now be discussed in accordance with a third embodiment. The front derailleur 640 can be mounted to the bicycle frame 12 in place of the front derailleur 40 so as to be operated by one or both of the first and second electrical component operating devices 46 and 48. Basically, the front derailleur 640 (the bicycle electrical component) comprises a support structure 650, a movable member 652 (i.e., a chain guide), an electrical actuation unit 654 and a wireless communication unit 656. Here, the front derailleur 640 (the bicycle electrical component) further comprises abase member 658 that is configured to mount the electrical actuation unit 654 to the bicycle frame 12. Alternatively, the electrical actuation unit 654 can directly mounted to the bicycle frame 12. Also, the movable member 652 includes a chain guide 652a that is operatively coupled to the electrical actuation unit 654 to move the chain guide 652a between a first position and a second position similar to the first embodiment as discussed above.

In the front derailleur 640, the support structure 650 is partially defined by the electrical actuation unit 654 and partially defined by the wireless communication unit 656. In particular, the wireless communication unit 656 includes a first housing 660. The electrical actuation unit 654 includes a second housing 662. The support structure 650 includes a mating portion 650a (projecting portion) for engaging the second housing 662. The support structure 650 includes a second space 650b that is formed within the second housing 662 of the electrical actuation unit 654 for receiving the mating portion 650a of the first housing 660. The first housing 660 is configured to be inserted into the second space 650b. The support structure 650 detachably supports the wireless communication unit 656 to the front derailleur 640 (the bicycle electrical component). In this embodiment, the first housing 660 can be omitted and the second housing 662 can be a first housing of the wireless communication unit 656 as an integrated member, which houses a wireless communication member 666.

The wireless communication unit 656 includes a plurality of first electrical contacts 664 that are disposed on the first housing 660. The electrical actuation unit 654 includes a plurality of second electrical contacts 670 that are disposed inside the second space 650b. The second electrical contacts 670 are configured to electrically contact the first electrical contacts 664 in a state where the first housing 660 is disposed in the second space 650b.

The second housing 662 includes a cover 671 that is configured to close an opening 650c of the second space 650b. Here, the cover 671 is hingedty mounted to the second housing 662 between a closed position and an open position. The cover 671 is provided with a latch that engages a catch of the second housing 662 so that the cover 671 is held in the closed position by a snap-fit connection. The electrical actuation unit 654 includes a seal 672 that is configured to seal an interface between the second housing 662 around the opening 650c and the cover 671 in a state where the cover 671 closes the opening 650c.

Thus, the cover 671 is configured to cover the second electrical contacts 670 that are disposed on the second housing 662 when the first electrical contacts 664 of the wireless communication unit 656 are detached from the second electrical contact 670. In this way, the cover 671 protects the second electrical contact 670 in a situation that the wireless communication unit 656 is not used, i.e. when an electrically wired communication system is used.

Figure 26:
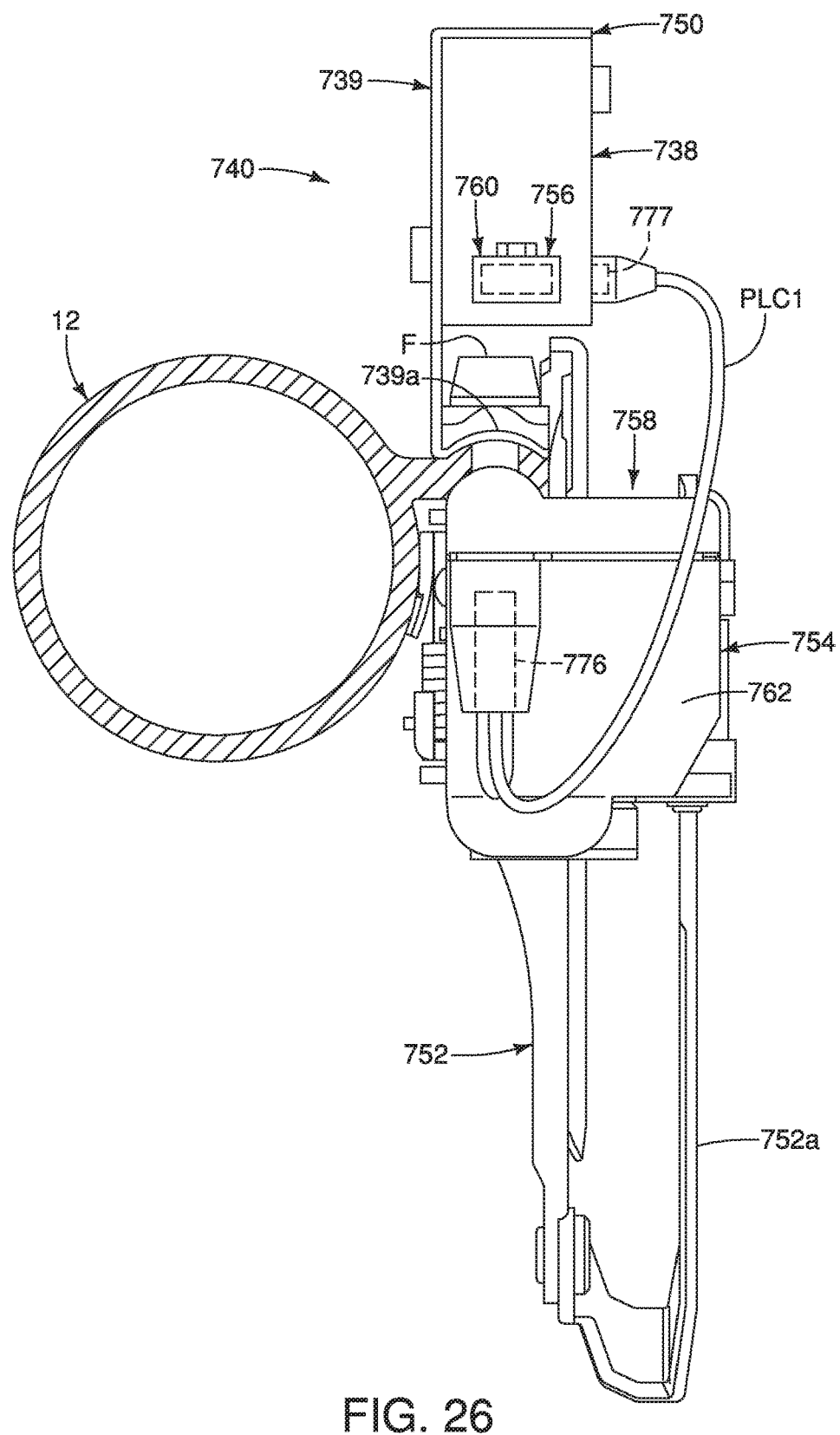
FIG. 26 is a top view of a front derailleur having a wireless communication unit in accordance with a fourth embodiment showing the wireless communication unit in an installed position.

Turning now to FIG. 26, a front derailleur 740 will now be discussed in accordance with a fourth embodiment. The front derailleur 740 can be mounted to the bicycle frame 12 in place of the front derailleur 40 so as to be operated by one or both of the first and second electrical component operating devices 46 and 48. Here, the front derailleur 740 (the bicycle electrical component) comprises a power supply unit 738 and a power supply bracket 739. In the front derailleur 740, a support structure 750 is defined by the power supply unit 738 and the power supply bracket 739. Thus, in the front derailleur 740, power is not supplied by the power supply unit 38 when the front derailleur 740 is mounted to the bicycle frame 12.

Basically, the front derailleur 740 (the bicycle electrical component) comprises, a movable member 752, an electrical actuation unit 754 and a wireless communication unit 756. Here, the front derailleur 740 (the bicycle electrical component) further comprises a base member 758 that is configured to mount the electrical actuation unit 754 to the bicycle frame 12. Alternatively, the electrical actuation unit 754 can directly mounted to the bicycle frame 12. Also, the movable member 752 includes a chain guide 752a that is operatively coupled to the electrical actuation unit 754 to move the chain guide 752a between a first position and a second position similar to the first embodiment as discussed above. The support structure 750 (i.e., the power supply unit 738 and the power supply bracket 739) support the wireless communication unit 756 to the bicycle frame 12.

In the front derailleur 740, the wireless communication unit 756 includes a first housing 760 for housing a wireless communication member 766. The electrical actuation unit 754 includes a second housing 762. The wireless communication unit 756 is similar to the wireless communication unit 56, discussed above, in that the wireless communication unit 756 plugs into a recess of the power supply unit 738 to electrically connect to the electrical actuation unit 754. The first housing 760 and the power supply unit 738 have a snap-fit connection similar to the first embodiment to retain the first housing 760 in the recess of the power supply unit 738. In this way, the first housing 760 is configured to be detachably supported to the power supply unit 738.

As mentioned above, the wireless communication unit 756 is similar to the wireless communication unit 56, discussed above, and thus, the wireless communication unit 756 includes a wireless communication member 766 and first electrical contacts t shown). Since the wireless communication unit 756 is supported by the power supply unit 738, the power supply unit 738 is configured to contain the wireless communication member 766. In this embodiment, the first housing 760 can be omitted and a housing of the power supply bracket can be a first housing of the wireless communication unit 756 as an integrated member, which can houses the wireless communication member 66.

The power supply unit 738 is configured to supply electrical power to the electrical actuation unit 754 via an electrical cable PLC1. The electrical cable PLC1 also provides control signals from the wireless communication unit 756 to the electrical actuation unit 754 using power line communications. The power supply bracket 739 is configured to mount the power supply unit 738 to the front derailleur 740 (the bicycle electrical component). The power supply bracket 739 is also configured to support the wireless communication unit 756 to the front derailleur 740 (the bicycle electrical component) on a support structure in this embodiment. In other words, the power supply bracket 739 constitutes the support structure 750 in this embodiment. The front derailleur 740 is basically identical to the front derailleur 40, except the wireless communication unit 756 now supported by the battery bracket 739, and the power and control signals for the electrical actuation unit 754 are supplied via the electrical cable PLC1 using power line communications.

The front derailleur 740 (the bicycle electrical component) further comprises a fastener F configured to fix the base member 758 to the bicycle frame 12. The power supply bracket 739 includes a mounting portion 739a that is configured to be mounted to the bicycle frame 12 by the fastener F. Thus, the power supply bracket 739 is fixed to the bicycle frame 12 together with base member 758 by the fastener F.

The electrical actuation unit 754 includes at least one electrical port 776 that is disposed at the second housing 762. The power supply unit 738 includes at least one of an electrical port and an electrical cable (i.e., an electrical port 777). One end of the electrical cable PLC1 is plugged into the electrical port 776 of the electrical actuation unit 754, while the other end of the electrical cable PLC1 is plugged into the electrical port 777 of the power supply unit 738. The electrical cable PLC1 receives both power from the power supply unit 738 and data (control signals) from the wireless communication unit 756 via the electrical port 777. Alternatively, one or both ends of the electrical cable PLC1 can be non-detachable connected between the power supply unit 738 and the electrical actuation unit 754.

Figure 27:
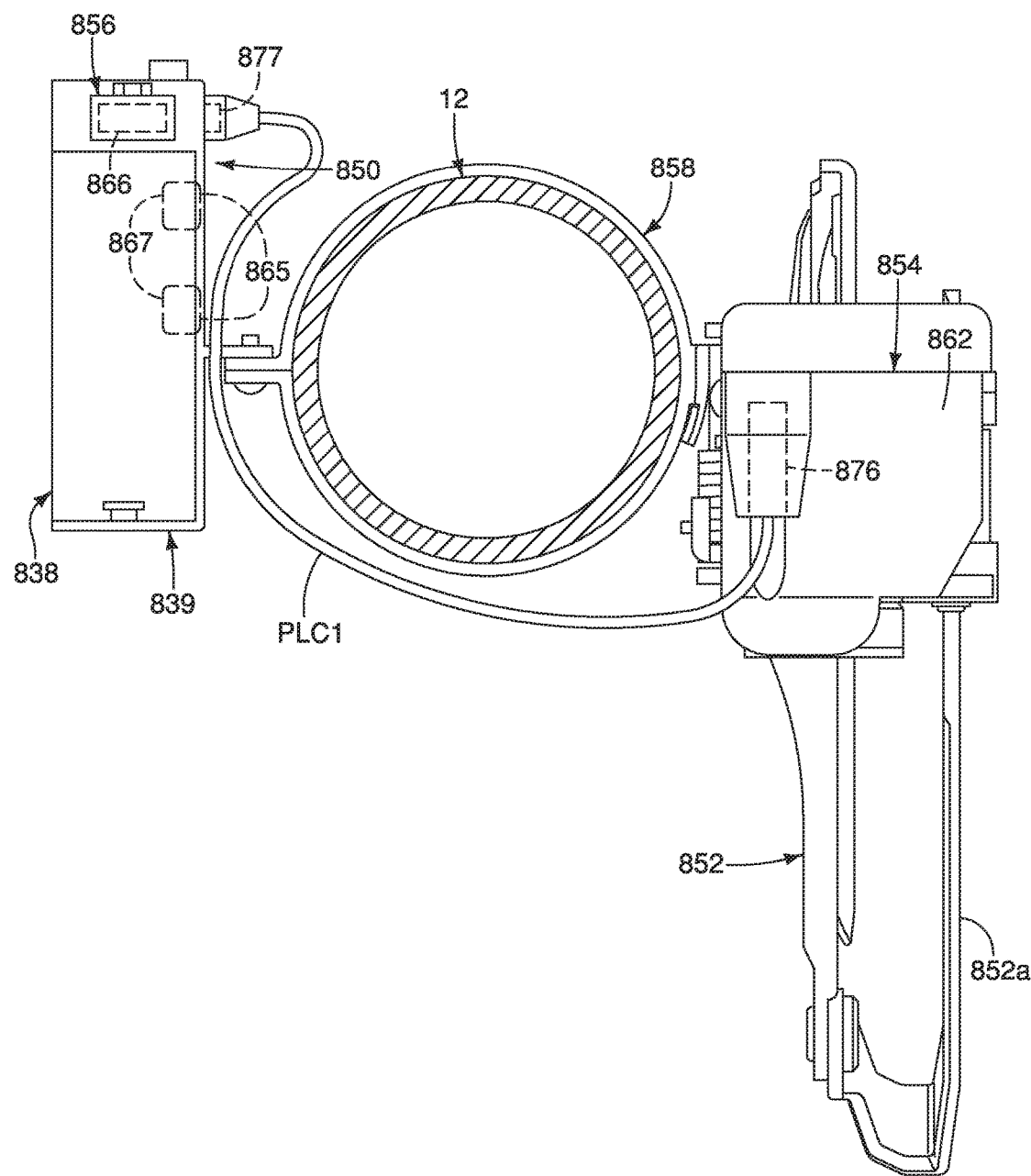
FIG. 27 is a top view of a front derailleur having a wireless communication unit in accordance with a variation of the front derailleur of the fourth embodiment showing the wireless communication unit in an installed position.
Figure 28:
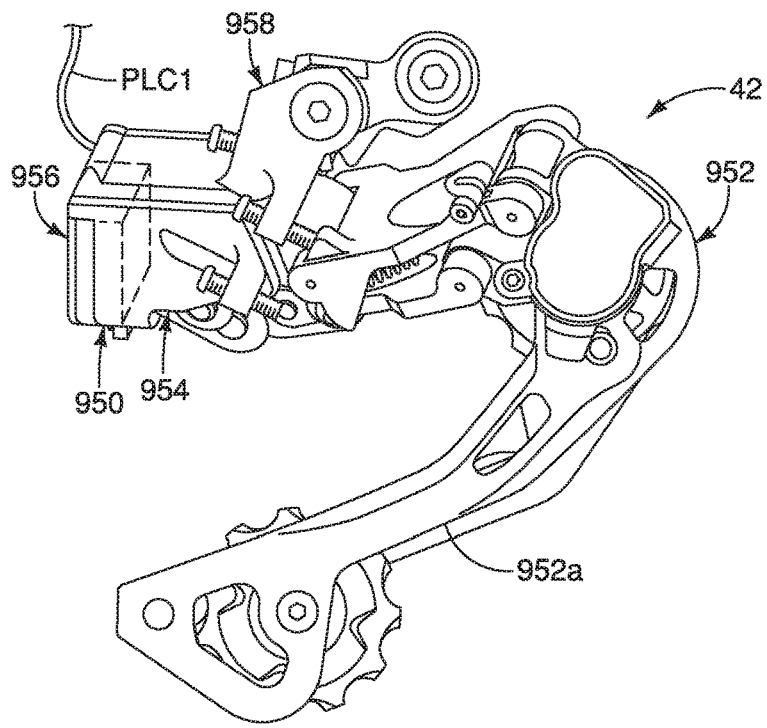
FIG. 28 is an outside elevational view of a rear derailleur having a wireless communication unit in accordance with a first embodiment of the rear derailleur showing the wireless communication unit in an installed position.
Figure 29:
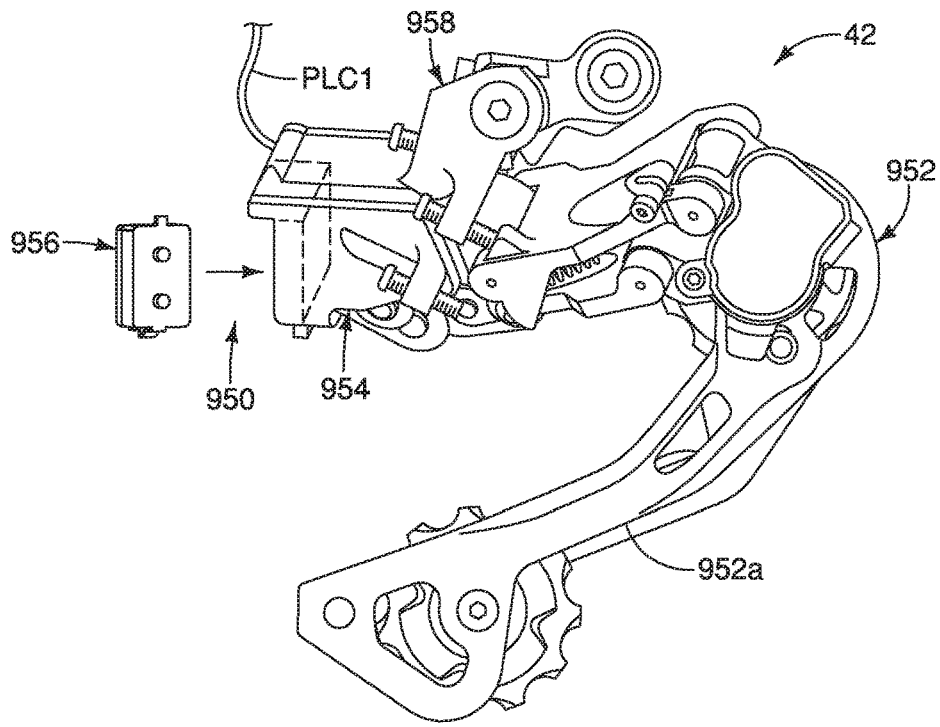
FIG. 29 is an outside elevational view of the rear derailleur illustrated in FIG. 28 showing the wireless communication unit in an uninstalled position.

Turning now to FIG. 27, a front derailleur 840 will now be discussed in accordance with a fourth embodiment. The front derailleur 840 can be mounted to the bicycle frame 12 in place of the front derailleur 40 so as to be operated by one or both of the first and second electrical component operating devices 46 and 48. Here, the front derailleur 840 (the bicycle electrical component) comprises a power supply unit 838 and a power supply bracket 839. Thus, in the front derailleur 840, power is not supplied by the power supply unit 38 when the front derailleur 840 is mounted to the bicycle frame 12.

Basically, the front derailleur 840 (the bicycle electrical component) comprises, a movable member 852, an electrical actuation unit 854 and a wireless communication unit 856. Here, the front derailleur 840 (the bicycle electrical component) further comprises a base member 858 that is configured to mount the electrical actuation unit 854 to the bicycle frame 12. In the front derailleur 840, the base member 858 is a hinged clamp that attaches to the seat tube of the bicycle frame 12. Also, the movable member 852 includes a chain guide 852a that is operatively coupled to the electrical actuation unit 854 to move the chain guide 852a between a first position and a second position similar to the first embodiment as discussed above.

In the front derailleur 840, the support structure 850 is defined by the power supply bracket 839. Here, the wireless communication unit 856 includes a first housing 860 for housing a wireless communication member 866. The electrical actuation unit 854 includes a second housing 862. The wireless communication unit 856 is similar to the wireless communication unit 56, discussed above, in that the wireless communication unit 856 plugs into a recess of the power supply bracket 839 to electrically connect to the electrical actuation unit 854. The first housing 860 of the wireless communication unit 856 and the recess of the power supply bracket 839 have a snap-fit connection similar to the first embodiment to retain the first housing 860 in the recess of the power supply bracket 839. In this way, the first housing 860 is configured to be detachably supported to the power supply bracket 839. Alternatively, the wireless communication member 866 is non-detachably contained within the power supply bracket regarded as the first housing of the wireless communication unit 856.

As mentioned above, the wireless communication unit 856 is similar to the wireless communication unit 56, discussed above, and thus includes a wireless communication member 866 and first electrical contacts (not shown). Since the wireless communication unit 856 is supported by the housing of the power supply bracket 839, the power supply bracket 839 is configured to contain the wireless communication member 866.

The power supply unit 838 is configured to supply electrical power to the electrical actuation unit 854 via an electrical cable PLC1. The electrical cable PLC I also provides control signals from the wireless communication unit 856 to the electrical actuation unit 854 using power line communications. The power supply bracket 839 is configured to mount the power supply unit 838 to the front derailleur 840 (the bicycle electrical component). The power supply bracket 839 is also configured to support the wireless communication unit 856 to the front derailleur 840 (the bicycle electrical component) as a support structure in this embodiment. In other words, the power supply bracket 839 constitutes the support structure in this embodiment. The front derailleur 840 is basically identical to the front derailleur 40, except the wireless communication unit 856 now supported by the battery bracket 839, and the power and control signals for the electrical actuation unit 854 are supplied via the electrical cable PLC1 using power line communications.

The power supply bracket 839 includes a pair of third contacts 865. The power supply unit 838 includes a pair of fourth contacts 867 that is configured to electrically contact the third contacts 865 in a state where the power supply unit 838 is mounted to the power supply bracket 839.

The electrical actuation unit 854 includes at least one electrical port 876 that is disposed at the second housing 862. The power supply unit 838 includes at least one of an electrical port and an electrical cable (i.e., an electrical port 877). One end of the electrical cable PLC1 is plugged into the electrical port 876 of the electrical actuation unit 854, while the other end of the electrical cable PLC1 is plugged into the electrical port 877 of the power supply unit 838. The electrical cable PLC1 receives both power from the power supply unit 838 and data (control signals) from the wireless communication unit 856 via the electrical port 877. Alternatively, one or both ends of the electrical cable PLC1 can be non-detachable connected between the power supply unit 838 and the electrical actuation unit 854. All the features in one to four embodiments can be combined, if needed and/or desired.

Turning now to FIGS. 1, 2, 28 and 29, the rear derailleur 42 will now be discussed in accordance with the first embodiment. As seen in FIG. 1, the rear derailleur 42 is mounted to the rear swing arm 16. Here, while the cycle computer 44 is set to a shift mode, one or both of the first and second electrical component operating devices 46 and 48 can be used to control the rear derailleur 42 based on a shifting program stored in the memory of the cycle computer 44.

Basically, the rear derailleur 42 (the bicycle electrical component) comprises a support structure 950, a movable member 952, an electrical actuation unit 954 and a wireless communication unit 956. Here, the rear derailleur 42 (the bicycle electrical component) further comprises a base member 958 that is configured to mount the electrical actuation unit 954 to the bicycle frame 12. Also, the movable member 952 includes a chain guide 952a that is operatively coupled to the electrical actuation unit 954 to move the chain guide 952a between a first position and a second position.

Here, the electrical actuation unit 954 and the wireless communication unit 956 are detachably coupled together using a snap-fit connection that the same as used with the front derailleur 440. In fact, the wireless communication unit 956 is identical to the wireless communication unit 456, which is discussed above. Thus, the wireless communication units 456 and 956 are interchangeable. The wireless communication unit 956 is configured to be detachably supported to an additional bicycle electrical component (e.g., the front derailleur 440) different from the rear derailleur 42 (the bicycle electrical component). Likewise, the wireless communication unit 456 is configured to be detachably supported to an additional bicycle electrical component (e.g., the rear derailleur 42) different from the front derailleur 440 (the bicycle electrical component).

The electrical actuation unit 954 is the same as the electrical actuation unit 54, discussed above, except that the electrical actuation unit 954 is adapted to the configuration of the rear derailleur 42. With respect to the electrical actuation unit 954 and the wireless communication unit 956, in view of the similarities in construction between the rear derailleur 42 and the front derailleur 440, the electrical actuation unit 954 and the wireless communication unit 956 of the rear derailleur 42 will not be discussed or illustrated in more detail.

Figure 30:
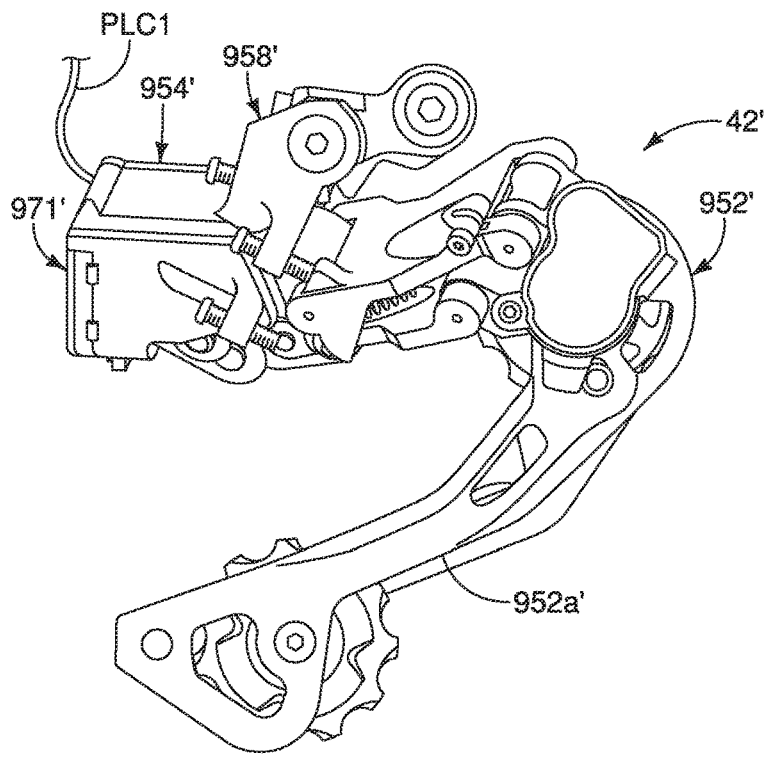
FIG. 30 is an outside elevational view of a rear derailleur having a wireless communication unit in accordance with a variation of the first embodiment of the rear derailleur showing the wireless communication unit in an installed position.
Figure 31:
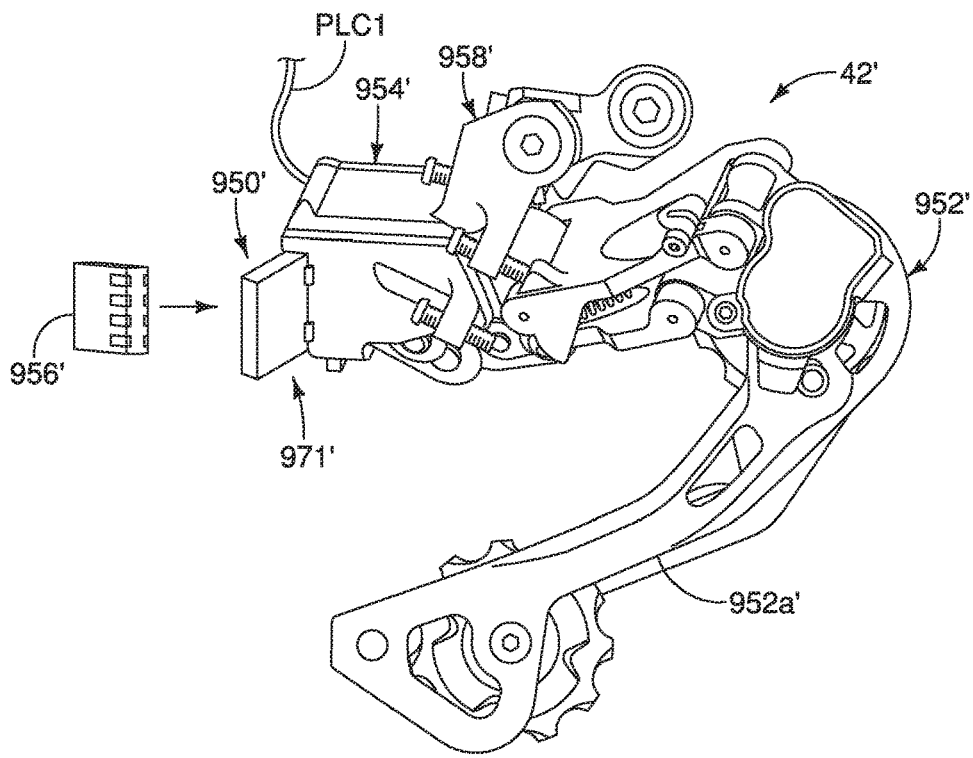
FIG. 31 is an outside elevational view of the rear derailleur illustrated in FIG. 30 showing the wireless communication unit in an uninstalled position.

Turning now to FIGS. 30 and 31, the rear derailleur 42' will now be discussed in accordance with a variation of the rear derailleur 42. Basically, the rear derailleur 42' (the bicycle electrical component) comprises a support structure 950', a movable member 952', an electrical actuation unit 954' and a wireless communication unit 956'. Here, the rear derailleur 42' (the bicycle electrical component) further comprises a base member 958' that is configured to mount the electrical actuation unit 954' to the bicycle frame 12. Also, the movable member 952' includes a chain guide 952a' that is operatively coupled to the electrical actuation unit 954' to move the chain guide 952a' between a first position and a second position.

Here, the electrical actuation unit 954' and the wireless communication unit 956' are detachably coupled together using a hinged cover 971'. Here, the hinged cover 971' is hingedly mounted to the second housing 962' between a closed position and an open position. The hinged cover 971' is provided with a latch that engages a catch of the second housing 962' so that the hinged cover 971' is held in the closed position by a snap-fit connection. The rear derailleur 42' uses the hinged cover 971' as used with the front derailleur 640. In fact, the wireless communication unit 956' is identical to the wireless communication unit 656, which is discussed above. Thus, the wireless communication units 656 and 956' are interchangeable. The wireless communication unit 956' is configured to be detachably supported to an additional bicycle electrical component (e.g., the front derailleur 640) different from the rear derailleur 42' (the bicycle electrical component). Likewise, the wireless communication unit 656' is configured to be detachably supported to an additional bicycle electrical component (e.g., the rear derailleur 42') different from the front derailleur 640 (the bicycle electrical component).

The electrical actuation unit 954' is the same as the electrical actuation unit 54, discussed above, except that the electrical actuation unit 954' is adapted to the configuration of the rear derailleur 42'. With respect to the electrical actuation unit 954' and the wireless communication unit 956', in view of the similarities in construction between the rear derailleur 42' and the front derailleur 640, the electrical actuation unit 954' and the wireless communication unit 956' of the rear derailleur 42' will not be discussed or illustrated in more detail.

Figure 32:
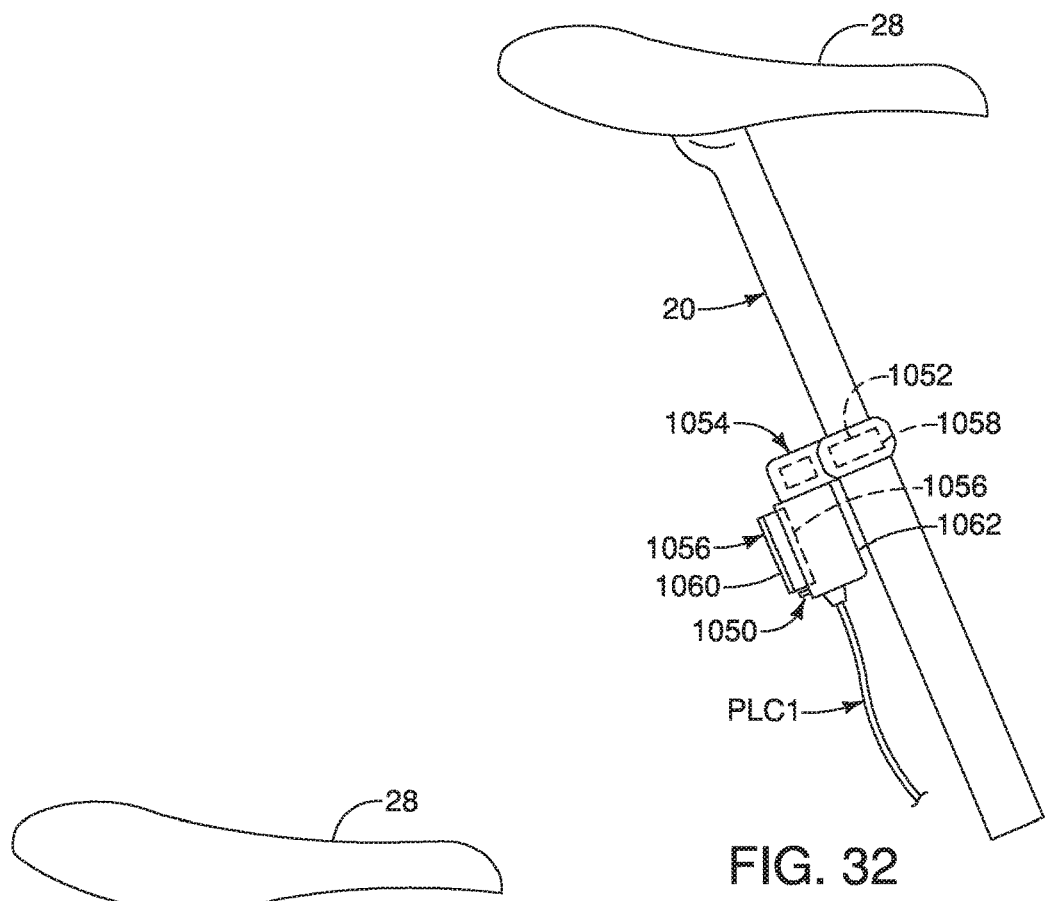
FIG. 32 is an outside elevational view of an adjustable seatpost having a wireless communication unit in accordance with a first embodiment of the adjustable seatpost showing the wireless communication unit in an installed position.
Figure 33:
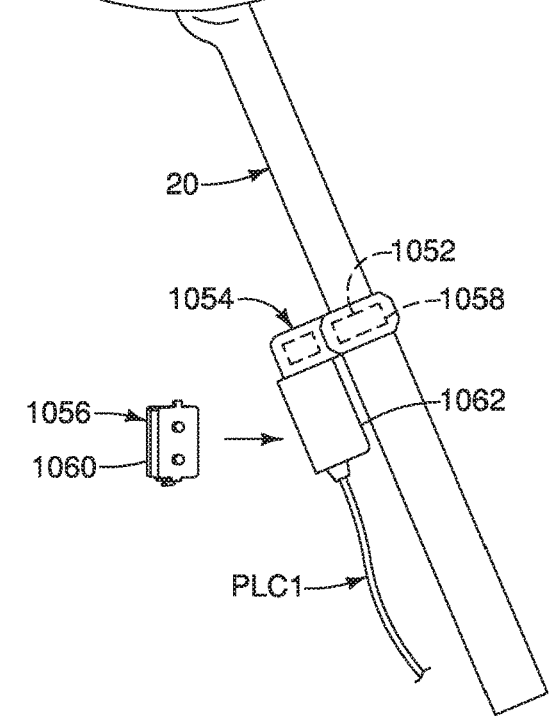
FIG. 33 is an outside elevational view of the adjustable seatpost illustrated in FIG. 32 showing the wireless communication unit in an uninstalled position.

Turning now to FIGS. 1, 32 and 33, the adjustable seatpost 20 will now be discussed in accordance with the first embodiment. As seen in FIG. 1, the adjustable seatpost 20 is mounted to a seat tube of the main frame 12. Here, while the cycle computer 44 is set to a seatpost adjustment mode, one or both of the first and second electrical component operating devices 46 and 48 can be used to control the adjustable seatpost 20 based on a shifting program stored in the memory of the cycle computer 44.

Basically, the adjustable seatpost 20 (the bicycle electrical component) comprises a support structure 1050, a movable member 1052 (e.g., a valve), an electrical actuation unit 1054 and a wireless communication unit 1056. Here, the adjustable seatpost 20 (the bicycle electrical component) further comprises a base member 1058 that is configured to mount the electrical actuation unit 1054 to the bicycle frame 12.

In the adjustable seatpost 20, the support structure 1050 is partially defined by the electrical actuation unit 1054 and partially defined by the wireless communication unit 1056. In particular, the wireless communication unit 1056 includes a first housing 1060 forming a first part of the support structure 1050 in the same manner as the wireless communication unit 456, and the electrical actuation unit 1054 includes a second housing 1062 in the same manner as the wireless communication unit 462.

Here, the electrical actuation unit 1054 and the wireless communication unit 1056 are detachably coupled together using a snap-fit connection that the same as used with the front derailleur 440. In fact, the wireless communication unit 1056 is identical to the wireless communication units 456 and 956, which are discussed above. Thus, the wireless communication units 456, 956 and 1056 are interchangeable.

Figure 34:
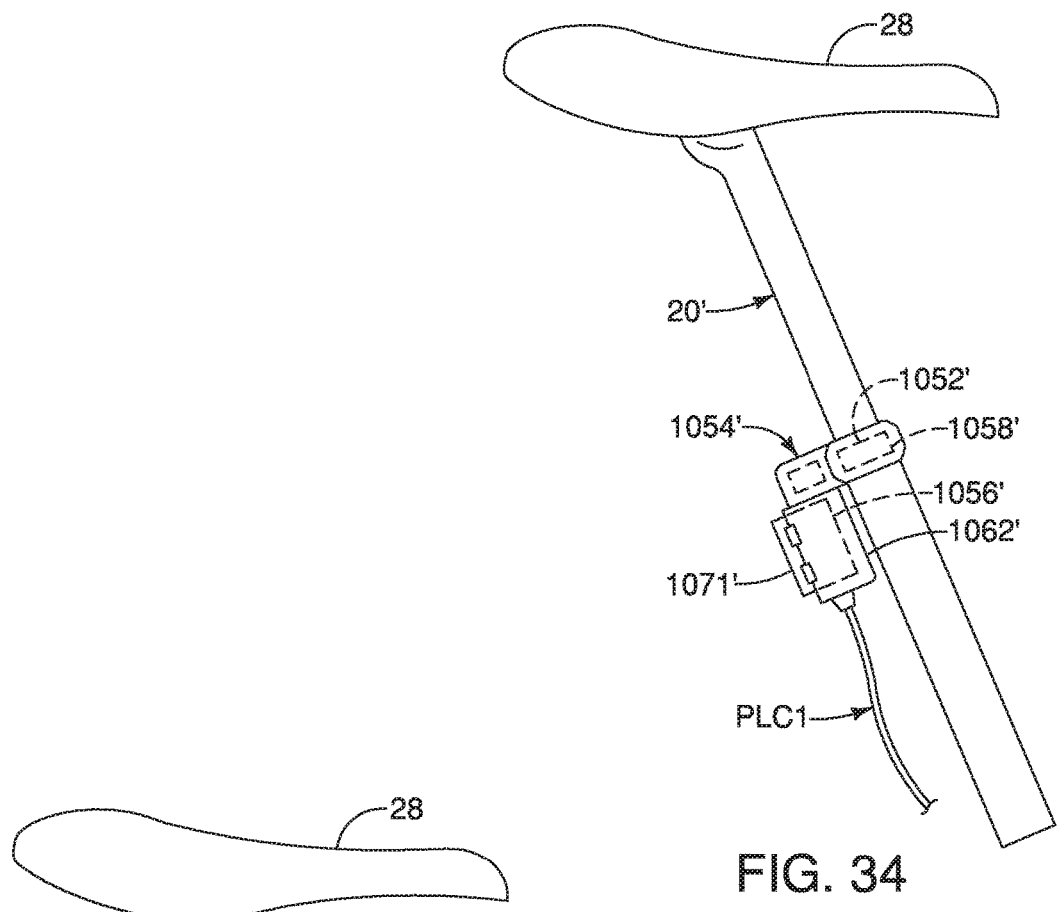
FIG. 34 is an outside elevational view of an adjustable seatpost having a wireless communication unit in accordance with a variation of the first embodiment of the adjustable seatpost showing the wireless communication unit in an installed position.
Figure 35:
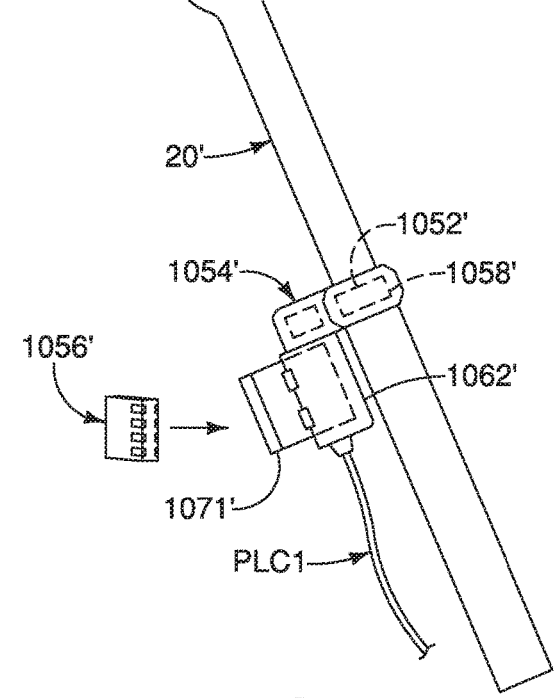
FIG. 35 is an outside elevational view of the adjustable seatpost illustrated in FIG. 34 showing the wireless communication unit in an uninstalled position.

Turning now to FIGS. 34 and 35, an adjustable seatpost 20' will now be discussed in accordance with a variation of the adjustable seatpost 20. Basically, the adjustable seatpost 20' (the bicycle electrical component) comprises a support structure 1050', a movable member 1052' (e.g., a valve), an electrical actuation unit 1054' and a wireless communication unit 1056'. Here, the adjustable seatpost 20' (the bicycle electrical component) further comprises a base member 1058' that is configured to mount the electrical actuation unit 1054' to the bicycle frame 12.

In the adjustable seatpost 20, the support structure 1050' is partially defined by the electrical actuation unit 1054' and partially defined by the wireless communication unit 1056'. In particular, the wireless communication unit 1056' includes a first housing 1060' forming a first part of the support structure 1050' in the same manner as the wireless communication unit 656, and the electrical actuation unit 1054' includes a second housing 1062' in the same manner as the wireless communication unit 662'.

Here, the electrical actuation unit 1054' and the wireless communication unit 1056' are detachably coupled together using a hinged cover 1071'. Here, the hinged cover 1071' is hingedly mounted to the second housing 1062' between a closed position and an open position. The hinged cover 1071' is provided with a latch that engages a catch of the second housing 1062' so that the hinged cover 1071' is held in the closed position by a snap-fit connection. The rear derailleur 42' uses the hinged cover 1071' as used with the front derail 640. In fact, the wireless communication unit 1056' is identical to the wireless communication units 656 and 956', which are discussed above. Thus, the wireless communication units 656, 956' and 1056' are interchangeable.

Figure 36:
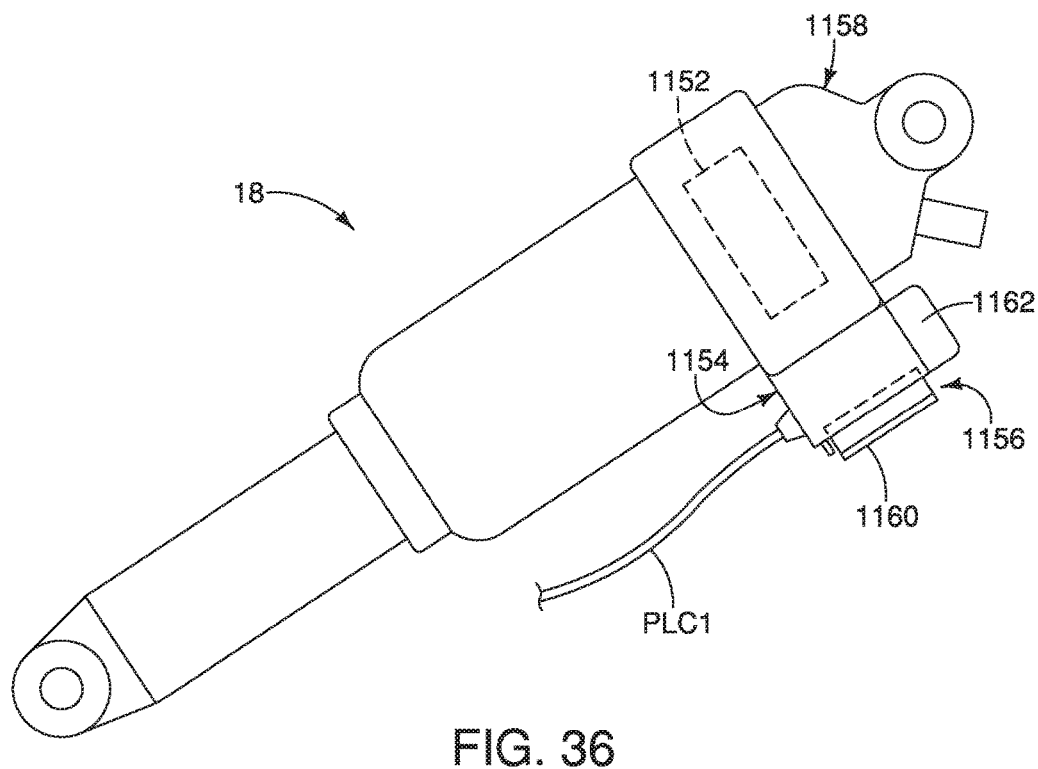
FIG. 36 is an outside elevational view of a rear suspension having a wireless communication unit in accordance with a first embodiment of the rear suspension showing the wireless communication unit in an installed position.
Figure 37:
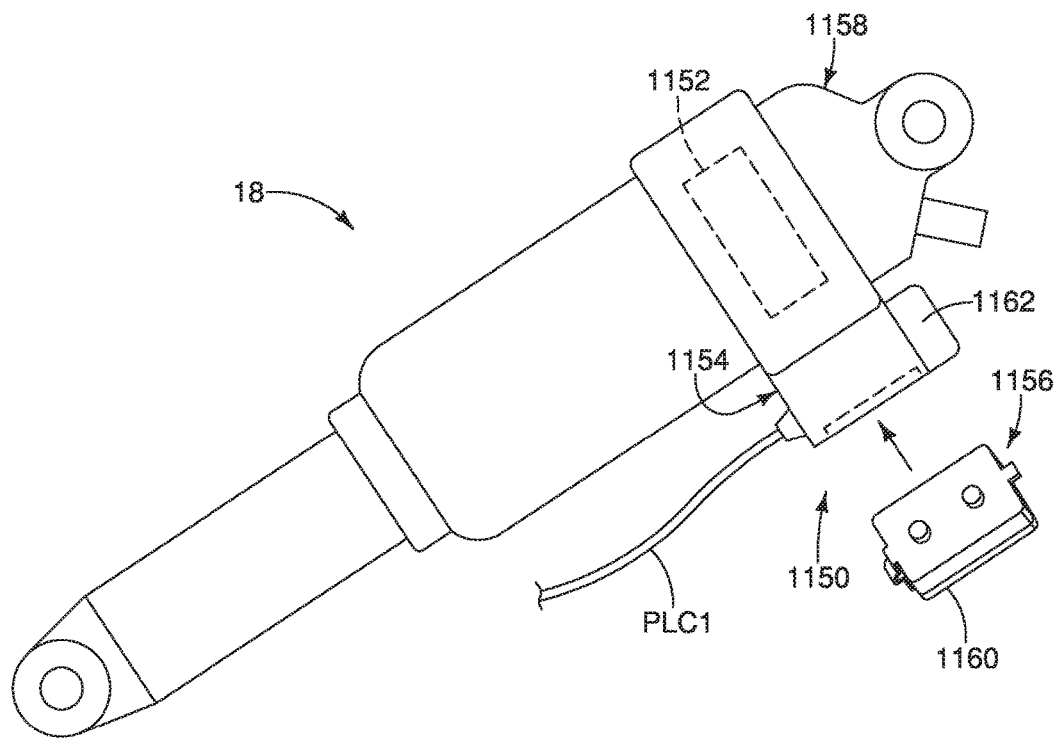
FIG. 37 is an outside elevational view of the rear suspension illustrated in FIG. 36 showing the wireless communication unit in an uninstalled position.

Turning now to FIGS. 1, 36 and 37, the rear shock 18 will now be discussed in accordance with the first embodiment. As seen in FIG. 1, the rear shock 18 is mounted between the main frame 12 and the rear swing arm 16. Here, while the cycle computer 44 is set to a suspension adjustment mode, one or both of the first and second electrical component operating devices 46 and 48 can be used to control the rear shock 18 based on a shifting program stored in the memory of the cycle computer 44.

Basically, the rear shock 18 (the bicycle electrical component) comprises a support structure 1150, a movable member 1152 (e.g., a valve), an electrical actuation unit 1154 and a wireless communication unit 1156. Here, the rear shock 18 (the bicycle electrical component) further comprises a base member 1158 that is configured to mount the electrical actuation unit 1154 to the bicycle frame 12.

In the rear shock 18, the support structure 1150 is partially defined by the electrical actuation unit 1154 and partially defined by the wireless communication unit 1156. In particular, the wireless communication unit 1156 includes a first housing 1160 forming a first part of the support structure 1150 in the same manner as the wireless communication unit 456, and the electrical actuation unit 1154 includes a second housing 1162 in the same manner as the wireless communication unit 462.

Here, the electrical actuation unit 1154 and the wireless communication unit 1156 are detachably coupled together using a snap-fit connection that the same as used with the front derailleur 440. In fact, the wireless communication unit 1156 is identical to the wireless communication units 456, 956 and 1056, which are discussed above. Thus, the wireless communication units 456, 956, 1056 and 1156 are interchangeable.

Figure 38:
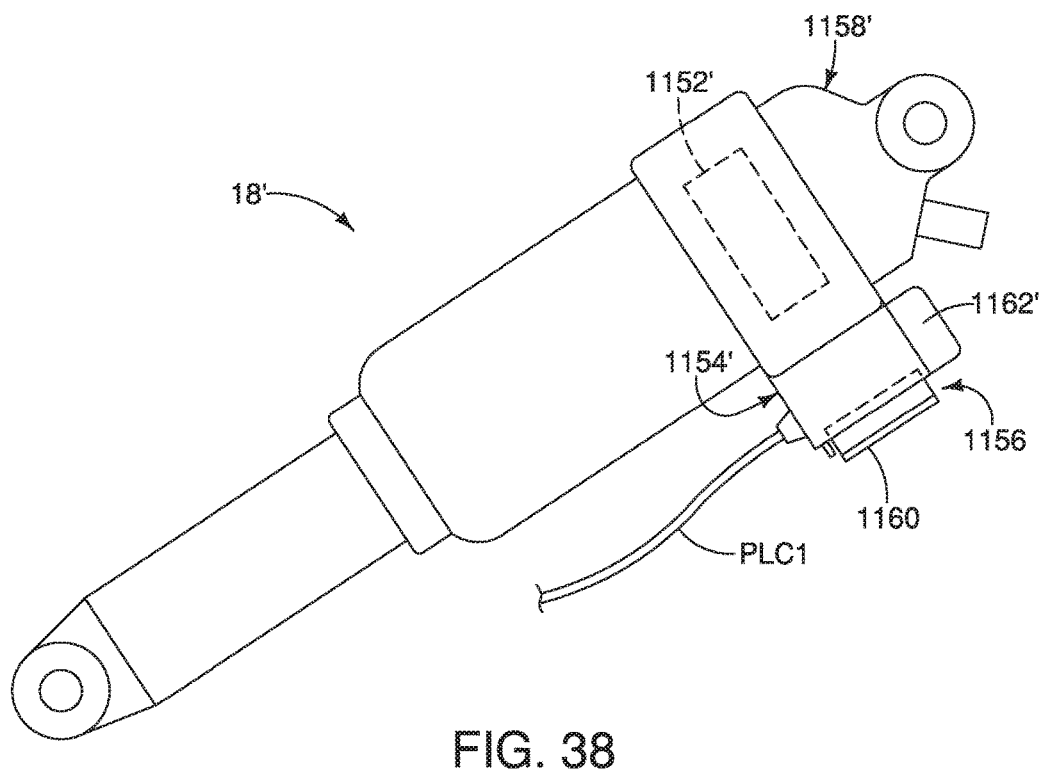
FIG. 38 is an outside elevational view of a rear suspension having a wireless communication unit in accordance with a variation of the first embodiment of the rear suspension showing the wireless communication unit in an installed position.
Figure 39:
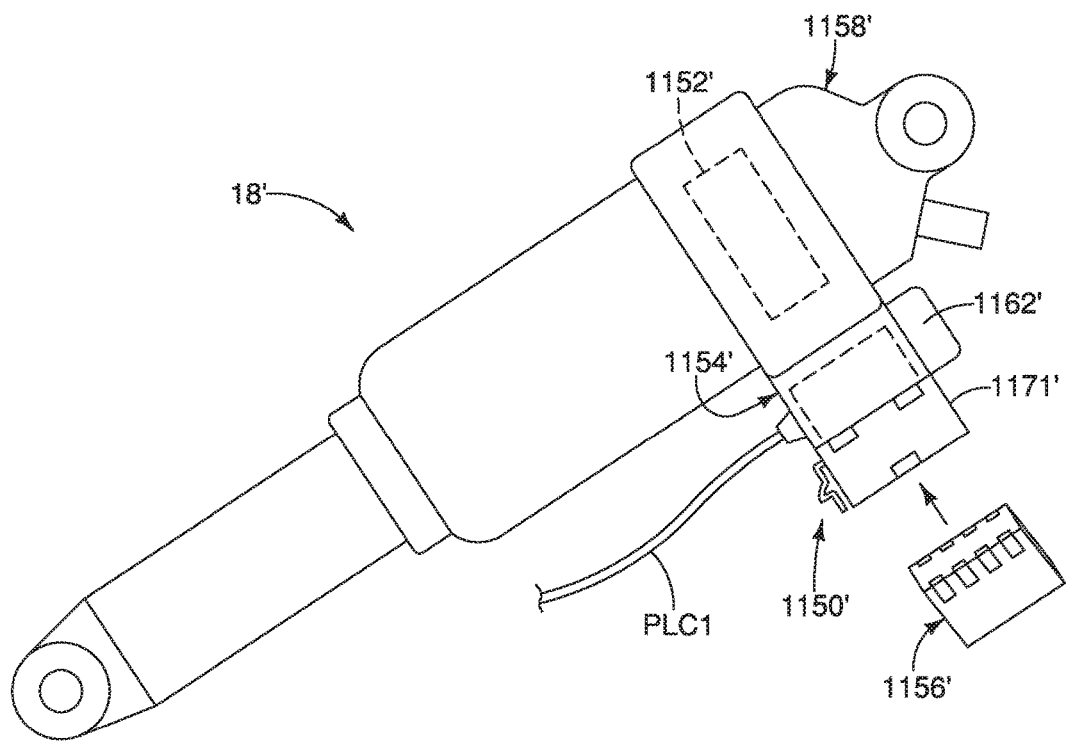
FIG. 39 is an outside elevational view of the rear suspension illustrated in FIG. 38 showing the wireless communication unit in an uninstalled position.

Turning now to FIGS. 38 and 39, a rear shock 18' will now be discussed in accordance with a variation of the rear shock 18. Basically, the rear shock 18' (the bicycle electrical component) comprises a support structure 1150', a movable member 1152' (e.g., a valve), an electrical actuation unit 1154' and a wireless communication unit 1156'. Here, the rear shock 18' (the bicycle electrical component) further comprises a base member 1158' that is configured to mount the electrical actuation unit 1154' to the bicycle frame 12.

In the rear shock 18, the support structure 1150' is partially defined by the electrical actuation unit 1154' and partially defined by the wireless communication unit 1156. In particular, the wireless communication unit 1156' includes a first housing 1160' forming a first part of the support structure 1150' in the same manner as the wireless communication unit 656, and the electrical actuation unit 1154' includes a second housing 1162 in the same manner as the wireless communication unit 662'.

Here, the electrical actuation unit 1154' and the wireless communication unit 1156' are detachably coupled together using a hinged cover 1171'. Here, the hinged cover 1171' is hingedly mounted to the second housing 1162' between a closed position and an open position. The hinged cover 1 171' is provided with a latch that engages a catch of the second housing 1162' so that the hinged cover 1171' is held in the closed position by a snap-fit connection. The rear derailleur 42' uses the hinged cover 1071' as used with the front derailleur 640. In fact, the wireless communication unit 1056' is identical to the wireless communication units 656, 956' and 1156', which are discussed above. Thus, the wireless communication units 656, 956', 1056' and 1156' are interchangeable.

Turning now to FIGS. 40 to 49, a front derailleur 1240 will now be discussed in accordance with another embodiment. The front derailleur 1240 can be mounted to the bicycle frame 12 in place of the front derailleur 40 so as to be operated by one or both of the first and second electrical component operating devices 46 and 48. The front derailleur 1240 can receive control signals from the one or both of the first and second electrical component operating devices 46 and 48 either wirelessly or using power line communications. The basic operation of the front derailleur 1240 is identical to the front derailleur 40.

The front derailleur 1240 is substantially identical to the front derailleur 40 except that the power supply connection structure has been modified and the wireless communication unit mounting structure has been modified. In view of the similarities between the front derailleurs 40 and 1240, the structure of the front derailleur 1240 that is substantially identical or identical to the corresponding the structure of the front derailleur 40 will not be discussed herein for the sake of brevity.

Basically, the front derailleur 1240 (the bicycle electrical component) comprises a support structure 1250, a movable member 1252, an electrical actuation unit 1254 and a wireless communication unit 1256. The movable member 1252 is operatively coupled to the electrical actuation unit 1254 to move the movable member 1252 between a first (retracted) position and a second (extended) position by a linkage 1257. Here, the front derailleur 1240 (the bicycle electrical component) further comprises a base member 1258 that is configured to support the electrical actuation unit 1254 with respect to the bicycle frame 12. Alternatively, the electrical actuation unit 1254 can directly mounted to the bicycle frame 12. Also, the movable member 1252 includes a chain guide 1252a that is operatively coupled to the electrical actuation unit 1254 to move the chain guide 1252a between a first position and a second position similar to the first embodiment as discussed above. Thus, the base member 1258 is also configured to support the chain guide 1252a with respect to the bicycle frame 12.

Figure 40:
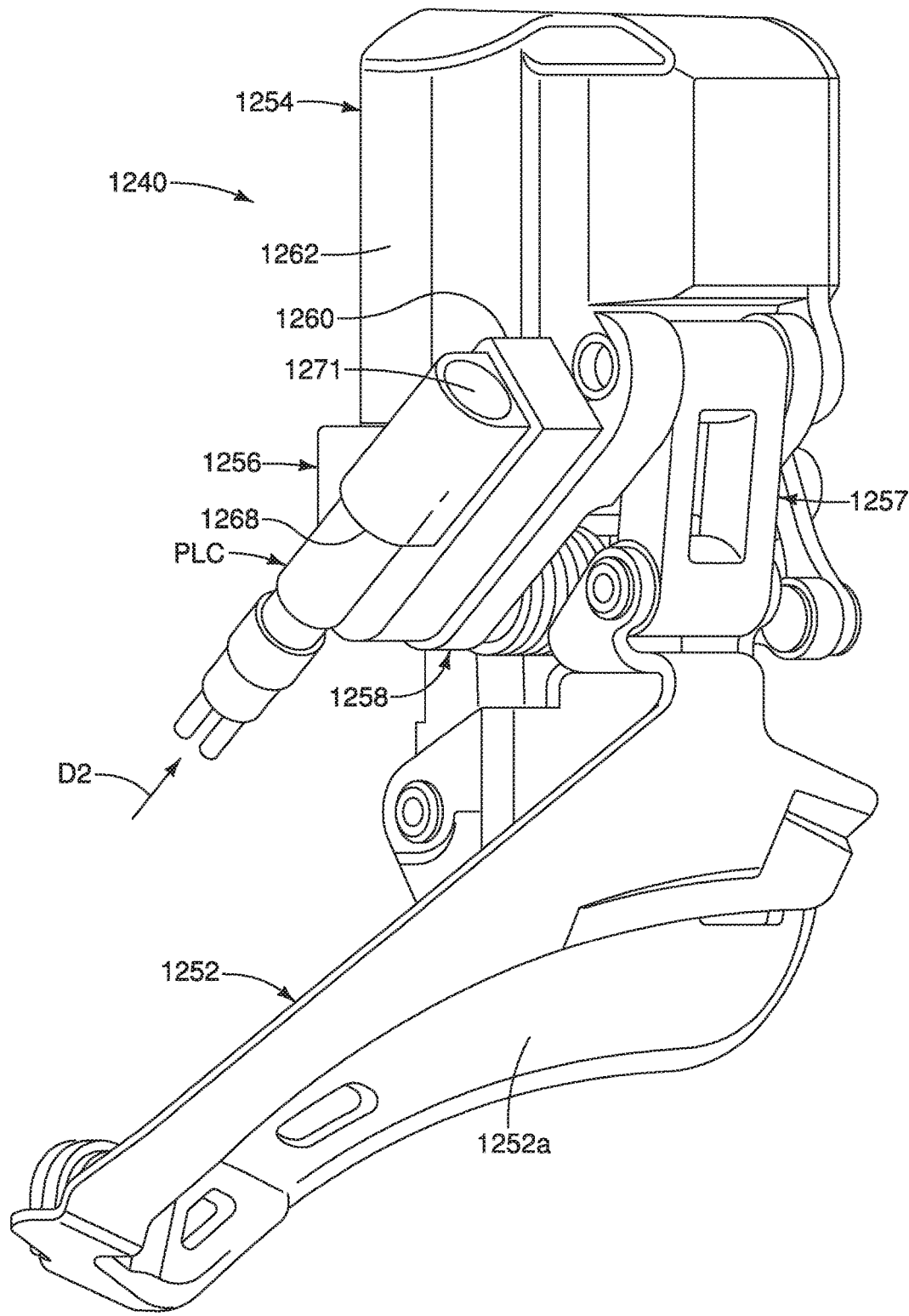
FIG. 40 is an outside rear perspective view, similar to FIG. 5, of a front derailleur in accordance with another embodiment having a wireless communication unit in an installed position.
Figure 41:
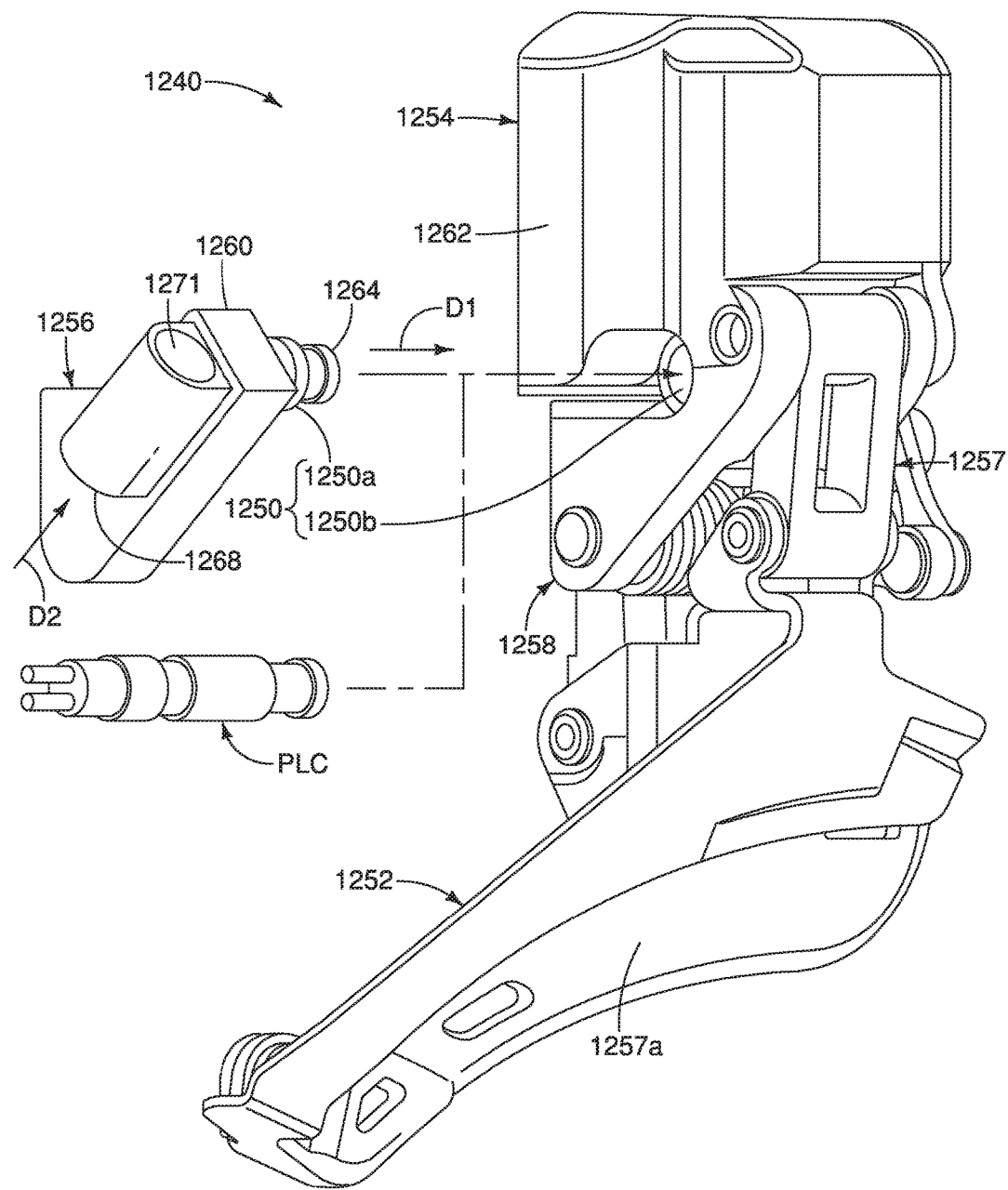
FIG. 41 is an outside rear perspective view of the front derailleur illustrated in FIG. 40 showing the wireless communication unit in an uninstalled position so that an electrical cable can be plugged directly into the electrical port of the electrical actuation unit.
Figure 42:
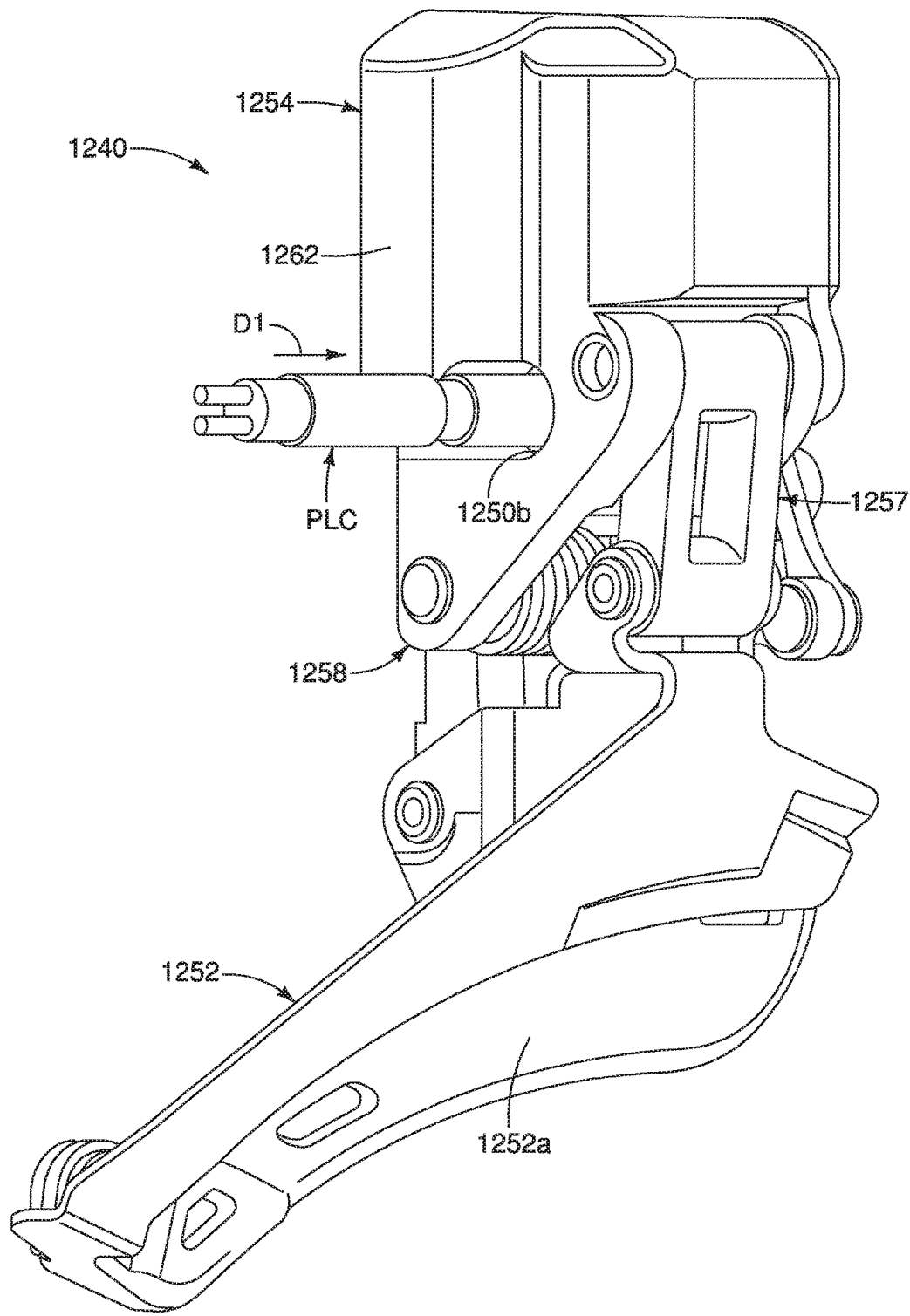
FIG. 42 is an outside rear perspective view of the front derailleur illustrated in FIGS. 40 and 41 showing the electrical cable plugged directly into the electrical port of the electrical actuation unit.

In this embodiment, as illustrated in FIGS. 40 to 42, the electrical cable (power supply line) PLC can be either directly connected to (i.e., plugged into) the electrical actuation unit 1254 (see FIG. 42), or directly connected to (i.e., plugged into) the wireless communication unit 1256 (see FIG. 40). In particular, the electrical cable (power supply line) has a first end detachably connected to the electrical actuation unit 1254 for supplying electrical power from the power supply unit (e.g., the power supply unit 38 of FIG. 1). Similar to the first embodiment, the electrical cable PLC has a second end detachably connected to a wiring junction (not shown) for receiving electrical power and/or control signals via power line communications. When the wireless communication unit 1256 is installed on the front derailleur 1240 and wirelessly receiving control signals from the one or both of the first and second electrical component operating devices 46 and 48, the electrical cable PLC can be used to supply only electrical power to the electrical actuation unit 1254. However, when the wireless communication unit 1256 is not installed or not being used, the electrical cable PLC can be used to transmit control signals from the one or both of the first and second electrical component operating devices 46 and 48 to the electrical actuation unit 1254 using power line communications. However, even when the wireless communication unit 1256 is installed on the front derailleur 1240, the electrical cable PLC can be used to supply electrical power to the electrical actuation unit 1254 and transmit control signal from the one or both of the first and second electrical component operating devices 46 and 48. In such a case, the wireless communication unit 1256 can be used for a wireless communication with other devices, such as a smart-phone or a personal computer, for updating firmware stored in a memory disposed in at least one of the bicycle electrical component, for example.

In the front derailleur 1240, the support structure 1250 is partially defined by the electrical actuation unit 1254 and partially defined by the wireless communication unit 1256. In particular, the wireless communication unit 1256 includes a first housing 1260. The electrical actuation unit 1254 includes a second housing 1262. The second housing 1262 is different from the first housing 1260 (i.e., the first and second housings 1260 and 62 are separate and distinct members). The support structure 1250 is disposed on at least one of the first housing 1260 and the second housing 1262. Here, the support structure 1250 includes a mating portion 1250a (projecting portion) for engaging the second housing 1262. The support structure 1250 includes a first space 1250b that is formed by the second housing 1262 of the electrical actuation unit 1254 within which the mating portion 1250a of the first housing 1260 is to be supported.

Referring to FIGS. 45 to 49, the wireless communication unit 1256 includes an electrical connector 1264 that is configured to plugs into the second housing 1262 of the electrical actuation unit 1254. Here, the electrical connector 1264 is an electrical male plug connector such as a SD50 male electrical connector. The wireless communication unit 1256 further includes a wireless communication member 1266 that is contained within the first housing 1260. The electrical connector 1264 is electrically connected to the wireless communication member 1266. The wireless communication member 1266 includes a printed circuit board with a two-way wireless communication circuit printed thereon. Preferably, the printed circuit board of the wireless communication member 1266 includes an antenna for transmitting and receiving wireless signals.

Figure 46:
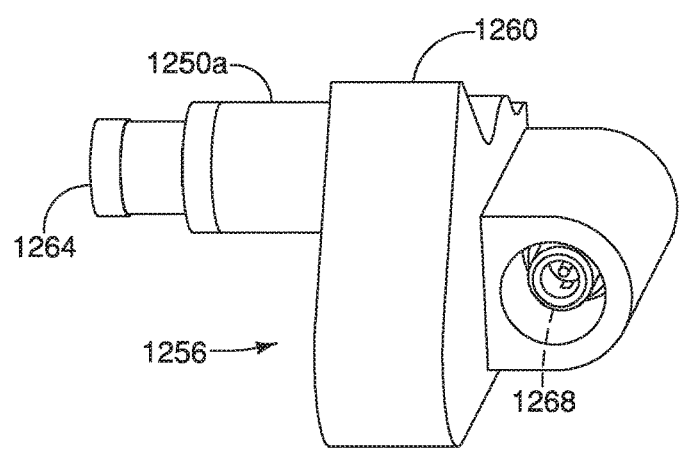
FIG. 46 is a perspective view of the wireless communication unit for the front derailleur illustrated in FIGS. 40 to 45 showing an electrical connector (female electrical receptor or port) of the wireless communication unit that receives a mating electrical connector (electrical male plug connector) of an electrical cable.
Figure 47:
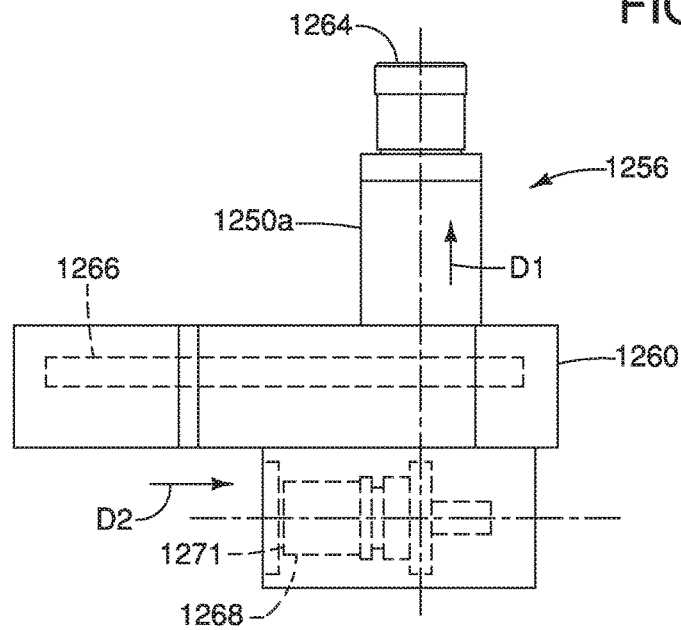
FIG. 47 is an oblique view of the wireless communication unit for the front derailleur illustrated in FIGS. 40 to 46 showing that the electrical connectors of the wireless communication unit are perpendicularly arranged.
Figure 48:
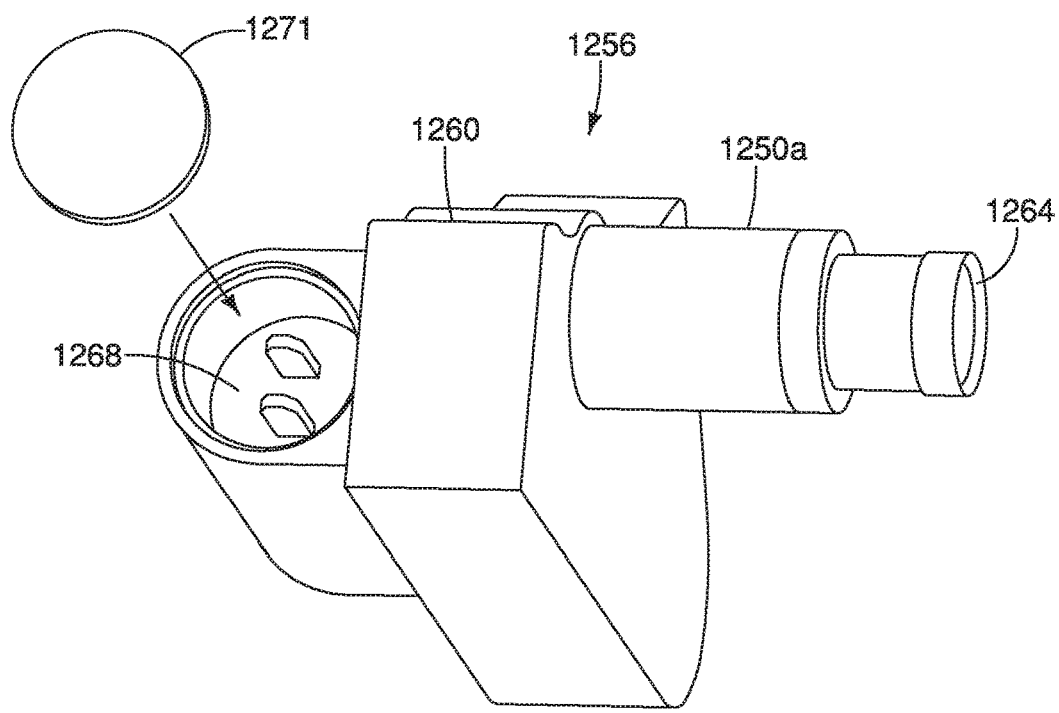
FIG. 48 is a perspective oblique view of the wireless communication unit for the front derailleur illustrated in FIGS. 40 to 47 showing a cap of the wireless communication unit in an exploded position to expose the electrical connector (female electrical receptor or port) of the wireless communication unit.
Figure 49:
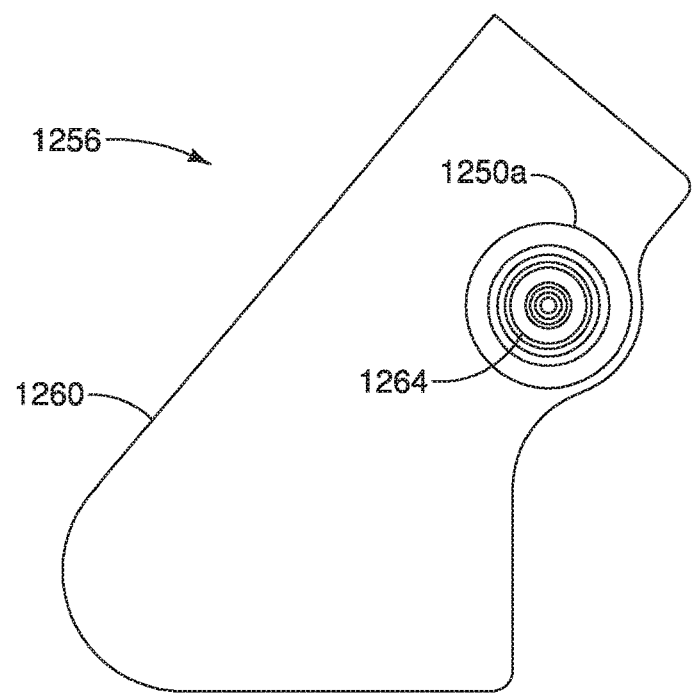
FIG. 49 is an elevational view of the wireless communication unit for the front derailleur illustrated in FIGS. 41 to 48 showing the electrical connector (electrical male plug connector) of the wireless communication unit that plugs into a mating electrical connector (female electrical receptor or port) of the electrical actuation unit.

As seen in FIGS. 46 and 47, the wireless communication unit 1256 includes at least one electrical port 1268 that is configured to be connected to the electrical cable PLC (see FIG. 42). Here, the electrical port 1268 is an electrical female electrical receptor or port such as a SD50 female electrical receptor. In this way, the wireless communication unit 1256 can receive electrical power from the power supply unit (e.g., the power supply unit 38 of FIG. 1).

Figure 43:
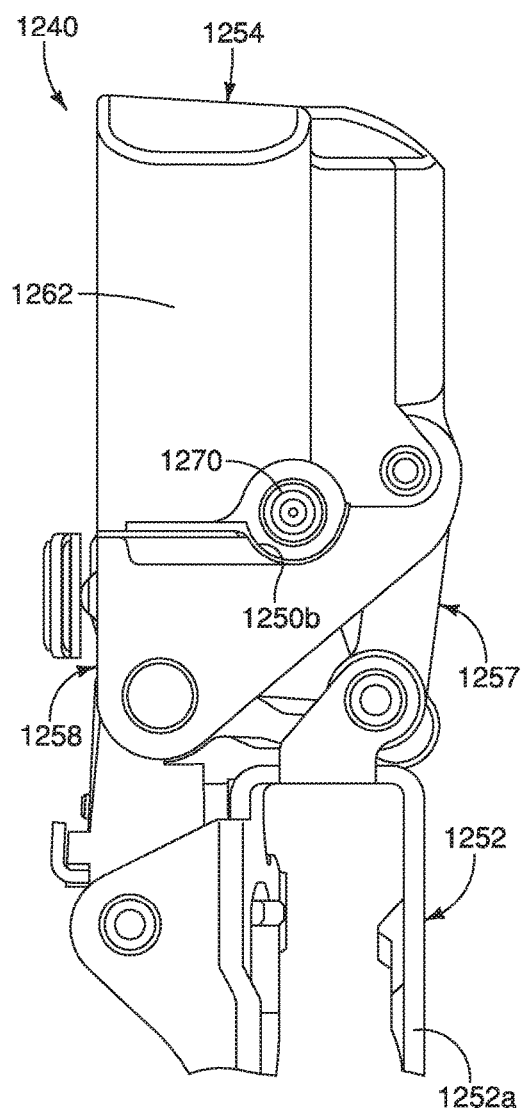
FIG. 43 is a rear end elevational view of the front derailleur illustrated in FIGS. 40 to 42 showing the chain guide in the retracted position with the wireless communication unit removed.
Figure 44:
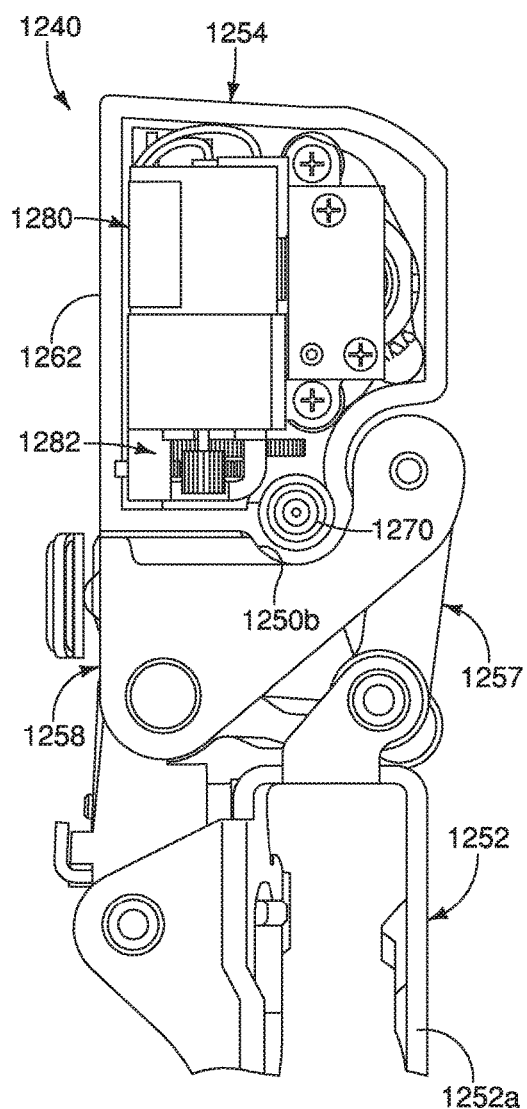
FIG. 44 is a rear end elevational view of the front derailleur illustrated in FIGS. 40 to 43 showing the chain guide in the retracted position with the wireless communication unit removed and a portion of the housing for the electrical actuation unit removed.
Figure 45:
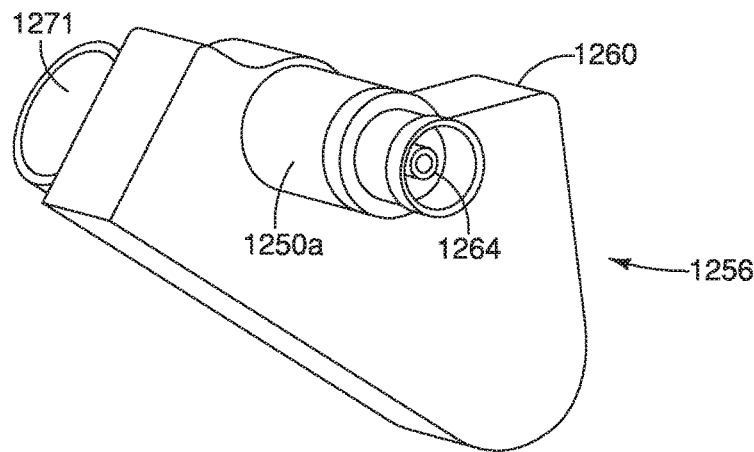
FIG. 45 is a perspective view of the wireless communication unit for the front derailleur illustrated in FIGS. 40 to 44 showing an electrical connector (electrical male plug connector) of the wireless communication unit that plugs into a mating electrical connector (female electrical receptor or port) of the electrical actuation unit.

As can be seen from FIGS. 42 to 44, the electrical actuation unit 1254 includes at least one electrical port 1270 that is configured to be connected to the electrical connector 1264 of the wireless communication unit 1256. The electrical port 1270 is configured to electrically connect with the electrical connector in a state where the first housing 1260 is disposed in the first space 1250b. Here, the electrical port 1270 is an electrical female electrical receptor or port such as a SD50 female electrical receptor. Thus, in this embodiment, the electrical connector 1264 mates with the electrical port 1270 to establish an electrical connection between the electrical actuation unit 1254 and the wireless communication unit 1256. Also, this mating connection between the electrical actuation unit 1254 and the wireless communication unit 1256 retains the wireless communication unit 1256 on the electrical actuation unit 1254.

The at least one electrical port 1270 of the electrical actuation unit 1254 is configured to be selectively connected to the electrical cable PLC upon disconnecting the electrical connector 1264 of the wireless communication unit 1256 from the at least one electrical port 1270 of the electrical actuation unit 1254.

As can be seen from FIGS. 40, 42 and 46, the electrical connector 1264 of the wireless communication unit 1256 is configured to be connected to the electrical port 1270 of the electrical actuation unit 1254 in a first connecting direction D1, and the electrical port 1268 of the wireless communication unit 1256 is configured to be connected to the electrical cable PLC in a second connecting direction D2 that is different from the first connecting direction D1. In the illustrated embodiment, the first connecting direction is perpendicular to the second connecting direction D2. The at least one electrical port of the electrical actuation unit 1254 and the at least one electrical port 1268 of the wireless communication unit 1256 have identical electrical connector mating structures. In this way, the electrical cable PLC can be selectively plugged into either the electrical port of the electrical actuation unit 1254 or the electrical port 1268 of the wireless communication unit 1256. While in this illustrated embodiment, the electrical cable PLC is plugged into the electrical port 1268 of the wireless communication unit 1256, it will be apparent from this disclosure that the electrical cable PLC can be directly wired to the wireless communication member 1266 in the first housing 1260 of the wireless communication unit 1256. In other words, the wireless communication unit 1256 includes at least one of an electrical port and an electrical cable that is disposed at the first housing 1260. Here, in this illustrated embodiment, the wireless communication unit 1256 includes a cap 1271 removably coupled to the first housing 1260 for selectively covering the at least one electrical port 1268 (i.e., the SD50 female electrical receptor) that is disposed at the first housing 1260. In this way, the SD50 female electrical receptor can be covered for waterproof and dust-proof when the electrical cable PLC is not plugged into the electrical port 1268.

As seen in FIG. 44, the electrical actuation unit 1254 includes an electrical actuator 1280 and a gear reduction unit 1282 that are contained within the second housing 1262. The electrical actuator 1280 is electrically connected to a printed circuit board (not shown) that has the same functions as the printed circuit board 74 of the first embodiment. In the front derailleur 1240, the electrical actuator 1280 is a reversible electric motor. The electrical actuator 1280 is configured to actuate the movable member 1252 in the same manner as the first embodiment. A position sensor (not shown) is provided to the gear reduction unit 1282 for detecting an amount of rotational movement being outputted by the gear reduction unit 1282. The printed circuit board of the electrical actuation unit 1254 is provided with an actuator driver (not shown) for controlling the electrical actuator 1280 and a position detection circuit (not shown) for determining the amount of rotational movement is being outputted by the gear reduction unit 1282. Position sensors, actuator (motor) drivers and position detection circuits are well known in the bicycle field, and thus, they will not be discussed herein.

Turning now to FIGS. 50 to 56, a rear derailleur 1342 will now be discussed in accordance with another embodiment. The rear derailleur 1342 can be mounted to the bicycle frame 12 in place of the rear derailleur 42 so as to be operated by one or both of the first and second electrical component operating devices 46 and 48. The rear derailleur 1342 can receive control signals from the one or both of the first and second electrical component operating devices 46 and 48 either wirelessly or using power line communications. The basic operation of the rear derailleur 1342 is identical to the rear derailleur 42.

The rear derailleur 1342 is substantially identical to the rear derailleur 42 except that the power supply connection structure has been modified and the wireless communication unit mounting structure has been modified. In view of the similarities between the rear derailleurs 42 and 1342, the structure of the rear derailleur 1342 that is substantially identical or identical to the corresponding the structure of the rear derailleur 42 will not be discussed herein for the sake of brevity.

Basically, the rear derailleur 1342 (the bicycle electrical component) comprises a support structure 1350, a movable member 1352, an electrical actuation unit 1354 and a wireless communication unit 1356. The movable member 1352 is operatively coupled to the electrical actuation unit 1354 to move the movable member 1352 between a first (retracted) position and a second (extended) position by a linkage 1357. Here, the rear derailleur 1342 (the bicycle electrical component) further comprises a base member 1358 that is configured to support the electrical actuation unit 1354 with respect to the bicycle frame 12. Also, the movable member 1352 includes a chain guide 1352*a* that is operatively coupled to the electrical actuation unit 1354 to move the chain guide 1352*a* between a first position and a second position similar to the rear derailleur 42 as discussed above. Thus, the base member 1358 is also configured to support the chain guide 1352*a* with respect to the bicycle frame 12.

Figure 50:
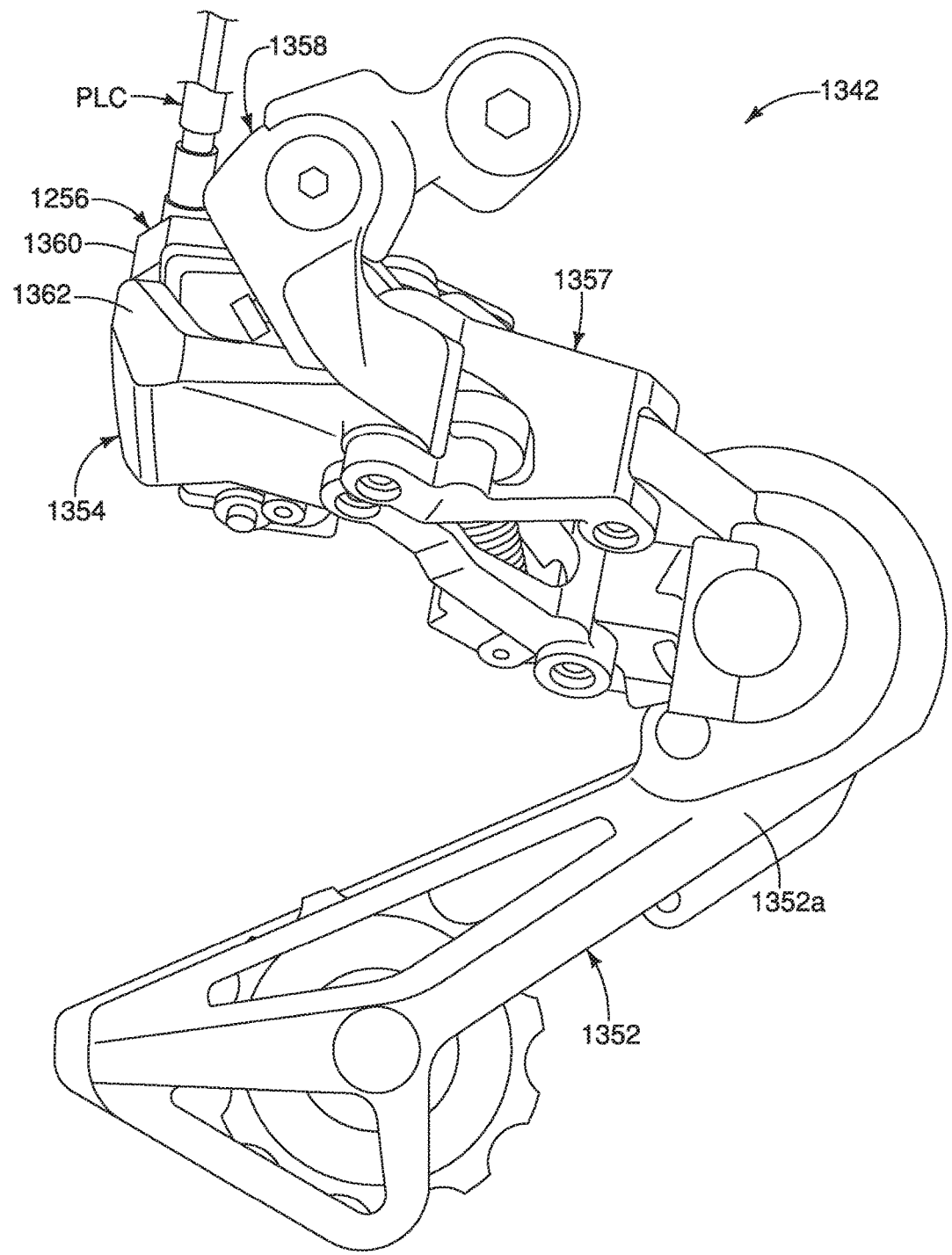
FIG. 50 is an outside elevational view of a rear derailleur in accordance with another embodiment having a wireless communication unit in an installed position.
Figure 51:
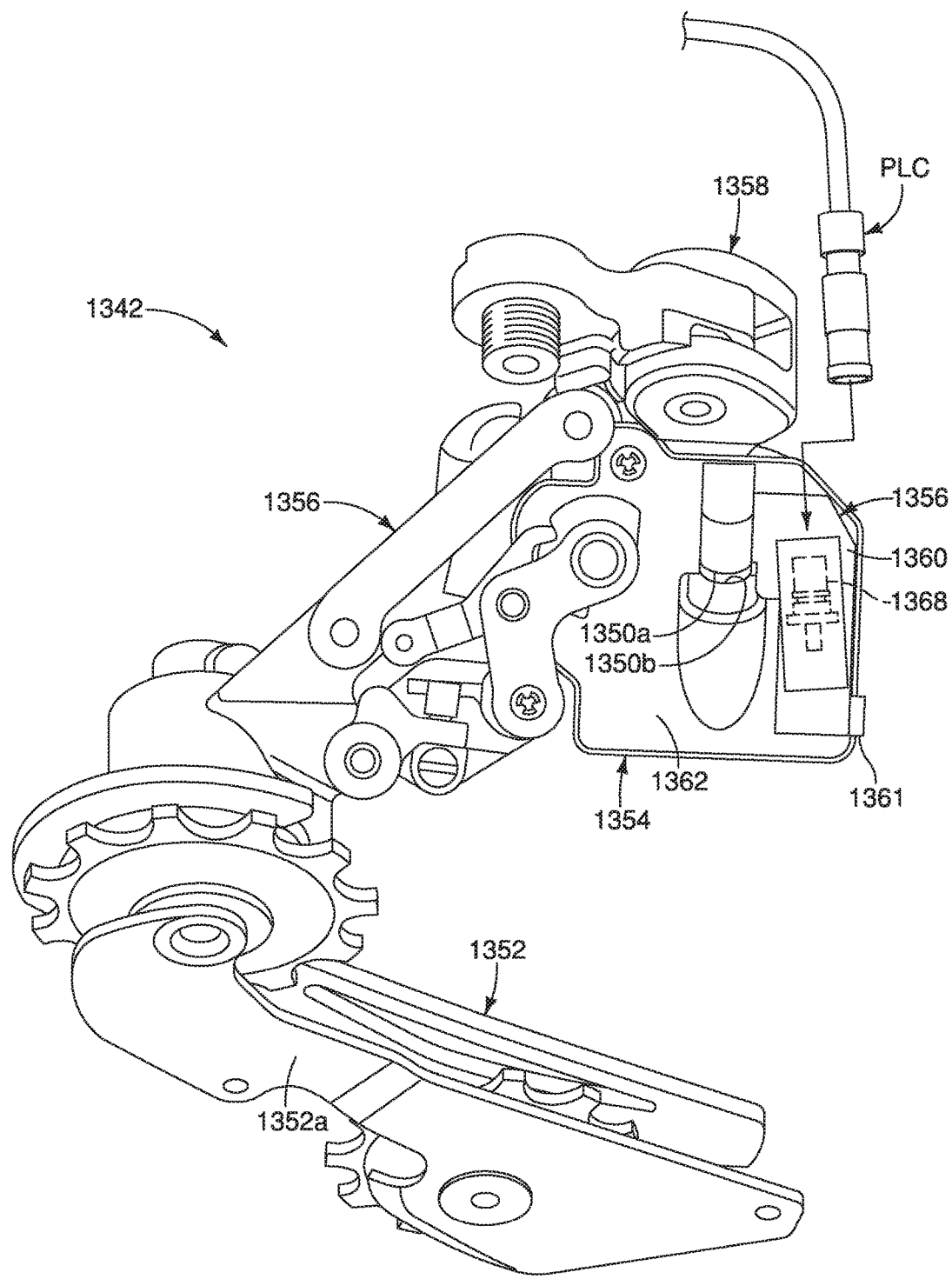
FIG. 51 is an inside elevational view of the rear derailleur illustrated in FIG. 50 with the electrical cable unplug from the wireless communication unit.
Figure 52:
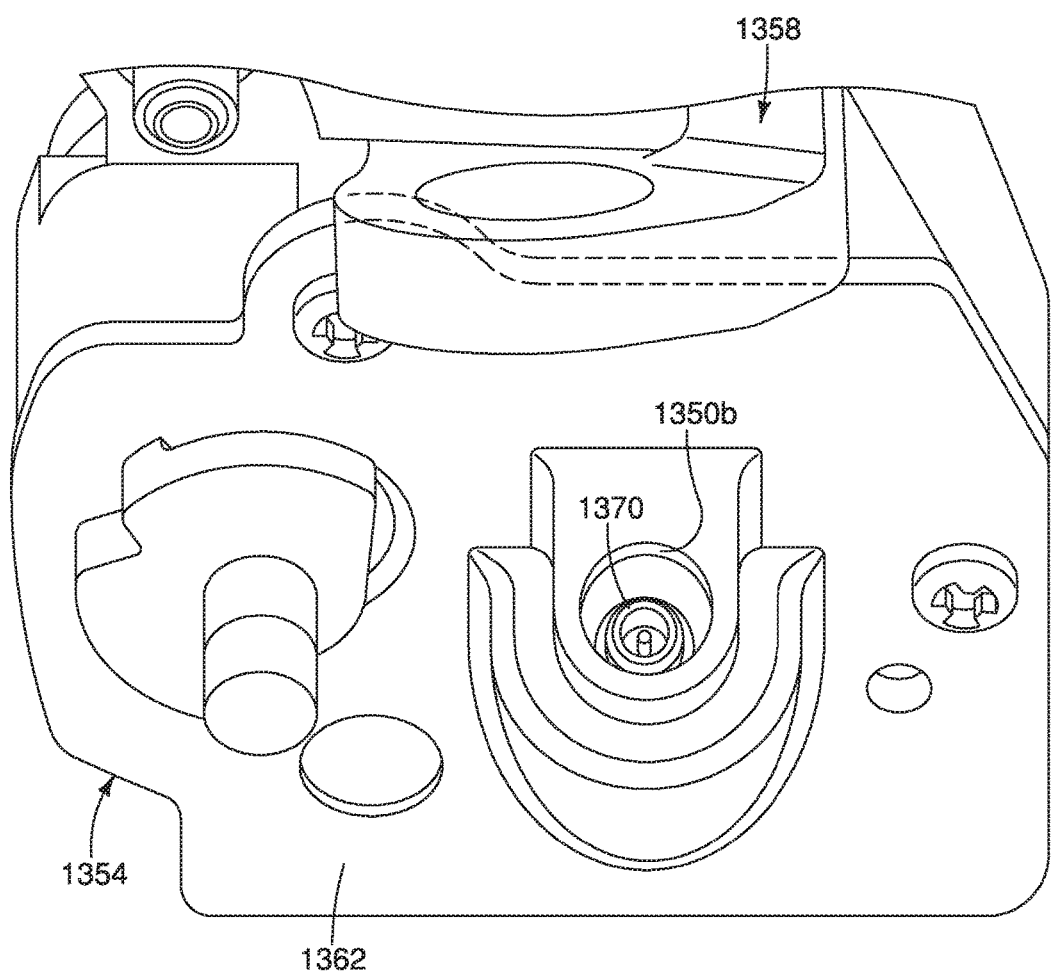
FIG. 52 is an inside perspective view of the base of the rear derailleur illustrated in FIGS. 50 and 51 with the wireless communication unit removed to show a mating electrical connector (female electrical receptor or port) of the electrical actuation unit that receives the electrical connector (electrical male plug connector) of the wireless communication unit.
Figure 53:
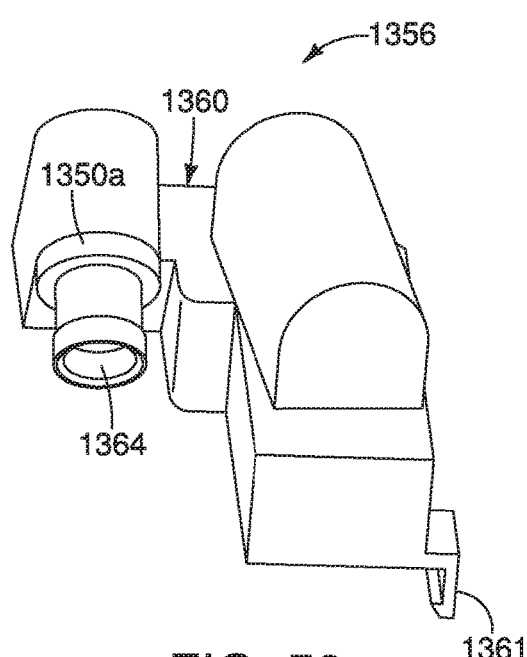
FIG. 53 is a perspective view of the wireless communication unit for the rear derailleur illustrated in FIGS. 50 to 52 showing the electrical connector (electrical male plug connector) of the wireless communication unit that plugs into a mating electrical connector (female electrical receptor or port) of the electrical actuation unit.
Figure 54:
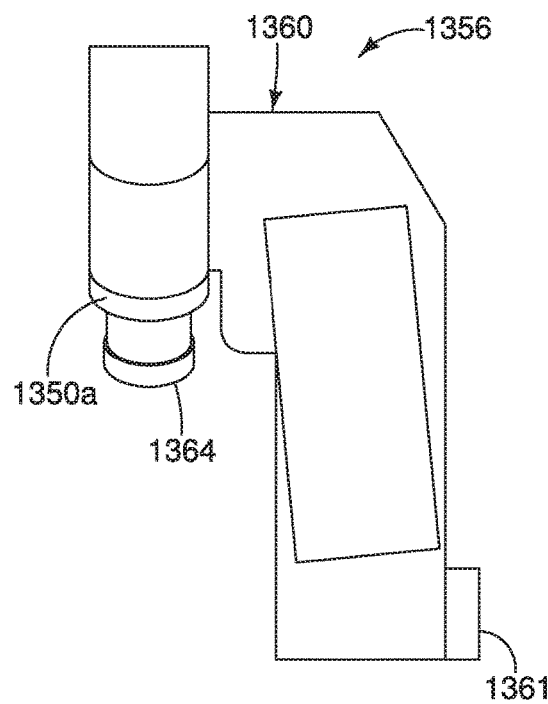
FIG. 54 is a perspective view of the wireless communication unit for the front derailleur illustrated in FIGS. 50 to 52 showing the arrangement of the electrical connectors of the wireless communication unit with respect to each other.
Figure 55:
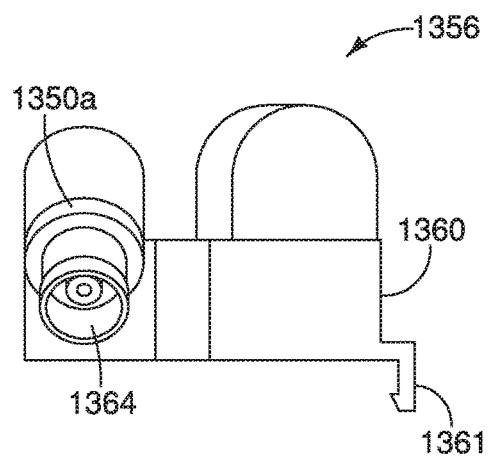
FIG. 55 is another perspective view of the wireless communication unit for the front derailleur illustrated in FIGS. 50 to 52 showing the electrical connector (electrical male plug connector) of the wireless communication unit that plugs into a mating electrical connector (female electrical receptor or port) of the electrical actuation unit.

In this embodiment, similar to the front derailleur 1240, the electrical cable (power supply line) PLC can be either directly connected to (i.e., plugged into) the electrical actuation unit 1354, or directly connected to (i.e., plugged into) the wireless communication unit 1356 (see FIG. 50). In particular, the electrical cable (power supply line) PLC has a first end detachably connected to the electrical actuation unit 1354 for supplying electrical power from the power supply unit (e.g., the power supply unit 38 of FIG. 1). Similar to the rear derailleur 42, the electrical cable PLC has a second end detachably connected to a wiring junction (not shown) for receiving electrical power and/or control signals via power line communications. When the wireless communication unit 1356 is installed on the rear derailleur 1342 and wirelessly receiving control signals from the one or both of the first and second electrical component operating devices 46 and 48, the electrical cable PLC can be used to supply only electrical power to the electrical actuation unit 1354. However, when the wireless communication unit 1356 is not installed or not being used, the electrical cable PLC can be used to transmit control signals from the one or both of the first and second electrical component operating devices 46 and 48 to the electrical actuation unit 1354 using power line communications. However, even when the wireless communication unit 1356 is installed on the rear derailleur 1342, the electrical cable PLC can be used to supply electrical power to the electrical actuation unit 1354 and transmit control signal from the one or both of the first and second electrical component operating devices 46 and 48. In such a case, the wireless communication unit 1356 can be used for a wireless communication with other devices, such as a smart-phone or a personal computer, for updating firmware stored in a memory disposed in at least one of the bicycle electrical component, for example.

In the rear derailleur 1342, the support structure 1350 is partially defined by the electrical actuation unit 1354 and partially defined by the wireless communication unit 1356.

In particular, the wireless communication unit 1356 includes a first housing 1360. The electrical actuation unit 1354 includes a second housing 1362. Here, the support structure 1350 includes a mating portion 1350a (projecting portion) for engaging the second housing 1362. The support structure 1350 includes a first space 1350b that is formed by the second housing 1362 of the electrical actuation unit 1354 within which the mating portion 1350a of the first housing 1360 is to be supported. The first housing 1360 further includes a resilient hook 1363 that aids in supporting and retaining the first housing 1360 on the second housing 1362. Thus, the resilient hook 1363 is a part of the support structure 1350. Here, the resilient hook 1363 engages an edge or notch of the second housing 1362 via a snap-fit during insertion of the mating portion 1350a (projecting portion) into the first space 1350b of the second housing 1362.

Referring to FIGS. 53 to 56, the wireless communication unit 1356 includes an electrical connector 1364 that is configured to plugs into the second housing 1362 of the electrical actuation unit 1354. Here, the electrical connector 1364 is an electrical male plug connector such as a SD50 male electrical connector. Similar to the wireless communication unit 1256, discussed above, the wireless communication unit 1356 further includes a wireless communication member that is contained within the first housing 1360. The electrical connector 1364 is electrically connected to the wireless communication member. The wireless communication member includes a printed circuit board with a two-way wireless communication circuit printed thereon. Preferably, the printed circuit board of the wireless communication member includes an antenna for transmitting and receiving wireless signals.

Figure 56:
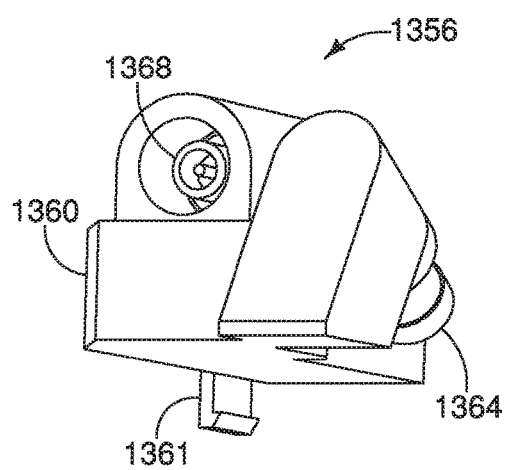
FIG. 56 is perspective view of the wireless communication unit for the front derailleur illustrated in FIGS. 50 to 52 showing the electrical connector (female electrical receptor or port) of the wireless communication unit that receives a mating electrical connector (electrical male plug connector) of an electrical cable.

As seen in FIG. 56, the wireless communication unit 1356 includes at least one electrical port 1368 that is configured to be connected to the electrical cable PLC (see FIG. 42). Here, the electrical port 1368 is an electrical female electrical receptor or port such as a SD50 female electrical receptor. In this way, the wireless communication unit 1356 can receive electrical power from the power supply unit (e.g., the power supply unit 38 of FIG. 1).

As can be seen from FIGS. 42 to 44, the electrical actuation unit 1354 includes at least one electrical port 1370 that is configured to be connected to the electrical connector 1364 of the wireless communication unit 1356. The electrical port 1370 is configured to electrically connect with the electrical connector 1364 in a state where the first housing 1360 is disposed in the first space 1350b. Here, the electrical port 1370 is an electrical female electrical receptor or port such as a SD50 female electrical receptor. Thus, in this embodiment, the electrical connector 1364 mates with the electrical port 1370 to establish an electrical connection between the electrical actuation unit 1354 and the wireless communication unit 1356. Also, this mating connection between the electrical actuation unit 1354 and the wireless communication unit 1356 retains the wireless communication unit 1356 on the electrical actuation unit 1354.

The electrical port 1370 of the electrical actuation unit 1354 is configured to be selectively connected to the electrical cable PLC upon disconnecting the electrical connector 1364 of the wireless communication unit 1356 from the electrical port 1370 of the electrical actuation unit 1354. In this way, the electrical cable PLC can be selectively plugged into either the electrical port of the electrical actuation unit 1354 or the electrical port 1368 of the wireless communication unit 1356. While in this illustrated embodiment, the electrical cable PLC is plugged into the electrical port 1368 of the wireless communication unit 1356, it will be apparent from this disclosure that the electrical cable PLC can be directly wired to the wireless communication member 1366 in first housing 1360 of the wireless communication unit 1356. In other words, the wireless communication unit 1356 includes at least one of an electrical port and an electrical cable that is disposed at the first housing 1360.

While only selected embodiments are illustrated for a front derailleur, a rear derailleur, an adjustable seatpost and a bicycle suspension, it will be apparent from this disclosure that features of each of the illustrated embodiments and the illustrated variations can be adapted to each of a front derailleur, a rear derailleur, an adjustable seatpost and a bicycle suspension. Also, while illustrations of a front suspension fork are not shown having the detachable wireless communication unit of the present invention, it will be apparent from this disclosure that each of the illustrated embodiments and the illustrated variations shown can be adapted to a front suspension fork.

The term "wireless communication unit" as used herein includes a transceiver or a transmitter-receiver, and contemplates any device or devices, separate or combined, capable of transmitting and receiving wireless signals, including shift signals or control, command or other signals or firmware related to some function of the component being controlled.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle electrical component. Accordingly, these directional terms, as utilized to describe the bicycle electrical component should be interpreted relative to a bicycle in an upright riding position on a horizontal surface and that is equipped with the bicycle electrical component. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electrical component comprising:
    a wireless communication unit including a first housing and a wireless communication member contained within the first housing;
    a movable member;
    an electrical actuation unit including a second housing and an electrical actuator contained within the second housing, the electrical actuator being configured to actuate the movable member, and the second housing being different from the first housing; and
    a support structure detachably supporting the wireless communication unit to the bicycle electrical component.

2. The bicycle electrical component according to claim 1, wherein
    the support structure is disposed on at least one of the first housing and the second housing.

3. The bicycle electrical component according to claim 2, wherein
    the support structure includes a first snap-fit structure and a second snap-fit structure that detachably engages the first snap fit structure, the first snap-fit structure being disposed on the first housing.

4. The bicycle electrical component according to claim 3, wherein
    one of the first and second snap-fit structures includes a latch and the other of the first and second snap-fit structures includes a catch.

5. The bicycle electrical component according to claim 2, wherein
    the support structure includes a recess within which the first housing is to be supported, the recess being formed on the second housing.

6. The bicycle electrical component according to claim 5, wherein
    the movable member includes a chain guide that is operatively coupled to the electrical actuation unit to move the chain guide between a first position and a second position; and
    the second housing having a frame facing surface that has the recess, the frame facing surface being configured to face a bicycle frame in a state where the bicycle electrical component is mounted to the bicycle frame.

7. The bicycle electrical component according to claim 2, wherein
    the wireless communication unit includes at least one of an electrical port and an electrical cable that is disposed at the first housing.

8. The bicycle electrical component according to claim 7, wherein
    the electrical actuation unit includes at least one electrical port disposed at the second housing, the at least one electrical port of the electrical actuation unit being configured to be electrically connected to the at least one of the electrical port and the electrical cable of the wireless communication unit.

9. The bicycle electrical component according to claim 1, wherein
    the wireless communication unit includes an electrical connector and the electrical actuation unit includes at least one electrical port that is configured to be connected to the electrical connector of the wireless communication unit.

10. The bicycle electrical component according to claim 9, wherein
    the at least one electrical port of the electrical actuation unit is configured to be selectively connected to an electrical cable upon disconnecting the electrical connector of the wireless communication unit from the at least one electrical port of the electrical actuation unit.

11. The bicycle electrical component according to claim 9, wherein
    the wireless communication unit includes at least one electrical port that is configured to be connected to an electrical cable.

12. The bicycle electrical component according to claim 11, wherein
    the electrical connector of the wireless communication unit is configured to be connected to the electrical port of the electrical actuation unit in a first connecting direction, and the electrical port of the wireless communication unit is configured to be connected to the electrical cable in a second connecting direction that is different from the first connecting direction.

13. The bicycle electrical component according to claim 12, wherein
    the first connecting direction is perpendicular to the second connecting direction.

14. The bicycle electrical component according to claim 11, wherein
    the at least one electrical port of the electrical actuation unit and the at least one electrical port of the wireless communication unit have identical electrical connector mating structures.

15. The bicycle electrical component according to claim 9, wherein the wireless communication unit includes at least one of an electrical port and an electrical cable that is disposed at the first housing.

16. The bicycle electrical component according to claim 15, wherein
the wireless communication unit includes a cap removably coupled to the first housing for selectively covering the at least one electrical port that is disposed at the first housing.

17. The bicycle electrical component according to claim 9, wherein
the movable member includes a chain guide that is operatively coupled to the electrical actuation unit to move the chain guide between a first position and a second position; and further comprising
a base member configured to support the electrical actuation unit and the chain guide, the at least one electrical port of the electrical actuation unit being formed between the base member and the second housing of the electrical actuation unit.

18. The bicycle electrical component according to claim 2, wherein
the wireless communication unit includes a first electrical contact, and
the electrical actuation unit includes a second electrical contact configured to electrically contact the first electrical contact in a state where the first housing is attached to the second housing.

19. The bicycle electrical component according to claim 18, wherein
one of the wireless communication unit and the electrical actuation unit includes a seal configured to surround the first and second electrical contacts in the state where the first housing is attached to the second housing.

20. The bicycle electrical component according to claim 18, further comprising
a cover configured to cover the second electrical contact that is disposed on the second housing when the first electrical contact of the wireless communication unit is detached from the second electrical contact.

21. The bicycle electrical component according to claim 1, wherein
the movable member includes a chain guide that is operatively coupled to the electrical actuation unit to move the chain guide between a first position and a second position; and further comprising
a base member configured to support the electrical actuation unit and the chain guide, the support structure being formed between the base member and the second housing of the actuation unit.

22. The bicycle electrical component according to claim 21, wherein
the support structure includes a space formed between the base member and the second housing of the electrical actuation unit, and the first housing is configured to be inserted into the space.

23. The bicycle electrical component according to claim 22, wherein
the wireless communication unit includes a first electrical contact, and
the electrical actuation unit includes a second electrical contact that is configured to electrically contact the first electrical contact in a state where the first housing is disposed in the space.

24. The bicycle electrical component according to claim 23, wherein
the second electrical contact is disposed on a connecting surface facing in an insertion direction of the first housing into the space.

25. The bicycle electrical component according to claim 1, wherein
the support structure includes a second space formed within the second housing of the electrical actuation unit, and the first housing is configured to be inserted into the second space.

26. The bicycle electrical component according to claim 25, wherein
the wireless communication unit includes a first electrical contact disposed on the first housing, and
the electrical actuation unit includes a second electrical contact that is disposed inside the second space and that is configured to electrically contact the first electrical contact in a state where the first housing is disposed in the second space.

27. The bicycle electrical component according to claim 26, wherein
the second housing includes a cover configured to close an opening of the second space.

28. The bicycle electrical component according to claim 27, wherein
the electrical actuation unit includes a seal configured to seal an interface between the second housing around the opening and the cover in a state where the cover closes the opening.

29. The bicycle electrical component according to claim 1, further comprising:
a power supply unit configured to supply an electrical power to the electrical actuation unit, and
a power supply bracket configured to mount the power supply unit to the bicycle electrical component,
the power supply bracket being configured to support the wireless communication unit to the bicycle electrical component as the support structure.

30. The bicycle electrical component according to claim 29, wherein
the first housing is configured to be detachably supported to the power supply bracket.

31. The bicycle electrical component according to claim 29, wherein
the power supply bracket is configured to contain the wireless communication member.

32. The bicycle electrical component according to claim 29, wherein
the first housing is configured to be detachably supported to the power supply unit.

33. The bicycle electrical component according to claim 29, wherein
the power supply unit is configured to contain the wireless communication member.

34. The bicycle electrical component according to claim 29, wherein
the power supply unit includes at least one of an electrical port and an electrical cable.

35. The bicycle electrical component according to claim 34, wherein
the electrical actuation unit includes at least one electrical port disposed at the second housing.

36. The bicycle electrical component according to claim 29, wherein
the power supply bracket includes a third contact, and the power supply unit includes a fourth contact that is configured to electrically contact the third contact in a state where the power supply unit is mounted to the power supply bracket.

37. The bicycle electrical component according to claim 29, further comprising
- a base member configured to mount the electrical actuation unit to a bicycle frame, and
- a fastener configured to fix the base member to the bicycle frame,
- the power supply bracket including a mounting portion configured to be mounted to the bicycle frame by the fastener.

38. The bicycle electrical component according to claim 1, wherein
- the wireless communication unit is configured to be detachably supported to an additional bicycle electrical component different from the bicycle electrical component.

\* \* \* \* \*